(12) United States Patent
Joshi et al.

(10) Patent No.: US 9,805,079 B2
(45) Date of Patent: Oct. 31, 2017

(54) EXECUTING CONSTANT TIME RELATIONAL QUERIES AGAINST STRUCTURED AND SEMI-STRUCTURED DATA

(71) Applicant: Xcalar, Inc., San Jose, CA (US)

(72) Inventors: Vikram Joshi, San Jose, CA (US); Jerene Yang, San Jose, CA (US); Brent Lim Tze Hao, San Jose, CA (US); Michael Brown, San Jose, CA (US)

(73) Assignee: Xcalar, Inc., San Jose, CA (US)

( * ) Notice: Subject to any disclaimer, the term of this patent is extended or adjusted under 35 U.S.C. 154(b) by 349 days.

(21) Appl. No.: 14/720,481

(22) Filed: May 22, 2015

(65) Prior Publication Data

US 2016/0055191 A1 Feb. 25, 2016

Related U.S. Application Data

(60) Provisional application No. 62/040,547, filed on Aug. 22, 2014.

(51) Int. Cl.
*G06F 17/30* (2006.01)
*G06F 3/0484* (2013.01)

(52) U.S. Cl.
CPC .... *G06F 17/30336* (2013.01); *G06F 3/04842* (2013.01); *G06F 17/30321* (2013.01); *G06F 17/30398* (2013.01); *G06F 17/30448* (2013.01); *G06F 17/30545* (2013.01); *G06F 17/30554* (2013.01); *G06F 17/30566* (2013.01); *G06F 17/30622* (2013.01); *G06F 17/30625* (2013.01);

(Continued)

(58) Field of Classification Search
None
See application file for complete search history.

(56) References Cited

U.S. PATENT DOCUMENTS

| 5,551,027 | A | 8/1996 | Choy et al. |
| 6,748,454 | B1 * | 6/2004 | Pohlmann ............... G06F 9/542 |
| | | | 310/261.1 |

(Continued)

OTHER PUBLICATIONS

Sumbaly et al., "The Big Data Ecosystem at Linkedin", Proceedings of the 2013 International Conference on Management of Data, Sigmod, dated Jun. 22, 2013, 10 pages.

(Continued)

*Primary Examiner* — Debbie Le
(74) *Attorney, Agent, or Firm* — Hickman Palermo Becker Bingham LLP

(57) ABSTRACT

Techniques are described herein for performing database operations against location and access transparent metadata units called fat pointers organized into globally distributed data structures. The fat pointers are created by extracting values corresponding to a particular key and paring each value with a reference to the local location and server that has the native format record containing the value. The fat pointers may be transferred to any server in the cluster, even if the server is different from the server that has the native format record. In general, most operations are performed against fat pointers rather than the native format records. This allows the cluster to perform work against arbitrary types of data efficiently and in a constant amount of time despite the variable sizes and structures of records.

32 Claims, 39 Drawing Sheets

(52) U.S. Cl.
CPC .. *G06F 17/30628* (2013.01); *G06F 17/30631* (2013.01); *G06F 17/30911* (2013.01)

(56) References Cited

U.S. PATENT DOCUMENTS

| | | | |
|---|---|---|---|
| 6,785,668 | B1 | 8/2004 | Polo et al. |
| 8,429,133 | B2* | 4/2013 | Lahiri ............... G06F 17/30327 707/665 |
| 8,566,324 | B1 | 10/2013 | Sacco |
| 8,762,387 | B1 | 6/2014 | Patel et al. |
| 9,235,505 | B2* | 1/2016 | Khan .................... G06F 9/5016 |
| 9,348,890 | B2* | 5/2016 | Larson ............. G06F 17/30398 |
| 2012/0284255 | A1 | 11/2012 | Schechter et al. |
| 2012/0319876 | A1 | 12/2012 | Froemmgen |
| 2015/0095345 | A1* | 4/2015 | Arai .................. G06F 17/30321 707/744 |
| 2016/0055220 | A1 | 2/2016 | Joshi et al. |

OTHER PUBLICATIONS

Sumbaly et al., "Serving Large-Scale Batch Computed Data with Project Voldemort", dated Jan. 23, 2012, 14 pages.

Ozsu et al., "Principles of Distributed Database Systems—Chapter 16, Peer to Peer Data Management", In Principles of Distributed Database Systems, Third Edition, dated Mar. 2, 2011, 48 pages.

Ozsu et al., Principles of Distributed Database Systems—Chapter 14, In Principles of Distributed Database Systems, Third Edition, dated Mar. 2, 2011, 56 pages.

Gray, Jim et al., "Transaction Processing: Concepts and Techniques—Chapter 14, The Tuple-Oriented File System", concepts and techniques, dated Jan. 1, 1993, 81 pages.

Giovanni, M. Sacco, "Fast Block-Compressed Inverted Lists", Database and Expert Systems Applications, dated Sep. 3, 2012, 10 pages.

Garcia-Molina, Hector, "Database Systems", The Complete Book, Second Edition, Department of Computer Science Stanford University, dated Jun. 15, 2008, 84 pages.

Garcia-Molina, Hector, "Database Systems", The Complete Book, Second Edition Chapter 20, Parallel and Distributed Databases, dated Jun. 15 2008, 52 pages.

European Patent Office, "Search Report" in application No. PCT/US2015/046114, dated Feb. 24, 2016, 30 pages.

Claims in European Application No. PCT/US2015/046114, dated Feb. 2016, 6 pages.

Ananth Rao et al., "Load Balancing in Structured P2P Systems", 2nd International Workshop on Peer-to-Peer Systems (IPTPS, 2003), vol. 2735, dated Feb. 20, 2003, 12 pages.

Tjan et al., "A Data-Flow Graphical User Interface for Queryiing a Scientific Database", Proceedings, IEEE Symposium on Visual Language, dated Aug. 24, 1993, 6 pages.

Sumbaly et al., "The Big Data" Ecosystem at LinkedIn, Sigmod, dated Jun. 2013, 10 pages.

Ozsu et al., "Principles of Distributed Database Systems" Third Edition, Springer, Chapter 2, New York, NY, dated Mar. 2, 2011, 32 pages.

Mitra et al. "Relational Algebra Learning Tool", dated Jun. 22, 2009, From the internet https://www.doc.ic.ac.uk/pjm/teaching/student_projects/pm105_report.pdf.

Isard et al., "Dryad: Distributed Data-Parallel Programs from Sequential Building Blocks", Eurosys dated 2007, vol. 23, 14 pages.

International Searching Authority, "Invitation to Pay Additional Fees", in application No. PCT/US2015/046114, dated Nov. 10, 2015, 9 pages.

European Patent Office, "Search Report" in application No. PCT/US2015/046129, dated Oct. 29, 2015, 16 pages.

European Claims in application No. PCT/US2015/046129, dated Oct. 2015, 3 pages.

Claims in application No. PCT/US2015/046114, dated Nov. 2015, 5 pages.

* cited by examiner

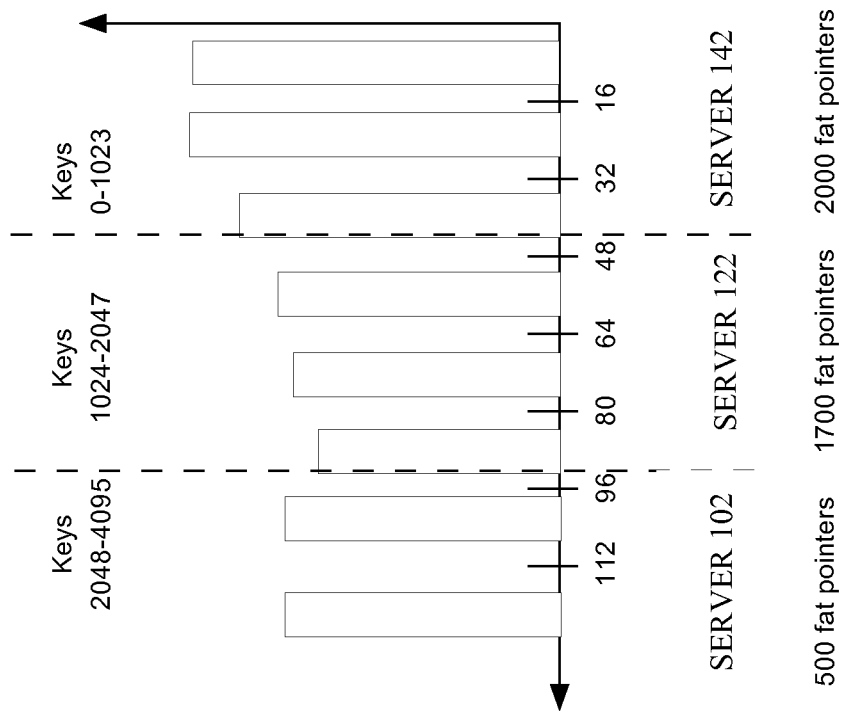

Sample Dataset for Album Sales 1010

{ "alpha": { "album": "alpha", "artist": "ayy", "similar": ["gamma", "theta"], "reviews": { "cool" : 20, "funny" : 400, "useful" : 49 }, "genre" : "rock", "sales": "$$$", "date": "2014-12-11" }, "beta": { "album": "beta", "artist": "bee", "similar": ["delta", "iota"], "reviews": { "cool" : 349, "funny" : 1000, "useful" : 129 }, "genre": "Blues", "sales": "$", "date": "2013-1-15" }, "gamma": { "album": "gamma", "artist": "gee", "similar": ["alpha", "theta"], "genre": "Rock", "sales": "$", "date": "2014-9-30" }, "delta": { "album": "delta", "artist": "dee", "similar": ["iota", "eta"], "reviews": { "cool" : 249, "useful" : 457 }, "genre": "Blues", "sales": "$$", "date": "2012-5-12" }}...

---

Sample Dataset for
Weather Reports 1020

{ "2014-12-11": { "temperature": "58", "weather": "sunny" }, "2013-1-15": { "temperature": "78", "weather": "sunny" }, "2014-9-30": { "temperature": "72", "weather": "rainy" }, "2012-5-12": { "temperature": "68", "weather": "rainy" }}...

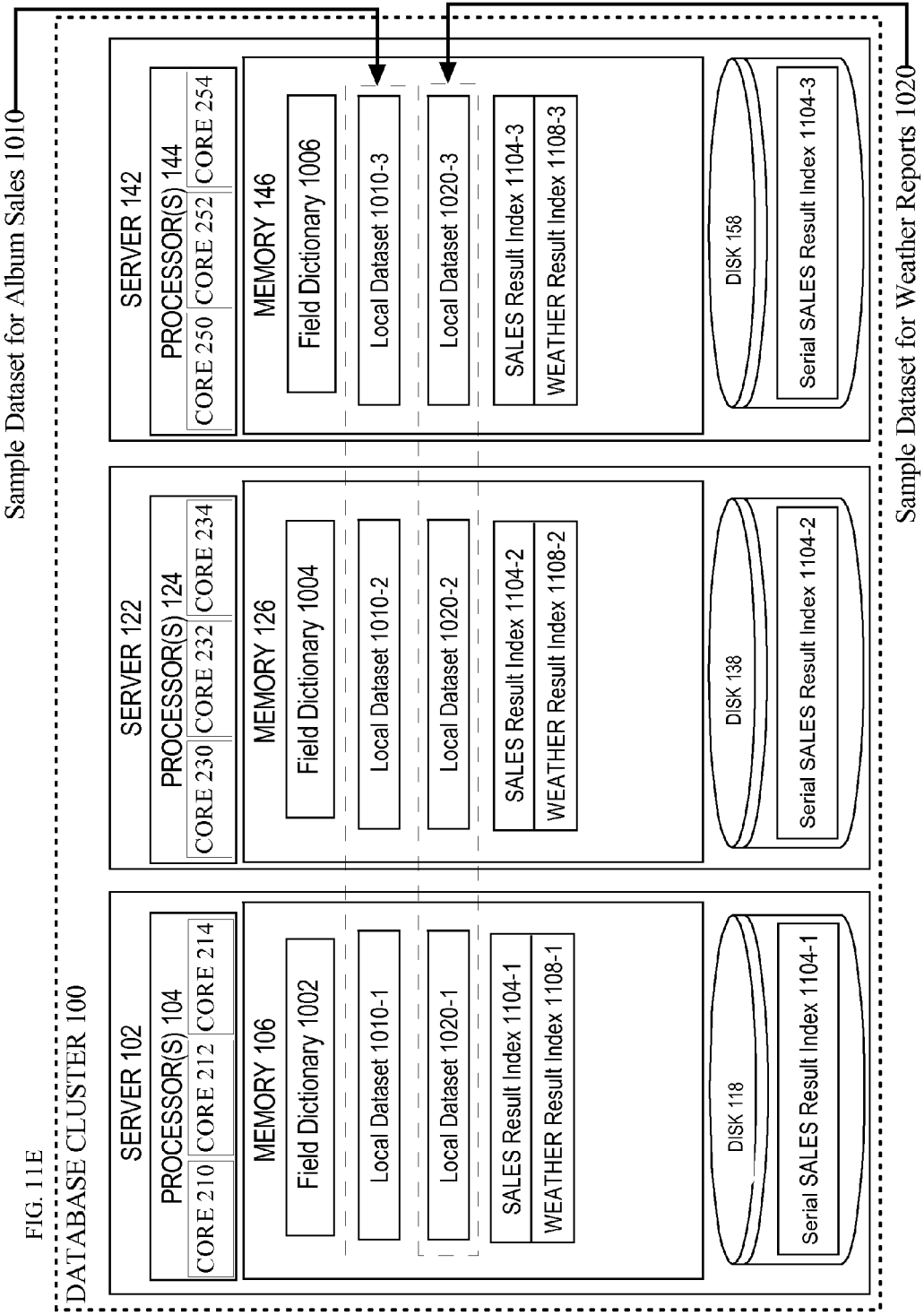

FIG. 14 Semantic Network
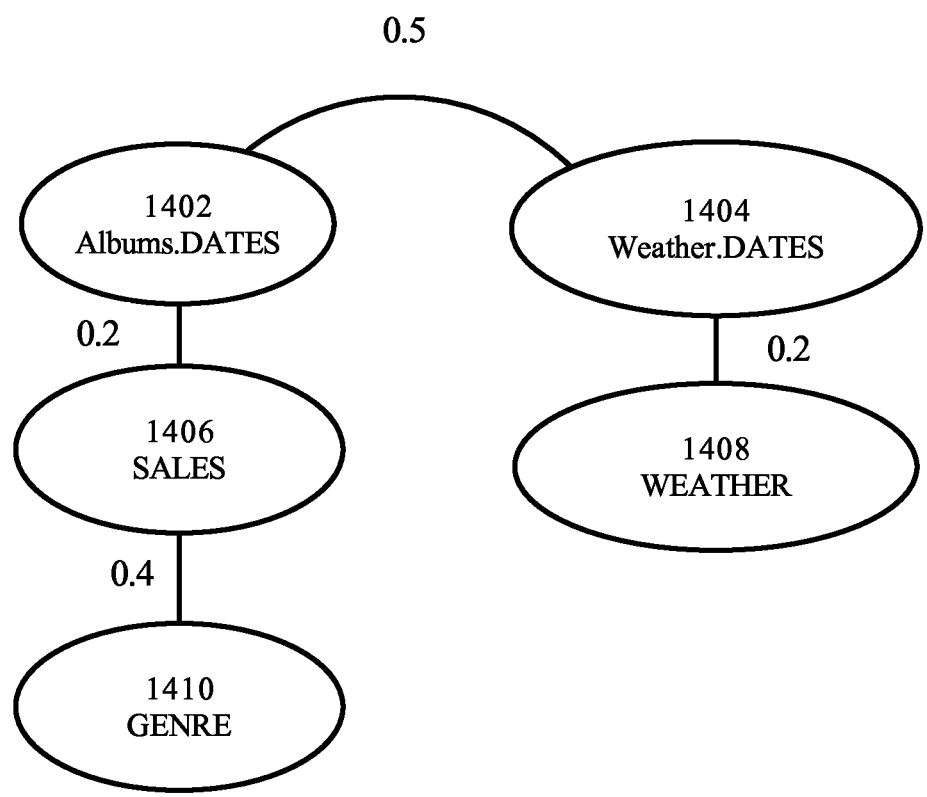

Extract Records 1702
(FILTER by FAILURE)

FIG. 17A

| Device_ID | GPS | System.TIME | Results | FAILURE | registration_id |
|---|---|---|---|---|---|
| 108 | | | {"message_id": "1:0408" }, { "error": "Unavailable" } | 0 | |
| 112 | 40.748440, -73.984559 | 15:16.2348 | {"message_id": "1:0402" } | | 23644 |
| 113 | | | {"message_id": "1:0402" } | | 33345 |
| 108 | 40.748440, -73.984559 | 15:16.2349 | {"message_id": "1:0408" }, { "error": "237" } | 0 | |
| 112 | 40.748440, -73.984559 | 15:16.2353 | {"message_id": "1:0408" }, { "error": "unavailable" } | 0 | |
| 113 | | | | | 45548 |
| 112 | 40.748440, -73.984559 | 15:16.2362 | {"message_id": "1:0400" } | | 23647 |

Result Records 1704

| Device_ID | GPS | System.TIME | Results | FAILURE |
|---|---|---|---|---|
| 108 | | | {"message_id": "1:0408" }, { "error": "Unavailable" } | 0 |
| 108 | 40.748440, -73.984559 | 15:16.2349 | {"message_id": "1:0408" }, { "error": "237" } | 0 |
| 112 | 40.748440, -73.984559 | 15:16.2353 | {"message_id": "1:0408" }, { "error": "unavailable" } | 0 |

Enriched Schema 1706

| Device_ID | GPS | System.TIME | Results | FAILURE | Results.error |
|---|---|---|---|---|---|
| 108 | | | {"message_id": "1:0408" }, { "error": "Unavailable" } | 0 | Unavailable |
| 108 | 40.748440, -73.984559 | 15:16.2349 | {"message_id": "1:0408" }, { "error": "237" } | 0 | 237 |
| 112 | 40.748440, -73.984559 | 15:16.2353 | {"message_id": "1:0408" }, { "error": "unavailable" } | 0 | unavailable |

EXECUTING CONSTANT TIME RELATIONAL QUERIES AGAINST STRUCTURED AND SEMI-STRUCTURED DATA

BENEFIT CLAIM

This application claims the benefit of Provisional Application 62/040,547, filed Aug. 22, 2014, the entire contents of which is hereby incorporated by reference as if fully set forth herein, under 35 U.S.C. §119(e).

This application is related to U.S. patent application Ser. No. 14/720,498 entitled "Data Driven Relational Algorithm Formation for Execution Against Big Data", filed May 22, 2015, the contents of which are incorporated by reference in their entirety for all purposes as if fully set forth herein.

FIELD OF THE INVENTION

The present invention relates to data storage and retrieval techniques in a database cluster, and more specifically to a computer implemented method for creating and executing a query algorithm against large quantities of semi-structured and structured data.

BACKGROUND

A typical relational database is organized into structured tables. The tables have records stored in each row, and the fields associated with each record are organized into columns. Users and applications retrieve information from the tables by making queries to the database that search one or more tables for content that meets certain criteria. These queries may be drafted to look for trends in data that explain or predict the occurrence of a particular phenomenon.

For example, assume a banking executive creates a low risk lending package for car buyers, but the car buyers simply are not purchasing the lending package. A marketing analyst may consult a sales database to determine how to increase sales. The marketing analyst could query a sales database containing similar lending packages over the course of previous years to determine trends in packages that sell well. An example query that may be issued for this purpose may have the following form in SQL:

SELECT sales, dates, risk FROM lendingPKG_sales_table ORDER BY date;

After sorting the sales by date, the marketing analyst may notice that high risk packages sell best during the summer months and low risk packages sell best during the winter months. Based on this trend, the marketing analyst may report that lending packages should be tailored to sell to car buyers for a particular season.

Arriving at a hypothesis that correlates risk with the time of year requires creating a query to a specific table in a database having the required fields to test this correlation. In this example, the records containing "sales", "date", and "risk" are pulled from data already organized into columns labeled "sales", "date", and "risk".

Unfortunately, a single database containing these fields may not exist. When the necessary databases do not already exist, a data analyst may attempt to ascertain trends from large quantities of data, referred to as "big data" without having the data organized into a single table that may be queried to readily show trends in the data.

Big data may comprise thousands or even hundreds of thousands of files that are organized into different data structures. Navigating this data may be difficult due to the size of the data (terabytes to petabytes) and the heterogeneous nature of the files. A dataset consisting of big data may comprise numerous files with many different key-value pairs. For example, consider the following file.

{{Name:Jon, Date: Sep. 1, 2014}
{Name:Ben, Date: Sep. 2, 2014}
{Name:Erin, Date: Sep. 3, 2014, Phone: 555-1234}

Here, there are three records, with two key-value pairs in each record. Specifically, there are two records with key-value pairs for the keys "name" and "date", while the third record contains key-value pairs for the keys "name", "date", and "phone".

In a typical database, tables are stored on disk and portions of each table are loaded into volatile memory in order to respond to queries. The speed at which a given database server is able to answer a query is based, at least in part, on how long it takes to load the necessary rows into volatile memory. The speed of responding to a query may be improved by indexing a table first based on a column, and then reading the index to determine what rows should be loaded into volatile memory. Because less rows need to be read into volatile memory, the speed of loading the table is improved.

In a clustered database system, multiple "nodes" have access to the same on-disk copy of a database. The speed of responding to a query may be improved by partitioning a database object (index and table), and assigning each partition to a different server. After a particular server reads a particular partitioned index, that particular server loads the corresponding rows from the corresponding table partition. Once loaded into volatile memory, the data items may remain cached in volatile memory so that subsequent accesses to the same data items will not incur the overhead of accessing a disk.

Loading records from "big data" takes a significant amount of time that varies from algorithm to algorithm due to the varying amount of useful data and the varying length of the records being loaded. Once the data is loaded into a cluster, the data may be stored in corresponding caches. However, having servers working on cached data in parallel is less likely to improve performance because the distribution of records across the cluster must change for each database operation. Redistributing the data for each operation usually involves cross-server communication for a more favorable distribution. The metaphorical concept that "data has mass" effectively communicates that transferring large amounts of heterogeneously structured data around a cluster is a slow, inefficient processes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 8A is a box diagram illustrating how a server in the cluster counts key values to determine how to adjust a range based distributed hash table (DHT);

FIG. 10A is an example of the semi-structured format of two sample datasets;

FIG. 11E is a block diagram illustrating creating a distributed result index based on a field used in multiple database operations;

FIG. 14 is block diagram illustrating an example semantic network for suggesting field names to a client;

FIG. 17A is a block diagram illustrating a selected golden schema by drilling down to useful records in a dataset;

DETAILED DESCRIPTION

Figure 1:
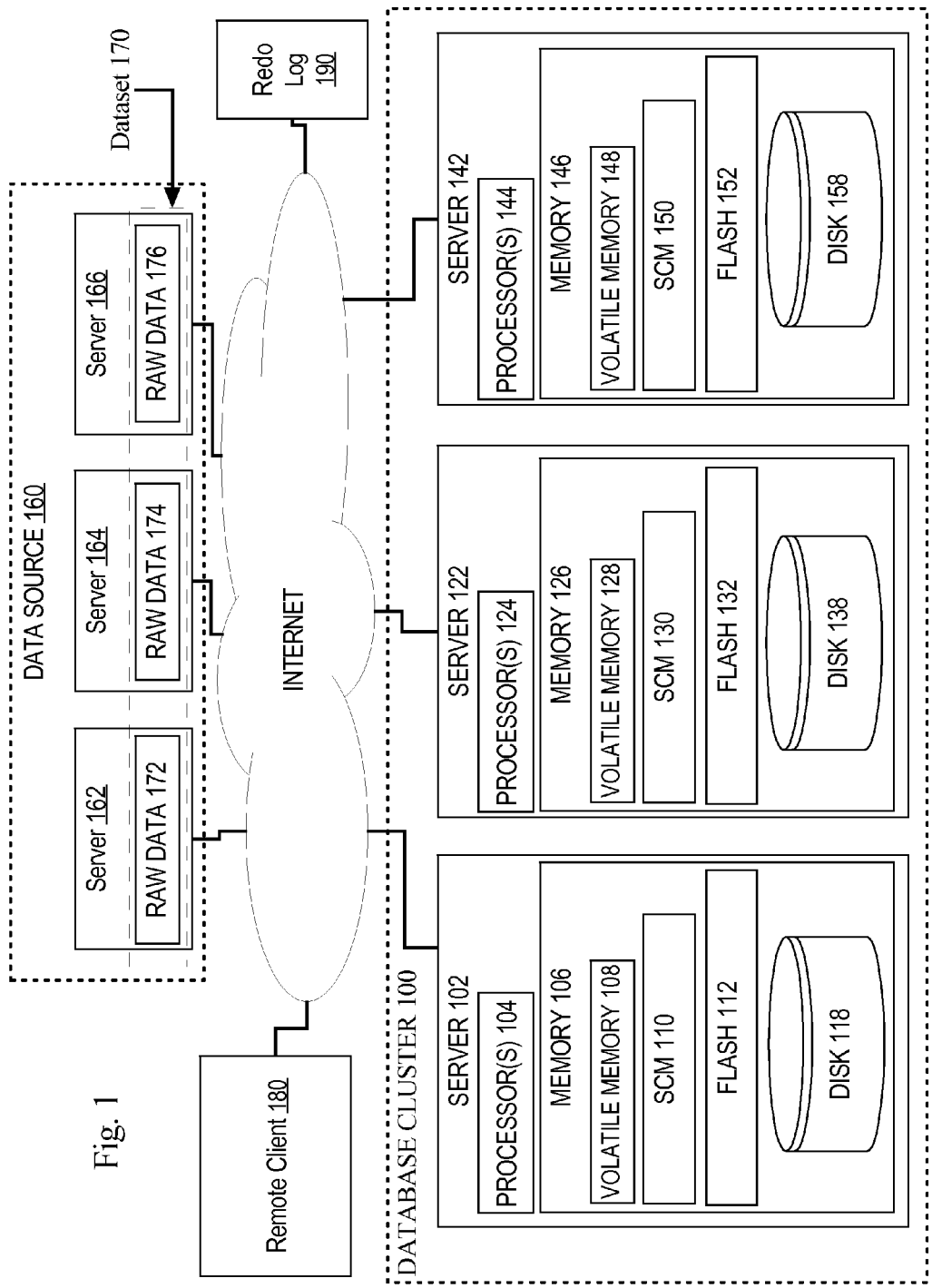
FIG. 1 is a block diagram that depicts a database cluster according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for creating and executing a relational query algorithm against large quantities of semi-structured and structured data, hierarchical data, variable sized data, and data with blobs of arbitrary information (text, images, etc.). While the techniques described herein are often described solely in terms of semi-structured data, the techniques may also be implemented using structured data, hierarchical data, variable sized data, and data with blobs of arbitrary information (text, images, etc.) or any combination thereof. The techniques covered here extend relation algebra that is strictly defined for tuples to hierarchical data and documents. For example, we allow joins on nested records, arrays within a hierarchy, and objects within arrays.

Creating an algorithm involves loading, from one or more source computing devices into a cluster, a sample population of records, and allowing a user to interact with those records at speeds that keep the user's attention. Interacting involves receiving commands to perform database operations from a set number of low-level database operations and displaying at least some schemas from the results of those operations.

Performing database operations at speeds that keep the user's attention is enabled by a large portion of the memories of the cluster being devoted to many globally distributed data structures that each store values corresponding to a key. A set number of low-level database operations may be performed against these distributed data structures. These low level database operations include FILTERS, AGGREGATES, SORTS, and JOINS. Interface components for creating commands that use these low-level database operations are provided to the user, so the user may intuitively use these operations.

Techniques are also described herein for using a dependency graph as an interface component. The results of a "parent" database operation may be used as the input of a "child" database operation. By chaining multiple database operations together, the results of each successive child database operation produce a more unified set of schemas. The algorithm is ultimately created by reverse engineering the database operations performed to obtain a set of one or more unified schemas that the user indicates as useful.

During algorithm formation, the user may create or update individual records in the sample population to artificially create values, so the reverse engineered database operations can have specific conditions that are likely to occur in the large quantities of semi-structured and structured data.

Executing this algorithm involves parsing data from the large quantities of data into data containers. The data that is extracted corresponds to the useful schemas indicated by the user. Data containers including native format datasets and distributed data structures are created as they are necessary and deleted as soon as they are no longer necessary to use memories of the cluster in an efficient manner. The database operations are performed in an optimized manner by not repeating any operations that create the same result set of records and re-ordering database operations so they use the same input data containers efficiently.

System Overview

Referring to FIG. 1, it is a block diagram that depicts a database cluster 100 according to one embodiment. In the embodiment illustrated in FIG. 1, remote client computer 180 has access to the database cluster 100 through the Internet. Data source 160 comprises either a local or distributed file system, making cluster 100 shared nothing or distributed shared with respect to an entire set of files distributed across three servers 162, 164, 166. These files may be accessed by any server 102, 122, 142 in the database cluster 100. Data source 160 may represent a variety of different vendors that grant access to files stored on persistent storage media. Examples of data sources include, but are not limited to, Amazon S3 servers, HDFS servers, network accessible sensors, data warehouses, client file systems, and other repositories of data.

Database servers 102, 122 and 142 respectively have local memory 106, 126 and 146 and one or more processors 104, 124 and 144, where each processor may have one or more cores. In the illustrated embodiment, local memories 106, 126, 146 respectively comprise one form of volatile memory 108, 128, 148 and three forms of non-volatile memory (Storage Class Memory 110, 130, 150; flash 112, 132, 152; and hard disk 118, 138, 158). In alternative embodiments, each node may have combinations of one or more of these, or other forms of volatile and non-volatile memories.

Remote client 180 may execute a command line interface, a graphic user interface, or a REST endpoint to interact with any server 102, 122, 142. In embodiments that employ a REST endpoint, the client 180 is preferably configured to send and receive JSON files, but the client 180 may be configure to receive and return other file types such as comma separate values (.csv) or an SQL dump (.sql). Irrespective of whether the remote client 180 uses a GUI, CLI, or rest endpoint, the remote client 180 communicates with a given database server using an API.

In some embodiments, the cluster size may dynamically change based on information received from remote client 180. Thus, database servers 102, 122, 142 may be part of a cluster of 256 servers, but the user has selected three servers to perform work on a particular dataset 170. In certain situations, the cluster size may be increased to handle a computationally intensive or I/O intensive workload.

In some embodiments, the cluster may include a fixed number of on-premises database servers. In these embodiments, a GUI, CLI, or REST endpoint may execute locally on a server within the cluster 100 or execute locally on an on-premises computer within the internal network.

Microkernel

A microkernel (not shown) executes on each server 102, 122, 142 to generate and maintain three numbers of interest to the cluster: Node IDs (NID), cluster-wide unique IDs (XID), and database object IDs (OID). Each NID is an identification number given to each server in a cluster, e.g. 102, 122, 142. NIDs are preferably sequential for simplicity purposes. Specifically, for the purpose of explanation, it shall be assumed that the NIDs for servers 102, 122, 142, are 0,1,2, respectively.

As shall be described in greater detail hereafter, using NIDs, XIDs and OIDs, a system designer or third party programmer can interact with the cluster 100 as if interacting with a single server 102. Upon receiving a command, a single server transparently propagates the command to the other servers in the cluster to handle the various cluster-wide operations, such as creating an object or executing a database operation against an object.

Generating XIDs

An XID refers to a cluster-wide unique identifier for a transaction or an object. XIDs may be used to generate globally unique numbers locally without distributed locking They may be used for transactions or anything that requires a unique ID. Tables, meta-data, instances of objects, etc., all use XIDs. XIDs may also be persisted and reliably reused after crashes depending on the types of objects being referred to.

XIDs are generated sequentially using the node ID as the high order bits and a unique number local to a particular server for the lower order bits. For example, 021, 022, 023 could represent discrete XIDs within Node 0 (i.e. server 102). Generating XIDs in this manner enables transactions to acquire globally unique handles efficiently using node-local calls. Any transaction in the cluster may be distributed. Having each XID labeled by the server that generated the transaction allows multiple distributed operations, each with its own XID, to run concurrently in the cluster.

Generating Database Object Identifiers

A different OID is generated and maintained to uniquely identify tables, trees and other data structures in the cluster. An OID may be generated using a two phase commit process, where the server generating the database object is referred to as the object generation master. The object generation master gets an XID for creating a database object locally. The object generation master then uses the XID as an OID and sends a message comprising the OID to the other servers in the cluster. A two-phase commit ensures that each server has the same OID for an object to be populated with data according to methods described herein.

Memory Hierarchy and Auto-Tiering

Modern severs are equipped with fast non-volatile memory as well as volatile memory. As shown in FIG. 1, a single server may have volatile memory 108, 128, 148 such as DRAM, and non-volatile memory that can be tiered in order of performance. For example, storage class memory 110, 130, 150 may be used as the highest tier of non-volatile memory, flash memory 112, 132, 152 used in the next highest tier of non-volatile memory, and hard disks 118, 138, 158 used as the third highest tier of non-volatile memory.

Under this architecture, data is stored using all forms of memory in a tiered fashion. Database objects are initially created and stored in volatile memory 108, 128, 148. As additional objects are created, less used objects are pushed to the next tier of memory (SCM 110, 130, 150). As the SCMs begin to fill up, flash memories 112, 132, 152 are employed. As the flash memories begin to fill up, hard disks 118, 138, 158 are employed.

Data may be stored differently depending on the type of media, but the data is not stored differently in terms of backup. There is no need to mirror data because the underlying raw data 172, 174, 176 is stored in data source 160. If some data is lost from volatile memory when a server or cluster fails, the data may be quickly regenerated based on a minimal redo log 190 that logs operations and meta-data.

Datasets

As used herein, the term "dataset" refers to the entire body of raw data to which an algorithm is ultimately to be applied. As shall be explained in detail hereafter, the amount of data in a dataset is typically too large to be used during the construction of the algorithm. Consequently, techniques are described hereafter in which algorithms are iteratively constructed based on a sample taken from the dataset. Because the sample is significantly smaller than the dataset itself, the iterations of constructing the algorithm consume significantly less computational resources that would be the case if the iterations were performed directly against the raw data.

Provisioning the Cluster to Load a Sample

A big data dataset can easily be one petabyte of data. Assume each server in cluster 100 has 128 GB of DRAM and 1 TB of SCM. A fixed portion of the memory is selected and apportioned for a particular user to sample a dataset 170 consisting of raw data 172, 174, 176. For example, a user may malloc 2.25 TB of memory in cluster 100 for sampling dataset 170. Using the auto-tiering previously described, this means all of the volatile memories 108, 128, 148 will be used and a portion of each of the SCMs 110, 130, 150 is used.

Receiving a Pointer to Data Source

Next, a server 102 from the cluster 100 receives a location of the data source from the remote client 180. The location may reference to any type of file system that stores large amounts of data. Examples of sources for storing large amounts of data include, but are not limited to, RDBMS, HDFS, Amazon S3, and local file systems. APIs may be leveraged to interface with these systems. For the purpose of explanation, it shall be assumed that remote client 180 specifies dataset 170 from data source 160, which consists of raw data 172, 174, 176 from servers 162, 164 and 166, respectively.

Heterogenously Structured Datasets

The structure of a dataset 170 refers to the fields used to define and organize data items within the dataset. Types of structures include, but are not limited to, row-column, comma separated values, and files organized into a specific schema. Heterogeneously-structured data refers to a dataset that does not fit well within a structured data framework. Heterogeneously structured data may include files organized into many different structures. For example, one file may be organized into rows and columns, and then a second file may be organized into key-value pairs (semi-structured data). In particular, semi-structured data may include files with irregularities within the data structure. For example, one file may contain the data items for "NAME" and "ZIPCODE", and then half-way through the file, the data changes to "NAME" and "CITY". A file containing records organized into key-value pairs may also be missing some key-value pairs for some records. For example, three records in the same file may contain "NAME1, CITY 1", "CITY2" without a name, and "NAME3" without a city. Third, semi-structured data may contain fields nested into other fields. For example, a record may contain "{NAME, FRIENDS {NAME, NAME} }."

The schemas used to organize data within a dataset may be determined no matter how the dataset is structured (structured, semi-structured, or heterogeneously structured).

Initial Format Scan of the Dataset

After receiving the location of the dataset 170 consisting of raw data 172, 174, 176, a server 102 in the cluster 100 performs automated discovery of the format of one or more files located at the data source 160. The dataset 170 may contain one or more large files, a directory of smaller files, or some large and some small files. The format is determined for each file. Formats include, but are not limited to, SQL dumps, comma separated values, JSON objects, XML, or any combination thereof. Data format discovery also includes determining whether the data is compressed. Examples of compressed formats include GZIP, TAR, or any other form of compression.

Choosing a Sample of Raw Data

A percentage of the apportioned memory (generally 10-25%) is allotted to store a representative sample of the dataset. For example, if 2.25 TB of memory was provisioned for dataset 170, 0.25 TB of memory may be apportioned to obtaining a sample of the raw data 172, 174, 176. This percentage is kept relatively small in order to keep a large percentage of memory available for metadata (for example, hash tables, logs, index trees, etc.) creation later described.

A random sample of the raw data 172, 174, 176 is taken to give the user an understanding of the field names used in the dataset 170. According to one embodiment, a pseudo-random algorithm is used to determine what portions of the dataset 170 will be loaded as a sample. The parameters required to obtain a sample include the amount of memory allocated for loading raw data, the size of the dataset 170, a seed value, and the average size of the files being sampled. Based on the average size of the files being sample, a server in the cluster that did the initial format scan chooses between sampling the raw data using (a) file granular sampling or (b) block granular sampling based on artificially designated blocks. Each of these techniques shall be described in greater detail hereafter.

The pseudo random selection is preserved in redo log 190 to allow the user to increase the sample size at a future time without throwing away the current sample or introducing duplicate entries into the existing sample.

File Granular Sampling

Often, datasets are composed of thousands of compressed small files (~64 MB) each containing data records in JSON, CSV, or other formats. When file granular sampling is used, the file names are first organized into an ordered set. Next, a pseudorandom selection of positions within this set are chosen. The files whose positions are chosen are then loaded into memory.

Figure 2:
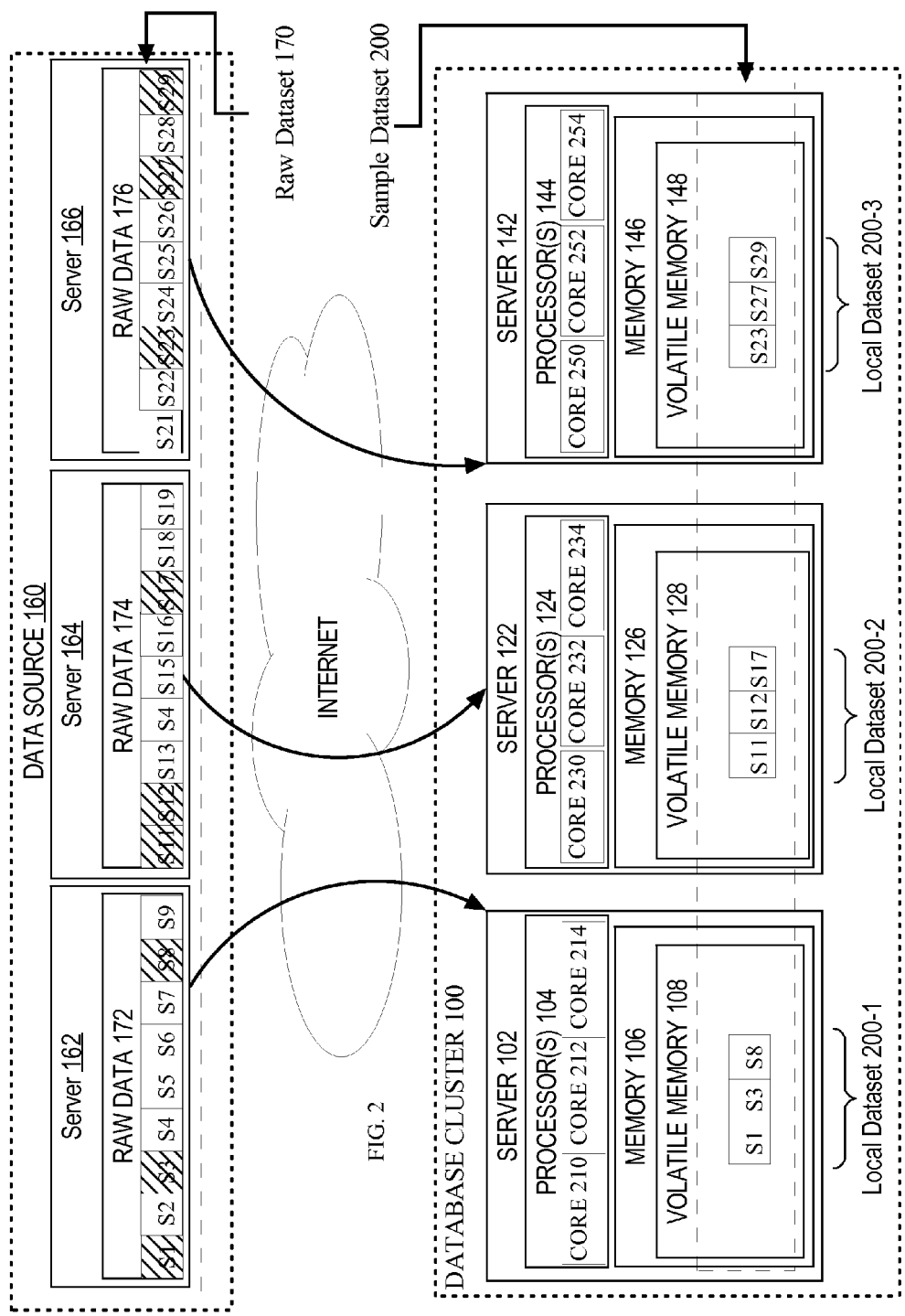
FIG. 2 is a block diagram illustrating a raw dataset sampled into segments for loading into a database cluster.

For example, FIG. 2 is a block diagram illustrating a raw dataset sampled into segments for loading into a database cluster. Raw data 172, 174, and 176 may comprise thousands of compressed small files. Based on a pseudorandom algorithm, files labeled as segments S1, S3, S8, S11, S12, S17, S23, S27, and S29 are selected as sample files to represent dataset 170.

Block Granular Sampling

Occasionally datasets are composed of a handful of very large files (~128 GB) which also contain data records in JSON, CSV, or other formats. Here, an individual file may exceed the amount of allocated memory. If file granular sampling were used, the loaded sample is likely to have a non-uniform random skew and not be representative of the user's total dataset. Instead, a fixed block size, B, is first chosen (~64 MB). Files from the user's dataset are divided into N blocks. (If the total dataset size is D, then N=D/B). For example, in FIG. 2, dataset 170 may comprise three files as separated by raw data 172, 174, 176. The dataset 170 is divided into 27 blocks (S1, S2, S3, S4, S5, S6, S7, S8, S9, S11, S12, S13, S14, S15, S16, S17, S18, S19, S21, S22, S23, S24, S25, S26, S27, S28, S29). A pseudorandom selection of blocks is chosen from the segmented blocks. Blocks labeled as segments S1, S3, S8, S11, S12, S17, S23, S27, and S29 are selected as sample files to represent dataset 170.

Block granular sampling introduces the possibility that a record may straddle a block boundary. To deal with this situation, a record is limited to a maximum record size (~16 MB) which must be less than the block size divided by two (R_max=B/2). Records that exceed the maximum record size or which straddle across a block boundary are thrown out.

Block granular sampling also introduces the possibility that a user record may not begin on a block boundary. In this situation, depending on the source data format, the server performing the sampling detects the outermost record in order to determine when a block boundary splits a record. For example, assume the following JSON objects straddle a block boundary between S2 and S3.

---
[...{ "name":"mike" "friends":] = S2
[{ "name":"vikram" }}, { "name":"jerene" "friends":{ "name": "brent" }}...] = S3
---

During load, the server loading the data tracks whether the JSON object delimiters, "{" and "}", are balanced. Where there is an imbalance, the record "name":"Vikram" is ignored, and the next record in the segment is used. This also requires a maximum record size which must be less than B/2.

Increasing the Number of Servers in a Cluster for Load

The cluster may temporarily employ more servers for loading the data. For example, cluster 100 may employ four servers for loading dataset 170. This may be useful if the cluster is configured for computational performance instead of input/output operations per second (IOPS). The temporary four server cluster can be deployed to load the data and run ETL (extract transform load) operations. Running ETL can potentially filter out the noise and publish only relevant data into the cluster. Once the load is complete the cluster size can be reduced such that the working set now resides in the memory hierarchy of the smaller set of servers.

Distributing Work of the Load

For the purpose of explanation, it shall be assumed that server 120 performed the initial format discovery. Referring to FIG. 2, server 102 establishes a unique OID for a sample dataset 200 of dataset 170. The server 102 creates a load operation plan for the segments S1, S3, S8, S11, S12, S17, S23, S27, S29, chosen in the previous step. The load operation plan optimizes which segments are assigned to which server based on a series of factors.

Assigning Segments Based on Schema

During the initial format scan of the records, sampled segments are scanned for a syntactic schema. For example, a particular record may consist of a JSON object:

---
{
"name": "Jim's",
"votes": "900",
"category": "steakhouse"
}
---

The syntactic schema of a record includes information regarding the keys and the primitive types of values paired with the keys. For example, the record above is a JSON object containing three keys {name: (string), votes (int), category (string)}.

In some embodiments, the load operation plan designates segments with the same or similar schema to the same server. For example, segments with the {name: (string), votes (int), category (string)} schema may be assigned to a first server, while segments with a {name: (string), votes (int), stars (int)} schema may be assigned to a second server.

In some embodiments, the server creating the load operation plan distributes these schemas based on a user selecting a particular key. Segments having a particular key are all loaded into the same server. For example, if a user selects the "category" key, then the system knows to load all segments with this "category" key into the same server or subset of servers.

Assigning Segments Based on the Pre-Existing Locality of Data

If a sample of dataset 170 was previously loaded into the cluster then, then the previously loaded sample does not have to be re-loaded into the cluster 100. The server creating the load operation plan may scan a log of previously loaded data to determine if data already resides within the multi-node cluster 100. The sample dataset 200 is divided according to the manner in which it was previously divided on the cluster 100, and any segments of the sample dataset that do not already reside on the cluster 100 are determined. These leftover segments may then be distributed across the cluster 100.

For example, a user may initially have allocated 2.00 TB of memory for a particular dataset 170, which leads to 0.20 TB of memory used to load a sample dataset. The load operation may result in loading S1, S3, S11, S2, S23, S27. After interacting with the data, the user determines how to allocate an additional 0.25 TB of memory for interacting with this dataset 170, which leads to an additional 0.05 TB of memory used to load the sample dataset. Rather than loading every segment from the new sample S1, S3, S8, S11, S12, S17, S23, S27, S29, into memory, the load operation plan may only include loading the missing segments S8, S17, and S29. These segments may be distributed across the cluster.

Assigning Contiguous Segments to the Same Server

After random sampling, some segments may come from a contiguous set of blocks. The server creating the load operation plan assigns contiguous segments, if they exist, to the same server. Hard disks have the best performance using sequential IO rather than randomly accessing data located at different areas throughout the disk. Thus, having the hard disk perform reads in a single pass increases load operation performance.

For example, segments S11 and S12 are selected from a contiguous set of blocks. Because these segments come from contiguous blocks, they are assigned to be loaded by the same server 122.

Parallelizing Cluster Servers with Source Servers

Loading the sample dataset 200 is performed in parallel by a plurality of servers 102, 122, 142 in the cluster 100. When the data source 160 has a file system distributed across multiple servers 162, 164, 166, the segments from those source servers 162, 164, 166 can be coordinated with the loading operation of the cluster servers 102, 122, 142, so each server avoids competing IO operations. In this example, the server creating the load operation plan assigns:

the segments S1, S3, S8 from server 162 to server 102,
the segments S11, S12, S17 from server 164 to server 122, and
the segments S23, S27, S29 from server 166 to server 142.

Loading is executed by servers in parallel both at the data source 160 and at the receiving cluster 100. This optimization prevents a single server from choosing between requests from multiple servers. For example, the sample dataset may include three different segments S11, S12, S17 from a single server 164. The first segment S11 contains blocks addressed 1-50, a second segment S12 contains blocks addressed 51-100, and a third segment S17 contains blocks addressed 1000-1050. Because these segments are all assigned to the same server 122, the data source server 164 reads blocks 1-100 in a single scan, and then blocks 1000-1050 in a second scan.

If some of the segments from the same source server 164 were to have been assigned to different cluster severs, the blocks could have been extracted in an inefficient order. Server 164 could have served a request for blocks 1-50 from segment S11 to server 122; then served a second request for blocks 1000-1050 from segment S17 to server 142, and then finish by serving blocks 51-100 from segment S12 to server 122. However, because all blocks for the source server 164 are sent to the same cluster server 122, the source server 164 does not have to choose between IO requests.

Assigning the Load of Each Segment to Different Cores

The server creating the load operation plan may utilize the various cores available at each server when assigning segments. Referring to FIG. 2, each server 102, 122, 142 in the cluster has a processor with three cores (210, 212, 214), (230, 232, 234), (250, 252, 254), respectively. Loading the sample dataset 200 may be split into nine threads, so the cores may execute in parallel.

Segment S1 is loaded by a thread running on core 210;
Segment S3 is loaded by a thread running on core 212;
Segment S8 is loaded by a thread running on core 214;
Segment S11 is loaded by a thread running on core 230;
Segment S12 is loaded by a thread running on core 232;
Segment S17 is loaded by a thread running on core 234;
Segment S23 is loaded by a thread running on core 250;
Segment S27 is loaded by a thread running on core 252; and
Segment S29 is loaded by a thread running on core 254.
In embodiments where the segments are being compressed as they are loaded, the separate cores running the load operation also increase the performance by compressing the segments in parallel.

Loading Segments into Contiguous Local Datasets

Segments S1, S3, S8, S11, S12, S17, S23, S27, S29, are part of a single distributed database object. However, each server maintains a different portion of the database object in a local dataset. A local dataset is composed of a set of dataset segments. For each server, the dataset segments assigned to a particular target server are loaded and compressed into a single local dataset as contiguous blocks in their native source format.

Compressing data into dataset segments increases the performance of the cluster in terms of latency because more database objects may be stored in volatile memory when every object is compressed. Even though reading compressed data is slower than reading uncompressed data, the cluster benefits from having more data located in higher tier (i.e. faster) memory. For example, local dataset 200-1 fits entirely in volatile memory 108. If segments S1, S3, and S8 were not compressed, then segment S8 may not fit in volatile memory 108 with segments S1 and S3 and would have to be pushed into a lower tier of memory. A multicore processor (preferably 16-32 core machine) can divide the work of reading multiple compressed segments in parallel. However, the amount of memory available on a single server is fixed. Thus, compression is used to maximize the use of the available memory at the expense of putting a higher load on the cores of the machine.

Static Data, Dynamic Metadata

According to one embodiment, local datasets are not transported between servers after load. For example, in FIG. 2 dataset 200-1, which is loaded on server 102, is not thereafter transported to servers 122 or 142.

Once segments are read into a target server, the segment never moves thereafter. Instead, metadata referred to as fat pointers (later described) are created and transferred around the cluster for performing database operations. The fat pointers reference particular records within the dataset that can be used to display an entire record. However, as the amount of metadata increases, there are fewer and fewer reasons to refer back to the original dataset because fat pointers already exist for any data needed for a particular database operation.

If the client indicates that the sample size should be enlarged, additional servers may be added to the cluster. However, the old segments are not rebalanced using the additional servers. Instead, the new data is mapped to the new server, and the system scales in a linear fashion. Even if a server is added to the cluster and no new segments are added, the segments are not rebalanced across the cluster. The system architecture may scale linearly irrespective of record size or the amount of data in the sample population because transferring messages among nodes is performed with discrete sized meta-data (fat pointers) instead of the variable size raw data records.

Indexing Values During Load Based on User Selection of a Key

In some embodiments, the client is given the opportunity to select keys or field names after the initial format scan of the raw data 172, 174, 176. According to one embodiment, the key selection operation involves displaying some of the records from the dataset 170 to the user at remote client 180. The user is provided an interface with controls that allow the user to point and click keys that are of interest. The keys or fields selected are received from remote client 180 at a particular server 102. The values of that key are then sorted in a cluster-wide object called a distributed index. The number of distinct keys that may be indexed is limited by the space initially provisioned for sampling the dataset 170. Thus, a server may receive input of multiple key selections, but if there is insufficient memory to index all of the selected keys, then the system only indexes a subset of the selected keys.

In some embodiments, an index may be created in response to a command to perform a database operation on one or more particular keys before performing the database operation. Even if the entire sample population is not entirely loaded into the system, a user may send commands to perform database operations on raw data that is loaded into the system. The system begins indexing a key based on the received command, and dynamically continues to create the index on the data as the data is being loaded. The system may even perform the database operation on the portion of the index created from the partially loaded data. Commands for specific database operations such as SORTS and JOINS may trigger index creation before performing the database operation, while other commands such as AGGREGATES and FILTERS may be performed without creating an index first.

Although a user may indicate a key of interest during the load operation, the indicated key is not necessarily treated as a primary key. Thus, while the key may in fact be indexed during load operation, the index may be temporary. For example, the index of a key selected during the load operation may later be overwritten by the system if the user fails to use the key to manipulate the data. Thus, according to one embodiment, there is no primary key assigned during the load operation.

Globally Distributed Data Structure

The globally distributed data structure, used for distributed indexes, distributed result sets, and distributed result indexes refers to a distributed hash table (DHT) with separate chaining of pages rather than individual entries. Each globally distributed data structure organizes metadata corresponding to a particular key. A global range based DHT is used to distribute entries to a particular host server of a plurality of host servers in a cluster, and then the entries are distributed again to a particular linked list of a plurality of linked lists within the particular host server using a local range based DHT. Separate chaining of pages refers to how each linked list stores data items in discrete sized nodes that usually corresponds to a page size. A chain of nodes may be referred to as a "log" for a particular range of values corresponding to the data items in those nodes. When the particular range of values corresponds to a particular range based hash, then that chain of nodes may be referred to as a "hash log." The entries within a particular log may be sorted based on values from the entries or even transformed into a b+tree, but in a preferred embodiment, the data structure is only partially sorted (by range based hashing) during creation.

Any server may request that any particular log be scanned using a globally maintained range based hash function for determining the server(s) that have the log, and then using a locally maintained range based hash function to determine the particular linked list(s) within the server that contain the log.

Most database operations performed against big data are performed against an entire range of records rather than searching for one record in particular. For example, most users are not interested in finding the one record that corresponds to John Doe with employeeID "12345." Instead, they would be interested in all records that correspond to "employees in San Francisco" or "employees with blue eyes." Initially creating a fully sorted index is a waste of computational resources because a range of records is scanned for each database operation. In other words, the number of sought after entries 'm' is often on the scale of the total number of entries, 'n', so searching through many records, 'n', for many sought after entries, m, is efficient compared to searching through many records 'n' for one sought after record, m=1.

Creating a partially sorted index has a significant benefit of reducing the record length to a discrete size, and further divides the work required to scan large portions by a factor 'p' that corresponds to the number of range based hashes created for the data structure. The factor 'p' is scalable with the number of nodes in the cluster. The actual number of records that are scanned $O(n/p)$ approaches the theoretical number of records that are required to be scanned "m" by increasing the number of servers in the cluster (i.e. by increasing 'p', the computational efficiency approaches $O(1)$ because $O(n/p) \rightarrow O(m)$). The system architecture is highly scalable (additional servers may be easily added) because the cluster relies on very little communication among nodes to perform database operations.

Using a Globally Distributed Data Structure as an Index

According to one embodiment, a globally distributed data structure is created as a "metadata" index for the "data" that has been compressed into the local datasets. Instead of transferring records from local datasets between servers within database cluster 100, data items corresponding to a particular key from the local datasets are used to create globally distributed data structures. The data structures are created and deleted as memory permits with portions being transferred around the cluster, compressed and decompressed, and used as input and output for database operations.

For the purpose of explanation, assume that server 102 is requested, by a user or an application, to create an index for the key "KEY1". Initially, the server 102 creates an OID for the not-yet-created index structure for the key "KEY1". As records from the segments 51, S3, S8, S11, S12, S17, S23, S27, S29 are loaded into local datasets, the servers that receive the records scan the records for key-value pairs where the key name is "KEY1". After discovering a key name "KEY1", the server parses the value from the key to place an index entry for the record into an index structure. For example, if the value is "900", then "900" is placed in an index tree for KEY1.

According to one embodiment, the index entry for a particular key/value pair contains both the value and a pointer to the record that contains the value. For example, the index entry for value "900" also includes a reference to the record that contains the "KEY1": "900" key/value pair. According to one embodiment, the index entries are "fat pointers". Techniques are described later herein for optimally encoding fat-pointers.

Fat Pointer

As used herein, the term "fat pointer" refers to a globally unique identifier that minimally comprises: (a) a value that comes from a particular record, and (b) the expected location, in the cluster, of the particular record containing the value. In one embodiment, the expected location of a record is defined in two dimensions: (1) a server identification, NID, identifying the server hosting the record (NID is unique relative to the other servers in the cluster) and (2) a record identification, $R_{ID}$, identifying the record number ($R_{ID}$ is unique relative to the number of records stored within the server that contains the corresponding record).

As shall be described in greater detail hereafter, a fat pointer may or may not contain the key value of the record to which the fat pointer points. Fat pointers that do not contain the key value of the corresponding record are referred to herein as value-less fat pointers.

Figure 3:
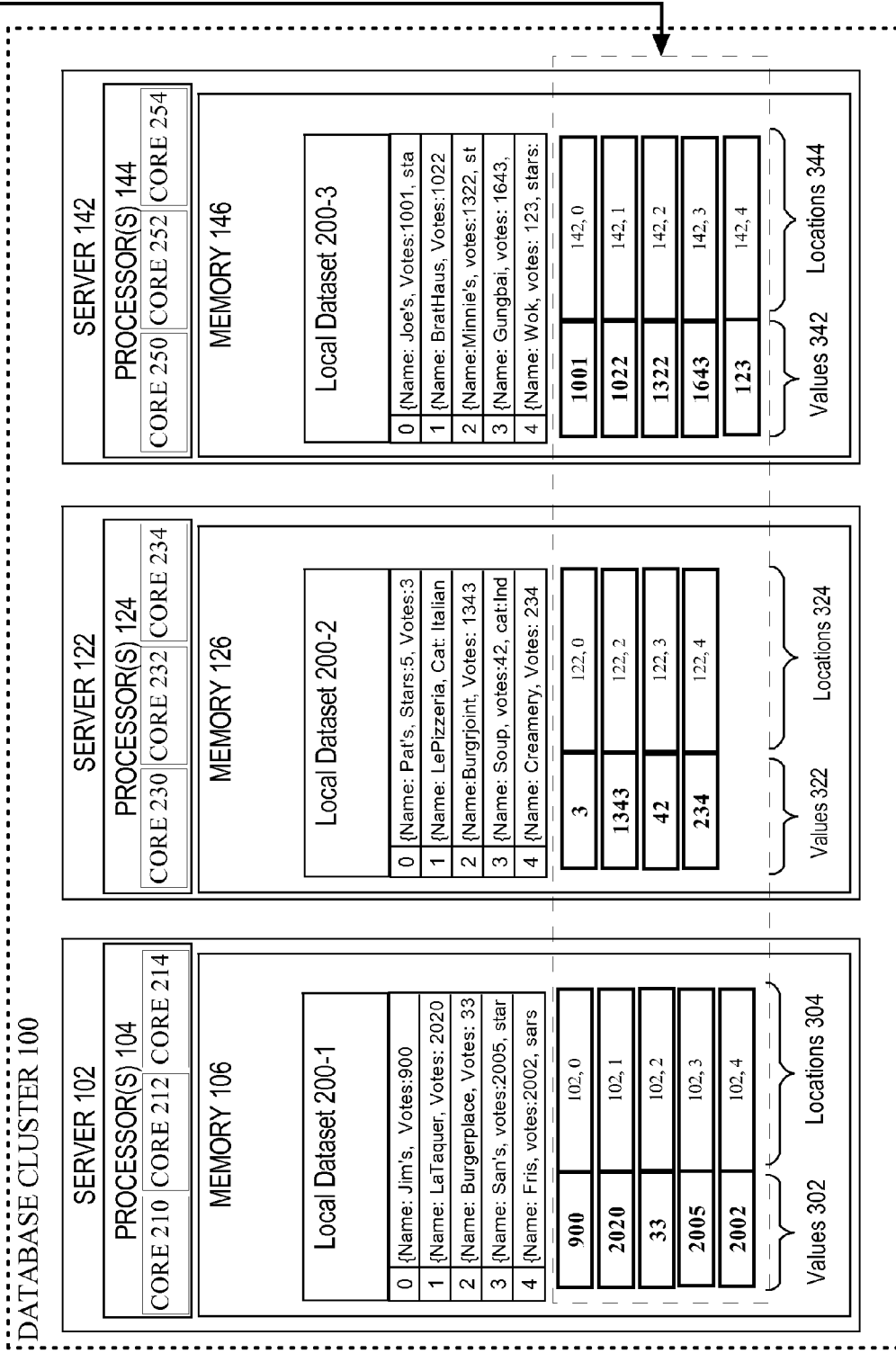
FIG. 3 is a block diagram illustrating a selected set of key-value pairs transformed into fat pointers.

FIG. 3 is a block diagram illustrating a selected set of key-value pairs transformed into fat pointers. In this example, a user has selected "votes" as the key for which to create an index structure. As servers 102, 122, and 142 respectively load records into local datasets 200-1, 200-2, 200-3, the servers 102, 122 and 142 index the data based on the value contained in the "votes" key-value pair. For example, in record "0" in local dataset 200-1, the "Votes" key is associated with the value "900". For record "0", server 102 creates an index entry that includes the key value "900" and a fat pointer. In the illustrated example, the fat pointer for record "0" specifies a NID of 102 (indicating that the record is located on server 102), and an RID of 0, indicating that the record is at position 0 for dataset 200. The same mapping is created for every value, within sample dataset 200, associated with the key "votes".

The values 302 correspond to the values for the votes key in the local dataset 200-1; the location data 304 corresponds to the locations of the data in local dataset 200-1 in server 102.

The values 322 correspond to the values for the votes key in the local dataset 200-2; the location data 324 corresponds to the locations of the data in local dataset 200-2 in server 122.

The values 342 correspond to the values for the votes key in the local dataset 200-3; the location data 344 corresponds to the locations of the data in local dataset 200-3 in server 142.

Deferred Transmittal of Fat Pointers

The fat pointers are then each assigned to a particular server in the cluster using a range partitioned distributed hash table. The fat pointers are sent from the server that creates the entries to the server that has been assigned the range into which the key value of the entry falls. In distributing the index entries, the same hash function or range assignments are used by every server in the cluster, so that all index entries that have the same key value will be sent to the same server, regardless of which server creates the entries. For example, a fat pointer with the key value "900" may be assigned to a server that hosts all fat pointers with key values from 0-999. When a key value hashes to the local server, an entry that includes the fat pointer is placed in the locally distributed data structure. When the fat pointer hashes to another server in the cluster, the fat pointer is sent to a buffer for transporting the fat pointer to the other server.

Figure 4:
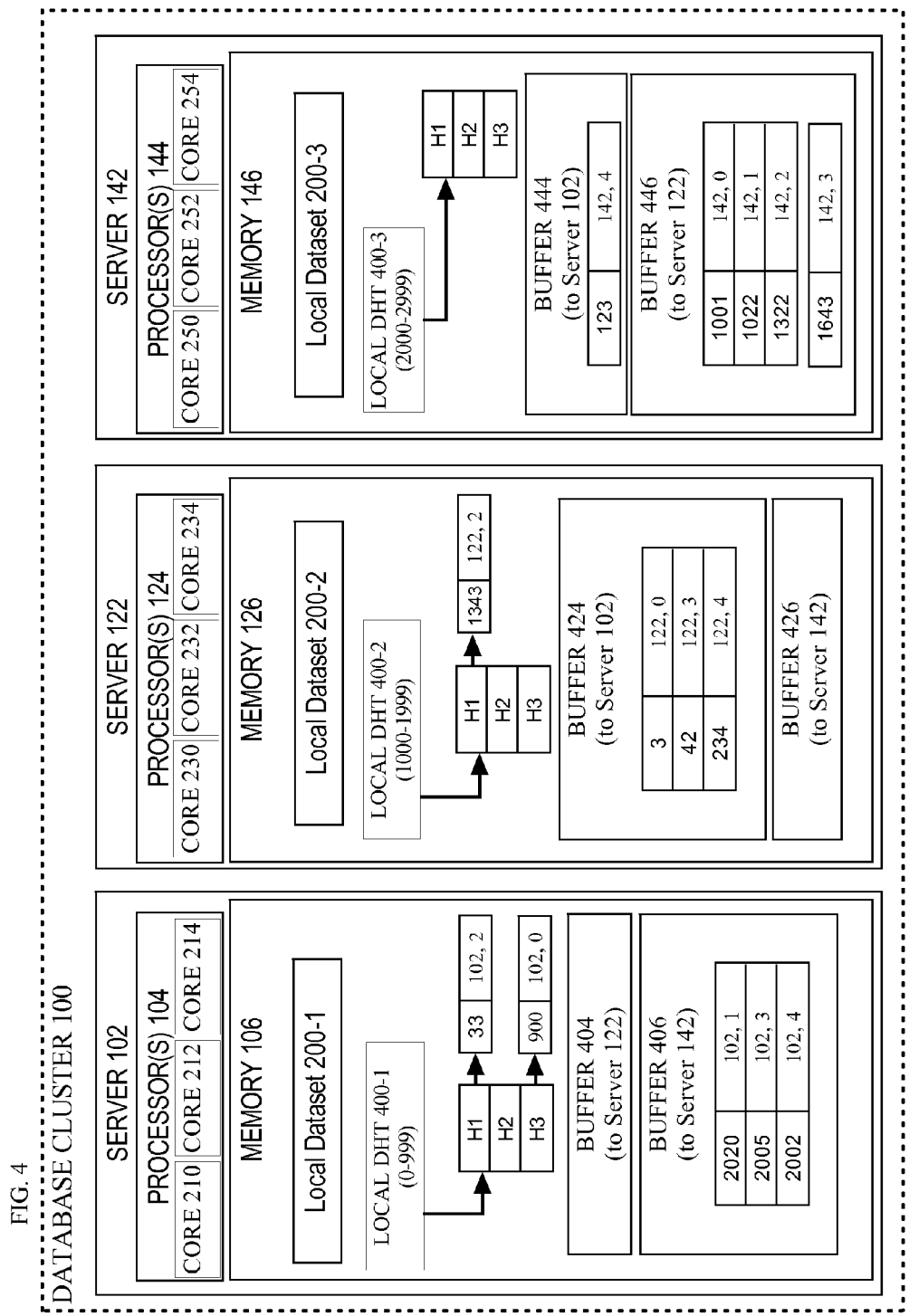
FIG. 4 is a block diagram illustrating values from a selected key being organized into a globally distributed data structure of fat pointers.

FIG. 4 is a block diagram illustrating a selected key being organized into a distributed index of fat pointers. The values "33" and "900" hash to the local server 102, so they are immediately placed in the local index structure 402. There are no values that hash to server 122, so buffer 404 is empty. Values "2020", "2005", and "2002" all hash to server 142, so these values are sent to a buffer 406 for transporting to that server.

Sets of fat pointers are buffered on a per-destination server basis. When enough entries accumulate in a buffer to allow a network efficient transfer (~128 KB), the set of buffered entries are then sent to the appropriate destination server. For example, assume three fat pointers with values "1001", "1022", and "1322" in server 142 contain enough data in buffer 446 for a network efficient transfer. These three fat pointers are sent in one message to server 122. Upon receipt, each destination server then inserts the entries locally into a locally distributed data structure.

Building Locally Distributed Data Structures

In a preferred embodiment, the locally distributed data structure is a local range based hash table. When a set of fat pointers reach a target server, the fat pointers are placed into a local hash table. Large pages get created sequentially in the local hash table to create a link list of pages for each hash. The hash to link-list structure works well for any values that are naturally stored in a sorted order, such as logs that store data by date and/or time.

When a query (using a cursor) needs a range of data for one of the database operations, the hash values that corresponds to the range of the cursor are identified, and then sorted. Many operations do not require data to be sorted, but for those that do, the sort is performed in response to receiving a specific database operation. For example, the SORT and JOIN operations may require one or more local hashes to be sorted in order to produce results corresponding to values within those hash ranges. For example, if a first hash corresponds to 0-99 and a second hash corresponds to 100-199, then a SORT of values between 50 and 150 would require sorting both the first hash and the second hash. Similarly, the join operation is preferably preceded by a sort operation, so multiple cores make work on the join in parallel. For example, if a JOIN operation is joining values from 50 to 150 between two tables, then the values between 0-99 may be sorted for the two tables using two different cores. In parallel, the values for 100-199 may be sorted for the two tables using two additional cores for a total of four cores. After the sort operations, the join operation may be performed for values from 50-99 using one core and from 100-150 using another core. The ability for a large number of threads of execution running on multiple cores, sorting in parallel, or doing joins in parallel, makes these servers perform database operations extremely fast.

Figure 5A:
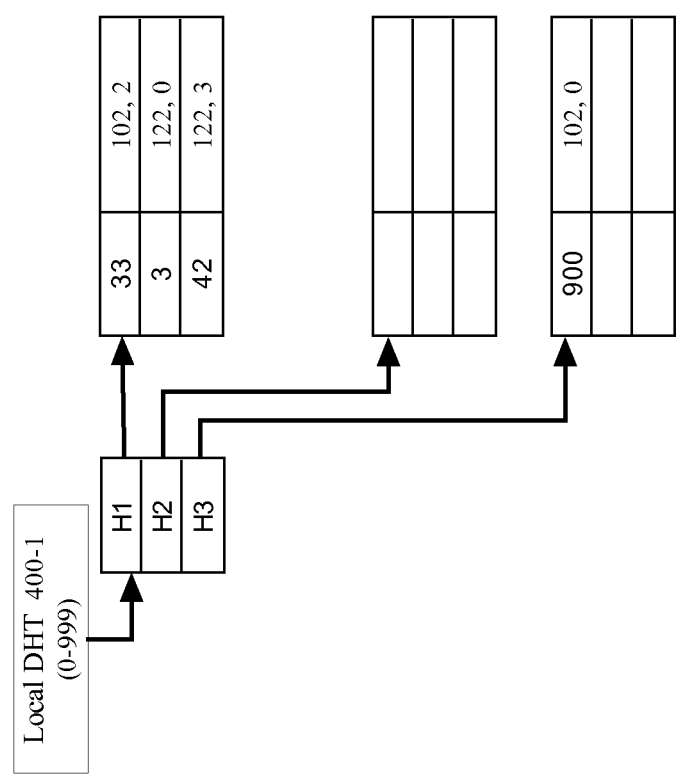
FIG. 5A is a block diagram illustrating a local portion of a globally distributed data structure with only one page in each linked list.
Figure 5B:
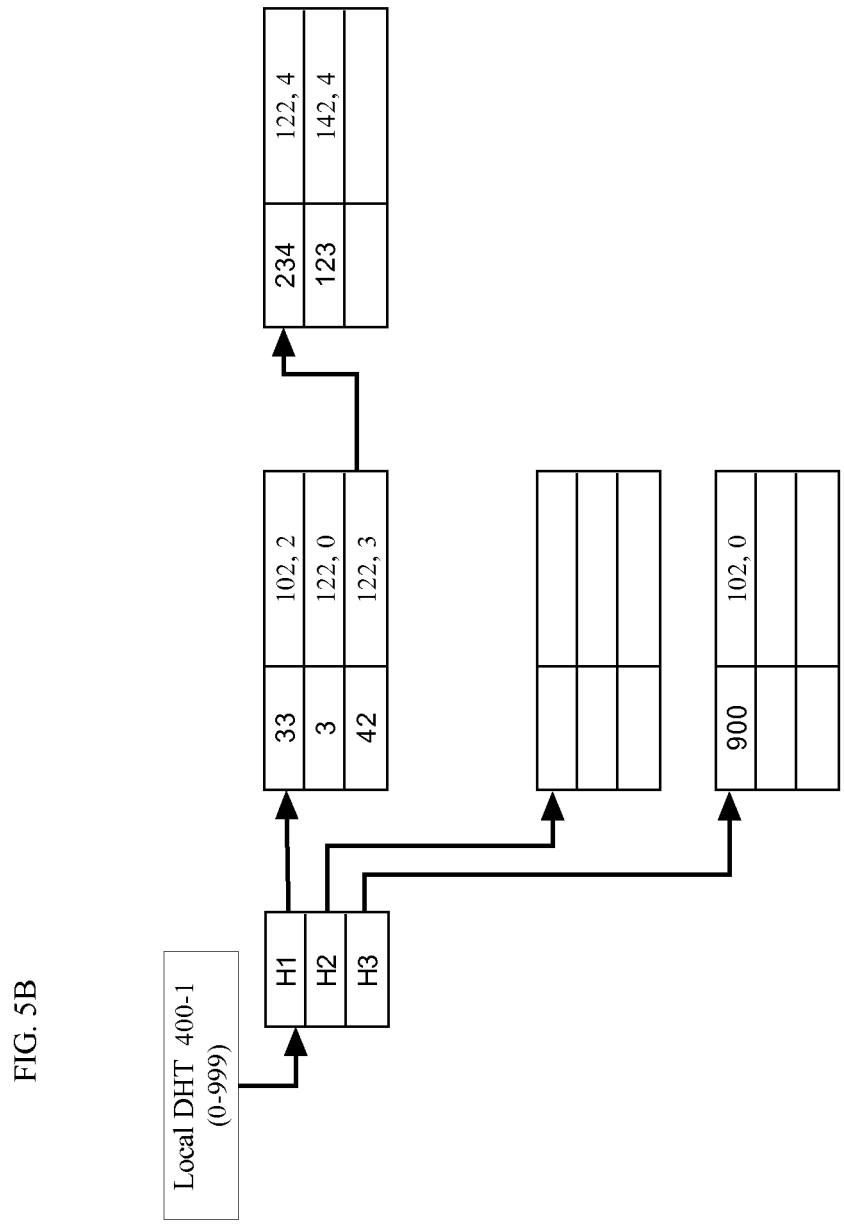
FIG. 5B is a block diagram that illustrates adding a page to a local portion of the globally distributed data structure.
Figure 5C:
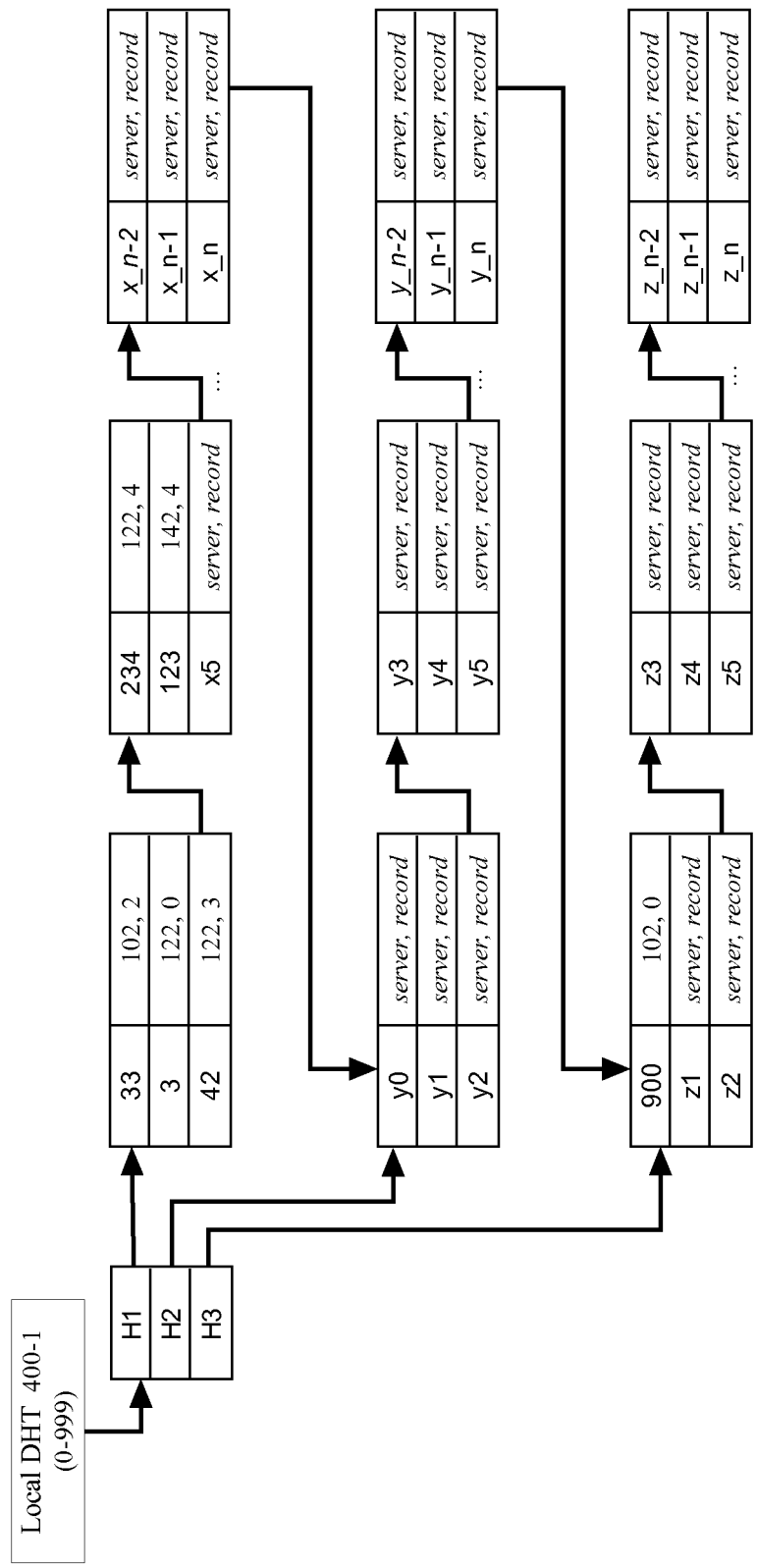
FIG. 5C is a block diagram illustrating a local portion of a globally distributed data structure after all fat pointers have been added to their respective linked lists.

FIGS. 5A-5C are block diagrams illustrating generating a locally distributed data structure of fat pointers. Assume the pages of this index structure store fat pointers in groups of three or less. FIG. 5A illustrates a local hash table with only one page in each hash. Initially, each page is filled to its maximum capacity. For example, the first hash H1 has a leaf node of three fat pointers containing values "3", "33", and "234".

Once a new fat pointer is added to this hash, an additional page is added as presented in FIG. 5B. A fat pointer with the value "42" is added to the hash H1, so the hash H1 has two pages—a first page containing fat pointers with values "3", "33", and "234" and a second page containing values "42", "123". A pointer is created at the end of each page to reference the next page. Thus, after the fat pointer containing the value "234", a pointer references the next page starting with the fat pointer containing the value "42".

Pages of fat pointers are added as presented in FIG. 5C as they are received from the servers that created them. In FIG. 5C, fat pointers with the values x, y, and z, are added to the locally distributed data structure, indicating that x values hash to the H1 slot, y values hash to the H2 slot, and z values hash to the H3 slot. A pointer may be placed at the end of each hash log to the first page of the next hash, so the hash table may be read as a single continuous log. For example, at the end of the last page in the H1 log containing x_n, a pointer may reference the first page of the next hash H2 containing y1. Similarly, at the end of the H2 log, another pointer may reference the first page of the H3 log.

Alternative Embodiments for Locally Distributed Data Structures

For range based database operations, the data structure above provides an ideal balance between minimally sorting data and efficiently maintaining the data in memory. In alternative embodiments, all or a portion of a locally distributed data structure may be optimized for searching for discrete values. Techniques described herein may be applied to create, transform, or copy all or a portion of a locally distributed data structure into a b-tree or b+tree. The b-tree and b+tree provide discrete search and sort benefits at the cost of using additional memory to create directory structure.

For example, the H1 slot has a hash log in FIG. 5C that may be transformed into a b+tree. In one approach, the hash log is sorted using a sorting algorithm (such as merge sort), and then the directory structure of a b+tree is created in layers. The first layer of directory nodes are added by allocating memory for each directory node on an as need basis. A first directory node is created and the largest entry from the first leaf node (42) is inserted into the first address of the first directory node. Then the last entry of the next leaf node (x5) is added to the next address of the directory node, and so on. Once a directory node is full, additional space is allocated for the next directory node in the first layer.

If more than one directory node is created as a result of extracting the largest entry from each leaf node, another layer of directory nodes is created using the same algorithm of extracting the largest entry from each first layer directory node to create a second layer of directory nodes. Layers are created until a layer includes only one directory node, known as the root node.

Unfortunately, this process is sequential and may not normally benefit from many cores working in parallel on different threads to create the b+tree. The entries of a higher level directory node require the entries of the lower level directory nodes to be complete. Additionally, some entries are read multiple times. For example, the entry '42' is read in both the construction of the leaf node (during sorting) and then later during creation of the first directory node. Reading the same entries multiple times may be computationally expensive if the entries for a particular node have already been paged out.

A preferable approach for creating a B+tree includes determining the number of data entries in a particular log, and then using multiple threads to construct multiple portions of the B+tree in parallel. Each leaf node has space for a set number of entries (usually to fit within the size of a page, i.e. 4 KB), and each directory also node has space for a set number of entries (usually also to fit within the size of a page, i.e. 4 KB), so a formula may be used to construct directory nodes using the first entry of each leaf node. Each sorted leaf node n_i, is placed in the following the equation to maximize the value of y:

$$n\_i = xb\hat{\ }y,$$

where n_i is the leaf node number, x is any constant integer, b is the amount of branching at any directory node, and the maximum integer y determines where the value for first fat pointer in the leaf node, n, is placed in the index structure. Preferably, each server has directory nodes that have 255 branches, which requires maximizing y in the equation $n\_i = x*255\hat{\ }y$. However, for simplicity the example has a branching factor of only four.

Figure 6A:
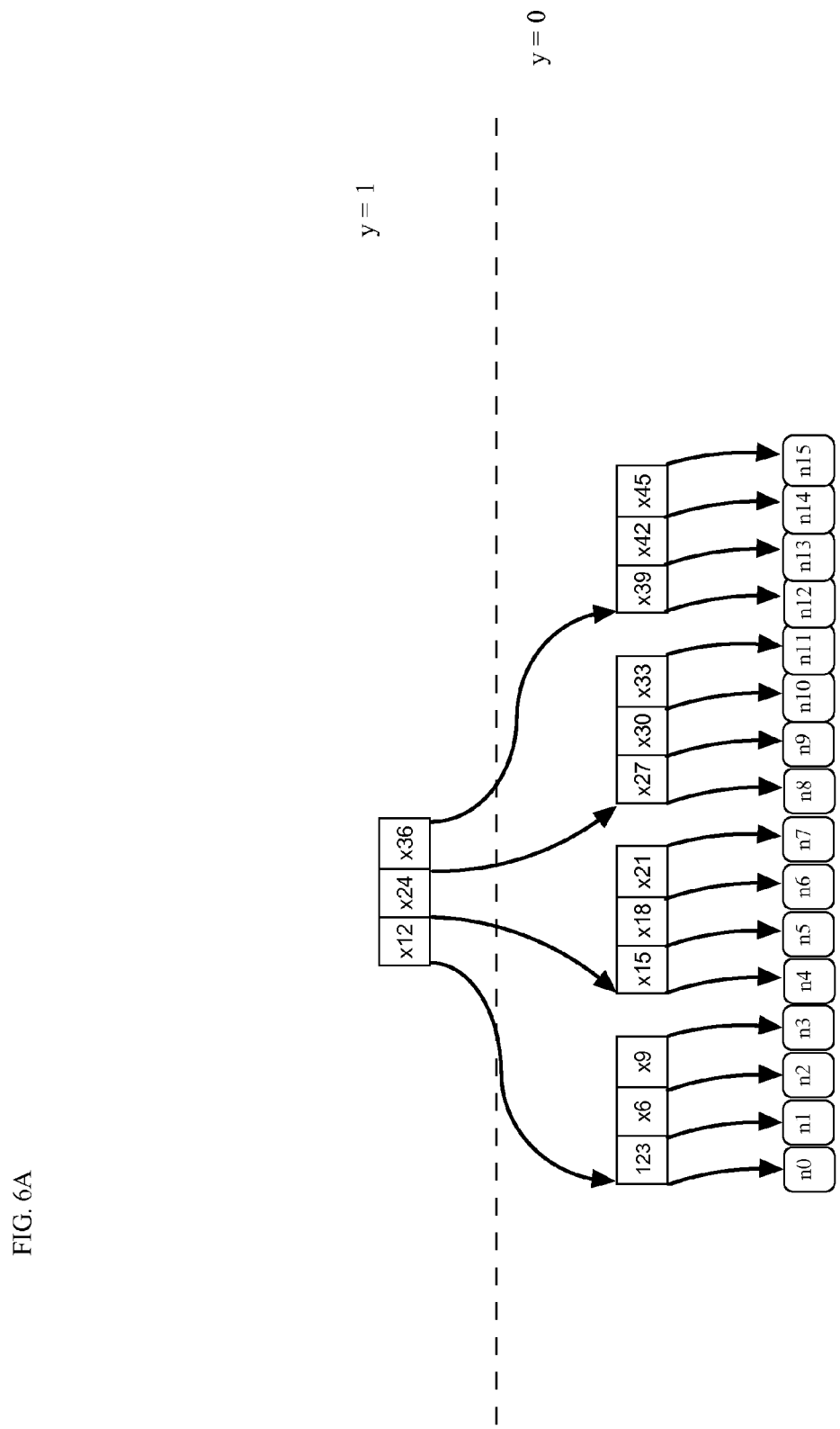
FIG. 6A is a block diagram illustrating a linked list from a local portion of a globally distributed data structure being transformed into a b+tree.

FIG. 6A is a bock diagram illustrating creating a first directory structure for a b+tree in a parallel process. There are a total of ninety-six entries for a total of thirty-two leaf nodes. Each leaf node is numbered sequentially (n0, n1, n2, ... ) as it is scanned. In FIG. 6A, a first thread is assigned the first forty-eight entries, which is a contiguous range of leaf nodes (0-15).

The leaf node n0 (starting with the fat pointer [3, 102, 2]) is the first leaf node, so a pointer is made to this leaf node, but no values are used from this node in a directory node.

The value in the first fat pointer ('123') in the second leaf node n1 is added to the $0^{th}$ level directory node because $1 = x*4\hat{\ }y$ can be solved with y having a maximum value of 0, when x=1, y=0.

Assuming more data is placed in fat pointers in this example:

The value of the first fat pointer (x6) in the next leaf node n2 is added to the $0^{th}$ level directory node because $1 = x*4\hat{\ }y$ can be solved with y having a maximum value of 0, when x=2, y=0;

The value of the first fat pointer (x9) in the next leaf node n3 is added to the 0th level directory node because $1 = x*4\hat{\ }y$ can be solved with y having a maximum value of 0, when x=3, y=0; and The value of the first fat pointer (x12) in the next leaf node n4 is added to the 1st level directory node because $4 = x*4\hat{\ }y$ can be solved with y having a maximum value of 1, when x=1, y=1 . . . and so forth.

Mathmatical Notation

Let the set of keys be K={x0, x1, x2, . . . , $x_m$} where xi≤xi+1 since we only write the serialized tree in a sorted manner and m represents the last value that is used as key. In this example, the number of fat pointers in a fully packed leaf node is three. Thus, each node n has three values that are used as keys:

$\{x_{3n}, x_{3n+1}, x_{3n+2}\}$ where $n \in \mathbb{Z}$, $0 \leq n < m/3$

The following notation defines whether a value $X_{3n}$ is used in a directory node.

$x, y \in \mathbb{Z}\ s.t. n = xb\hat{\ }y \& \forall y' > y \in \mathbb{Z}, \exists x' \in \mathbb{Z}\ s.t. n = xb\hat{\ }y$ In laymen's terms, this means that each sequentially numbered leaf node n can be plugged into the equation $n = xb\hat{\ }y$, where b is the branching factor, and solved for the max integer value of y such that x and y are both integers.

Creating High Tier Directory Nodes with Zero Data Movement

Figure 6B:
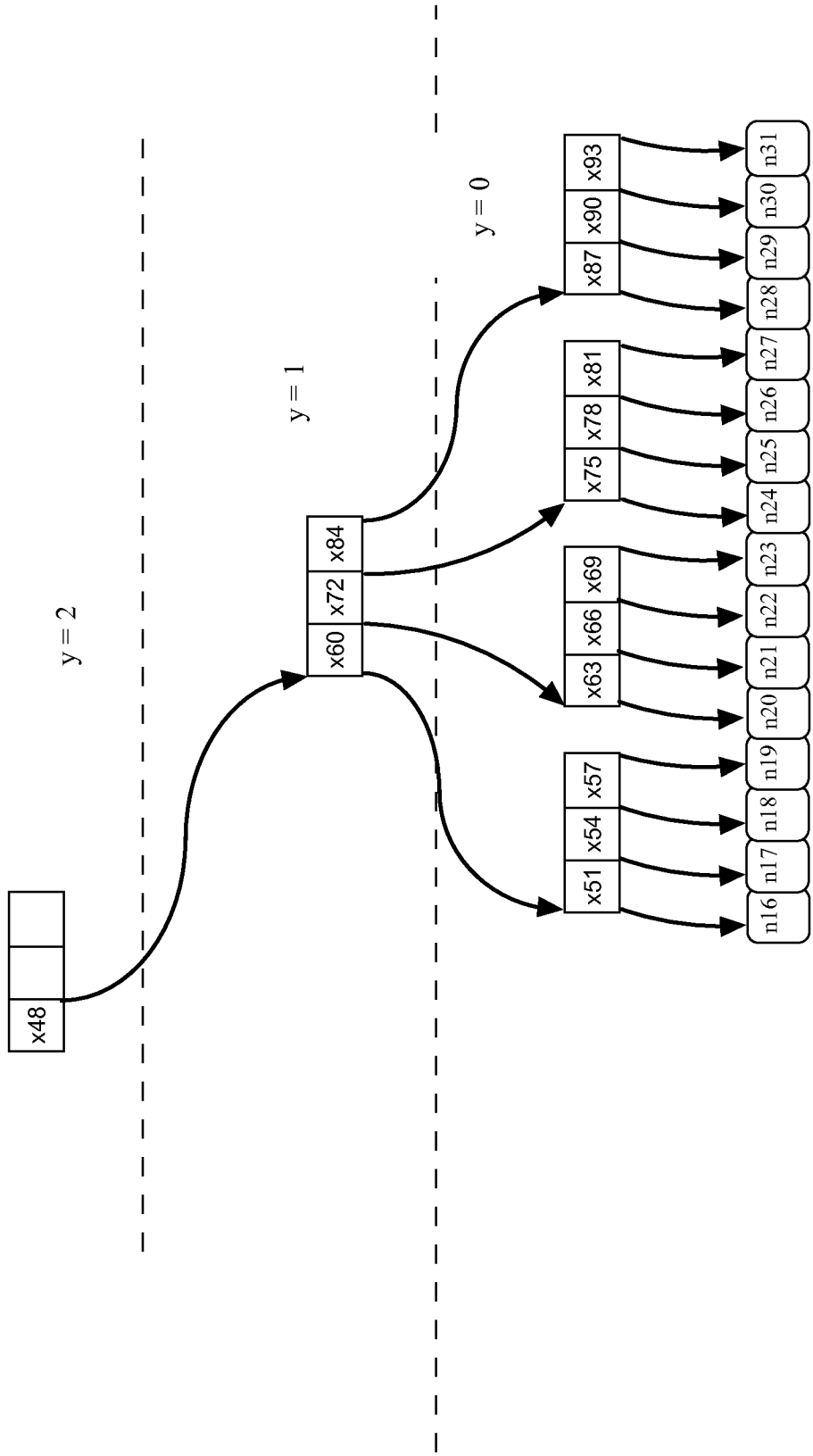
FIG. 6B is a bock diagram illustrating creating high tier directory structure for a b+tree in a parallel process.

In the following example the branching, b, is 4 (rather than the 256 we use in our database), but the number of fat pointers packed in each leaf node is still three. FIG. 6B is a bock diagram illustrating creating a directory structure for a b+tree in a parallel process. In FIG. 6B, a second thread is assigned the second forty-eight entries, which is a contiguous range of leaf nodes (16-31).

The value x48 from the first fat pointer in the node n16 is placed as a key and $n\_i = x4\hat{\ }y$ can be solved with y having a maximum value. The same algorithm is continued to determine whether the value x_i in the first fat pointer of each leaf node may be used as key in a directory node in the tree.

For example, for node seventeen, n=16:
16=x*4^y,
x=16, y=0
x=4, y=1
x=1, y=2

The solution with the largest y value 2 indicates that a key derived from the value from the first fat pointer in the node may be placed in a higher tier directory node. In this example, y=2 when x=2, so a key x48 derived from the first fat pointer in the leaf node n16 is in the y=2 layer. The value x48 may be placed as a root node without an intermediate node to point to yet. Continuing on:

The value of the first fat pointer (x51) in the next leaf node n17 is added to the $0^{th}$ level directory node because $17 = x*4\hat{\ }y$ can be solved with y having a maximum value of 0, when x=17, y=0;

The value of the first fat pointer (x54) in the next leaf node n18 is added to the 0th level directory node because $18 = x*4\hat{\ }y$ can be solved with y having a maximum value of 0, when x=18, y=0;

The value of the first fat pointer (x57) in the next leaf node n19 is added to the 0th level directory node because $19 = x*4\hat{\ }y$ can be solved with y having a maximum value of 0, when x=19, y=0;

The value of the first fat pointer (x60) in the next leaf node n20 is added to the 1st level directory node because $20 = x*4\hat{\ }y$ can be solved with y having a maximum value of 1, when x=5, y=1 . . . and so forth With the $1^{st}$ level directory node filled in, a reference may be made from the root node containing x48 to the $1^{st}$ level directory node containing x60.

Figure 6C:
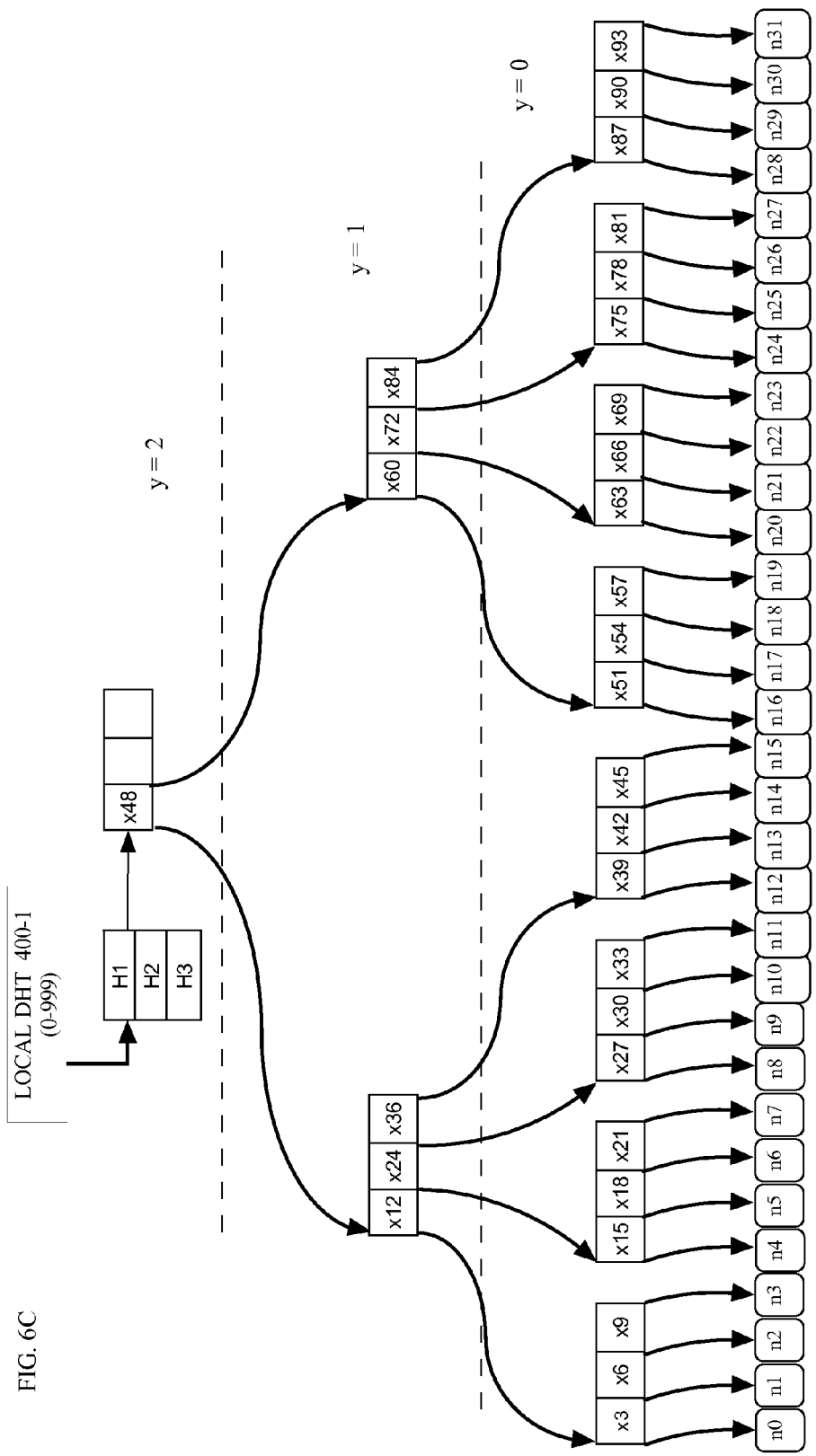
FIG. 6C is a block diagram illustrating a b+tree after the directory nodes have been combine to create the full tree structure.

Finally, once all of the directory nodes for both threads are complete, the two threads can be combine together. FIG. 6C is a block diagram illustrating a b+tree created using a parallel construction process. By dividing up the creation of the b+tree among two or more threads using a single formula, the entries in the b+tree only need to be scanned once. Furthermore, the entries are scanned in a parallel fashion, so a large amount of work is completed in a fraction of the time.

Balancing Directory Nodes in B+Trees Created in Parallel

The amount of data packed into the leaf nodes may result in hanging directory nodes. For example, adding a node n32 to the index structure (resulting in entry x96 added as a y=2 level node because x=2, y=2), there would need to be one directory nodes added to the tree that is not filled with entries. In cases where a directory node other than the root node is not fully packed, the directory nodes may be rebalanced with the sibling nodes in order to make the tree a legal B+-Tree. In this example, a new level y=1 directory node would be added to the tree, and the directory structure would be rebalanced so at least nodes n28-n32 have their own y=1 level directory node.

Note that the directory portion of a B+-Tree is actually a B-Tree. Thus, the same techniques may be applied to a B-tree.

Serializing "Cold" Index Structures for Persisting

Index structures that are not being used by the users or applications interacting with the cluster are referred to as "cold." Cold index structures are moved from volatile memory to a lower tier memory media as the volatile memory fills up. The additional space in the volatile memory (or higher tier storage media) is then used to create and store "hotter" data. These cold trees may be written to disk based media.

Disk based medias read and write data on a circular platter that rotates past a device called a read/write head. The read/write head can move to different areas on the platter with an actuator arm, but reading and writing by only rotating the platter is much faster. When data is moved from a random access media to a disk based media, accessing data becomes more efficient if the data is stored in linear arrays because disk read/write head stays stationary while the platter rotates.

In some embodiments, when index structures are stored on disk for auto-tiering purposes (or merely to persist the data), sorted/unsorted fat pointers are stored in a linear array on disk with accompanying metadata for their organization. In the case of a b+tree, the serialized structures written to disk includes only the leaf nodes. The directory nodes are removed from the data structure, so the entire index structure may be persisted quickly and with a minimum amount of metadata movement.

If a cold index structure becomes useful or "hot", it may be moved back to a higher tier of memory media. Using the same algorithm, the hash table for the index may be recreated when the index is moved back to the high performance random access memory or storage media.

Internal Data Represenation of Fat Pointers

In some embodiments, the value encoding of a fat pointer is a 64-bit number, and the location encoding of a fat pointer is a 64-bit number. There is metadata stored at the root of each local structure explains how to interpret this 128-bit integer.

While this 128-bit index may be used to quickly ascertain a value from a record and the location of a record in the cluster, these fat pointers take up a significant amount of memory. To more efficiently use memory in the system, in some embodiments, the fat pointers are encoded into skinny pointers. The word length of the metadata is reduced to the smallest number of bits possible using packing and encoding techniques described herein.

Creating a Skinny Pointer by Removing High Order Bits

In some embodiments, the values in fat pointers may inserted in a globally distributed data structure as 64-bit integers. However, simply by traversing the data structure holding the fat pointers, some of the high order bits stored within the fat-pointer may be determined. By removing these high order bits from the value portion of a fat-pointer, a fat pointer may be encoded in a more compact format.

Figure 7A:
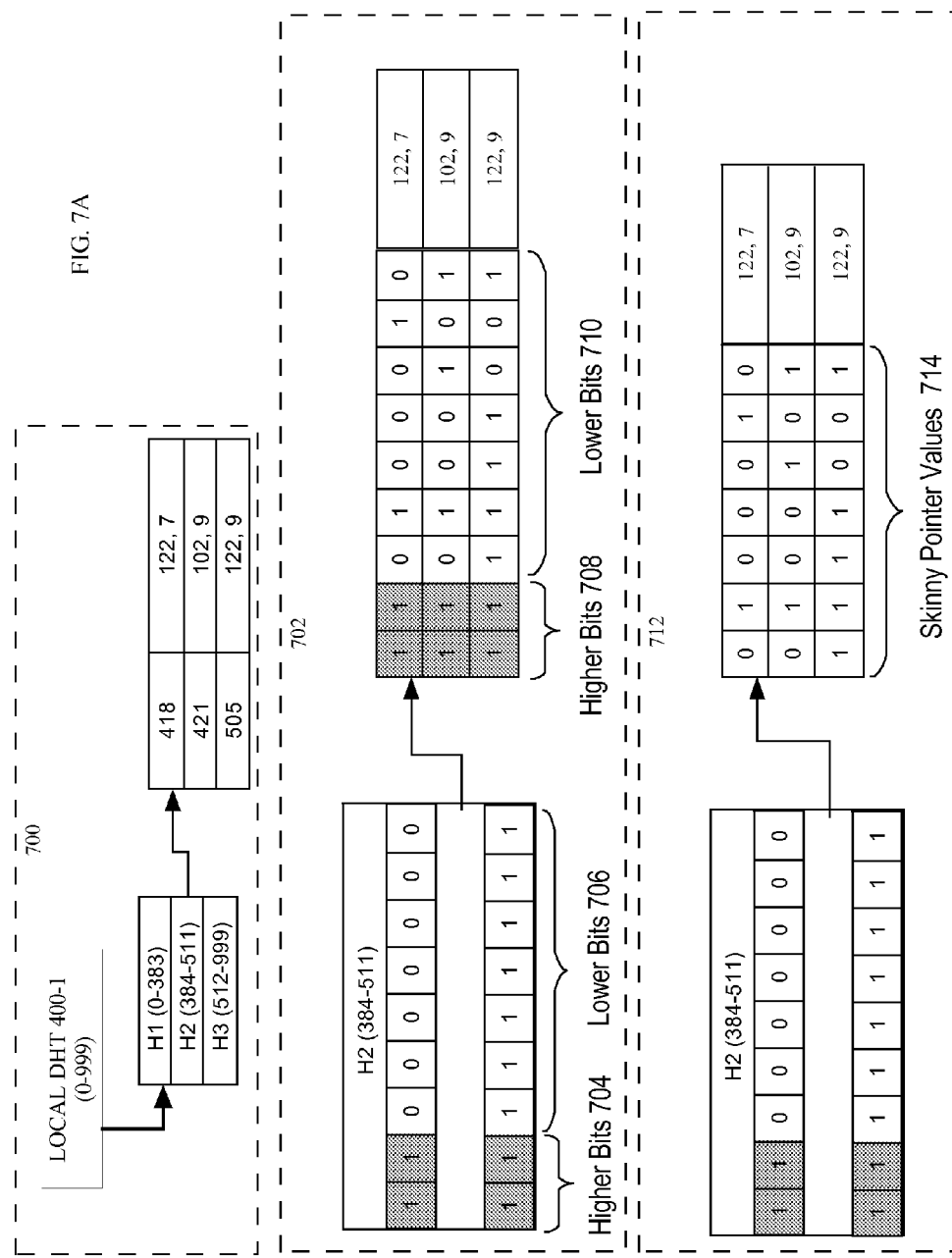
FIG. 7A is a block diagram illustrating the values of three fat pointers encoded into skinny pointers.

FIG. 7A is a block diagram illustrating a process for encoding three fat pointers in a compact format. For reference, the ranges from a range based hash function a page of fat pointers are depicted as integer values in area 700. The same range based hash and page of fat pointers is illustrated in area 702 with some integers depicted in binary. The higher order bits 704 corresponding to the range based hash are highlighted to show their similarity to the higher order bits 708 of the page. The higher order bits 708 are removed from the fat pointers in the page in area 712 because these bits are storing redundant information.

Globally Distributed Data Structure of Skinny Pointers

Figure 7B:
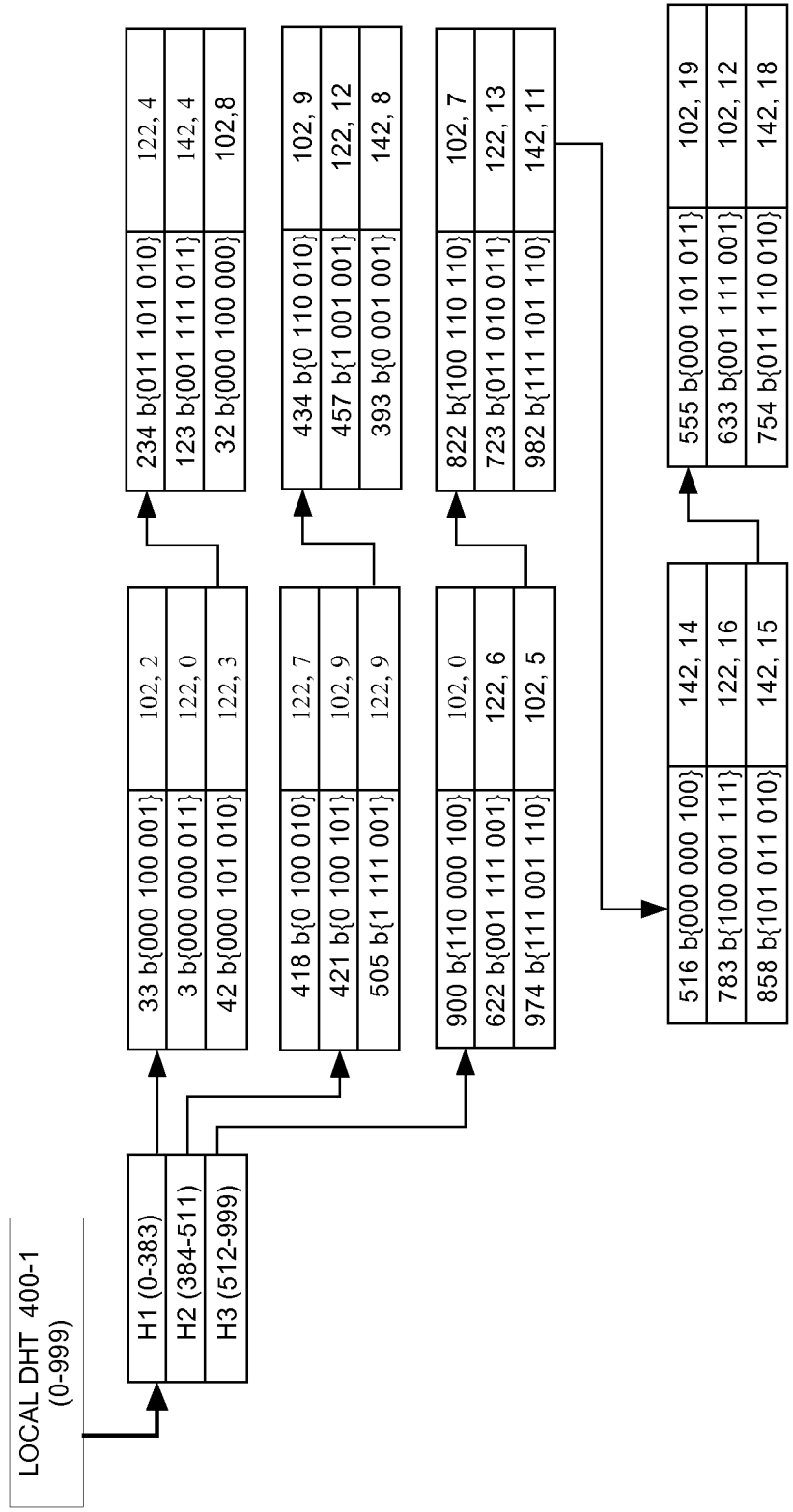
FIG. 7B illustrates how the number of bits required to store the values in skinny pointers may vary.

The number of bits required for storing values may be different based on the parent directory structure. FIG. 7B illustrates how the number of bits required to store the values in fat pointers may vary from hash log to hash log.

The value range in the H1 hash log is constrained by 0-383 and has 384 possible values. Therefore, each skinny pointer in the linked list of pages only requires ceil($\log_2 384$)=9 bits to encode values in these nodes.

The value range in the H2 hash log is constrained by 384-511 and has 128 possible values. Therefore, each skinny pointer in the linked list of pages only requires ceil($\log_2 128$)=7 bits to encode values in these nodes.

The value range in the H3 hash log is constrained by 512-999 and has 488 possible values. Therefore, each skinny pointer in the linked list of pages only requires ceil($\log_2$ 488)=9 bits to encode values in these nodes.

The number of bits saved for a hash based structure may be increased by decreasing the ranges produced by the range based hash function(s).

Figure 7C:
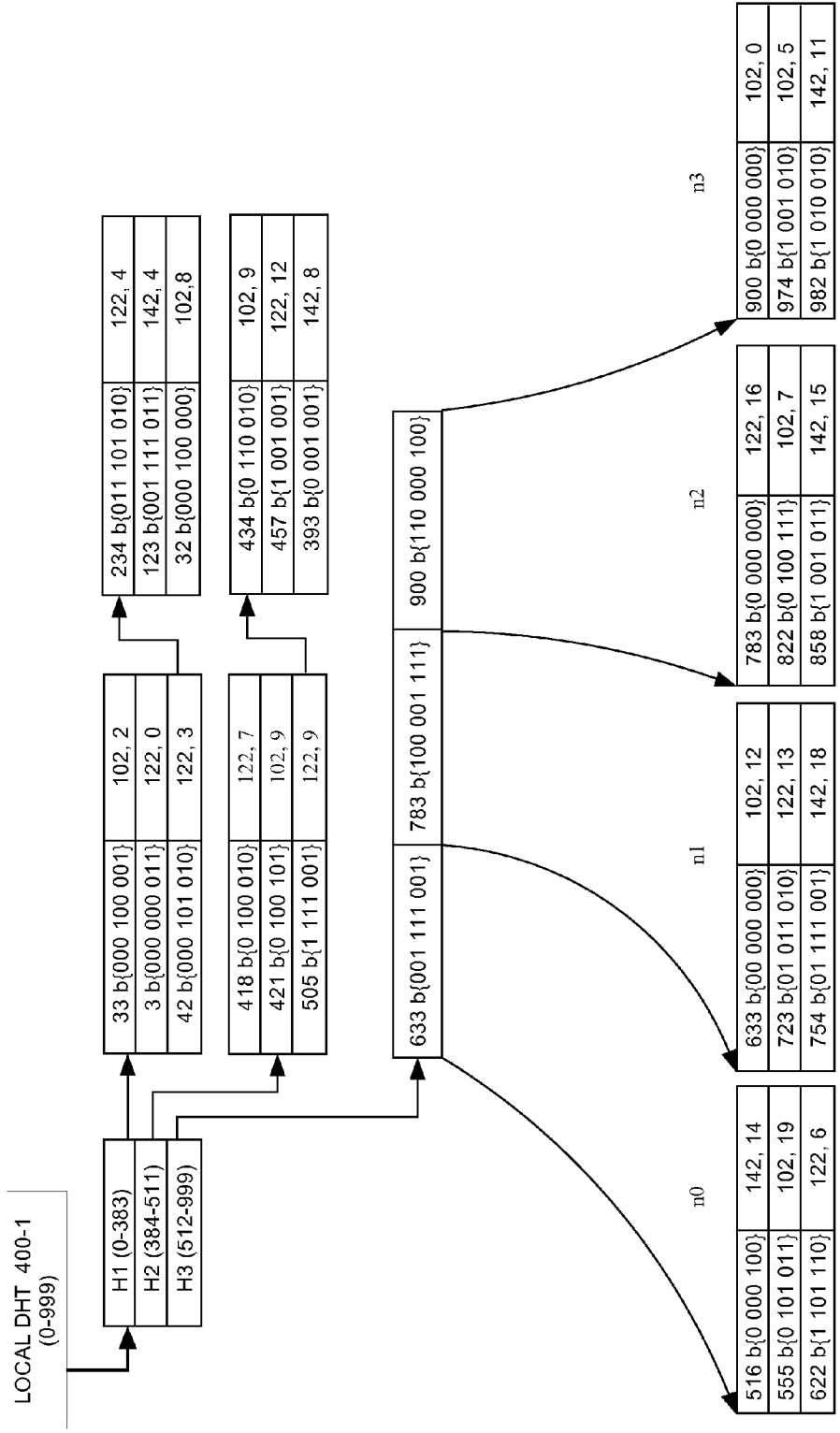
FIG. 7C is a block diagram illustrating a hash log transformed into a b+tree.

One subtle implication of this key encoding scheme is the savings based on the type of the index structure used. In the case where a log is transformed into a b+tree, as the height of a b+tree grows, the range indicated by the directory nodes above the leaf nodes shrinks on average. This in turn increases the number of bits that can be saved on average by encoding values from fat pointers into skinny pointers. For example, FIG. 7C is a block diagram illustrating a hash log transformed into a b+tree. The directory node with the values 633, 783, and 900 truncates the required word length for skinny pointers in each leaf node. The leaf nodes n0, n2, and n3 only require 7-bits to encode values in each skinny pointer because the ranges of possible values in these pages are less than 128-bits. The leaf node n1 only requires 8-bits to encode values in each skinny pointer because the range of possible values in this page is less than 256-bits. To determine the value of a fat pointer stored by a skinny pointer, the lowest possible value for the page is added to the value stored in the skinny pointer Skinny pointers may be returned back to fat pointers for transfer to other nodes using this formula.

Packing Location Data of a Fat Pointer

The location encoding of a fat pointer contains the server ID (NID) on which the record is present and the record ID within the node that encodes the data. Assuming a cluster size of n, ceil(log$_2$ n) bits are reserved for storing the server ID (where function ceil stands for ceiling). The rest of the location encoding is dedicated to storing a RecordId that is unique on an individual node. In some embodiments, a record ID is a monotonically increasing number beginning from 0 that is incremented each time a new record is loaded into that particular node. If each node can store up to a maximum of r records, then ceil(log$_2$ r) bits are reserved to store the R$_{Id}$. In total, location encoding requires (ceil(log$_2$ n)+ceil(log$_2$ r)) bits.

Probabilistic Location Encoding of Fat Pointers

In some embodiments, the location of a record within a fat pointer may be encoded by generalizing the expected location of a record. For example, the location encoding may include only the node that is expected to host the record. Once a server receives a request for a record based on a fat pointer with this type of encoding, the server searches for the record in its local dataset for that record. According to this embodiment, more memory is preserved in each node because less information is stored. However, the storage method is computationally more expensive because a server must perform a search both within the index structure and at the node that is expected to host the record.

In some embodiments, location encoding may include probabilistic approaches. In a probabilistic approach, a location encoding may only include higher order bits of a row ID to narrow down a possible location in an expected server location. In other probabilistic approaches, a fat pointer may include a percentage instruction of how much to of a local dataset should be scanned before reverting to a more systematic approach of searching for a record. Probabilistic approaches may include combinations of these approaches and other probabilistic approaches known in the art.

With probabilistic encoding, a server in the cluster is able to shrink the size of a fat pointer from 128 bits down to ceil(log 2 p)+ceil(log 2 $\bar{a}$) where p is the bit length of the probabilistic encoding scheme, and $\bar{a}$ is the average range size of keys on the bottom-most layer of a B+tree's internal nodes.

Segfault Tolerance

When the location of a fat pointer is incorrect, the server given the task of producing the record can search any number of nodes on the cluster to find the record based on the value contained in the fat pointer rather than the location data. The index structure hosting the fat pointer contains the key from which value came and the dataset from which the value came. Given this general knowledge, any computer may issue a command to search the cluster sequentially or in parallel for the record for that particular dataset that contains that key-value pair.

Load Balancing Fat Pointers in a Second Pass Process

As described when explaining FIG. 4, fat pointers are distributed across the cluster according to a range based distributed hash table ("DHT"). The initial distribution of fat pointers may result in a skewed distribution of data across the cluster. The function used for the DHT may be adjustable to balance an abnormal distribution of data.

Figure 8B:
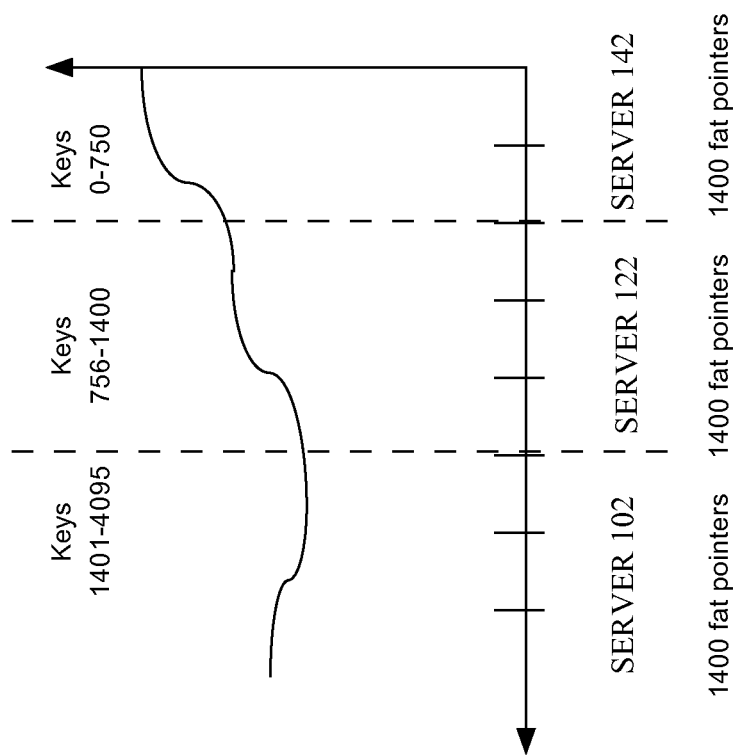
FIG. 8B shows how the count may be evenly distributed across three servers.

FIG. 8A is a box diagram illustrating how a server in the cluster counts keys to determine how to adjust the DHT. A server in the cluster counts the keys from each fat pointer into small evenly spaced ranges. For example, FIG. 8A shows the server 102 counting each value into ranges of 16. The server then takes the integral of this count and separates the small ranges into evenly spaced large ranges based on the number of nodes used in the cluster. For example, FIG. 8B shows how the count may be evenly distributed across three servers. The range based DHT is adjusted to reflect this new range partitioning.

The fat pointers are transferred in groups to sibling servers according to the new DHT. For example, fat pointers from server 102 are sent to 122, and fat pointers from server 122 are sent to server 142.

Deferred Load Balancing of Fat Pointers

In some embodiments, indexes are created during load, so further data may be loaded after the initial index structure is created. Rather than load balancing each time new fat pointers enter a distributed index, the fat pointers may be accumulated in a graph such as FIG. 8A. The DHT is not adjusted until the fat pointers assigned to a particular server reach a policy threshold amount. Ranges may be temporarily locked in order to ship fat pointers between servers. The cost of locking down this data should be offset by the increase in performance of rebalancing the fat pointers.

This temporary locking and transferring of fat pointers is relatively quick because it is only the transfer of metadata. The large records of data (stored in the local datasets) are not being shipped around cluster because the metadata need not reside on the same server as the data.

Using the Same DHT for Multiple Unique Keys

Figure 9A:
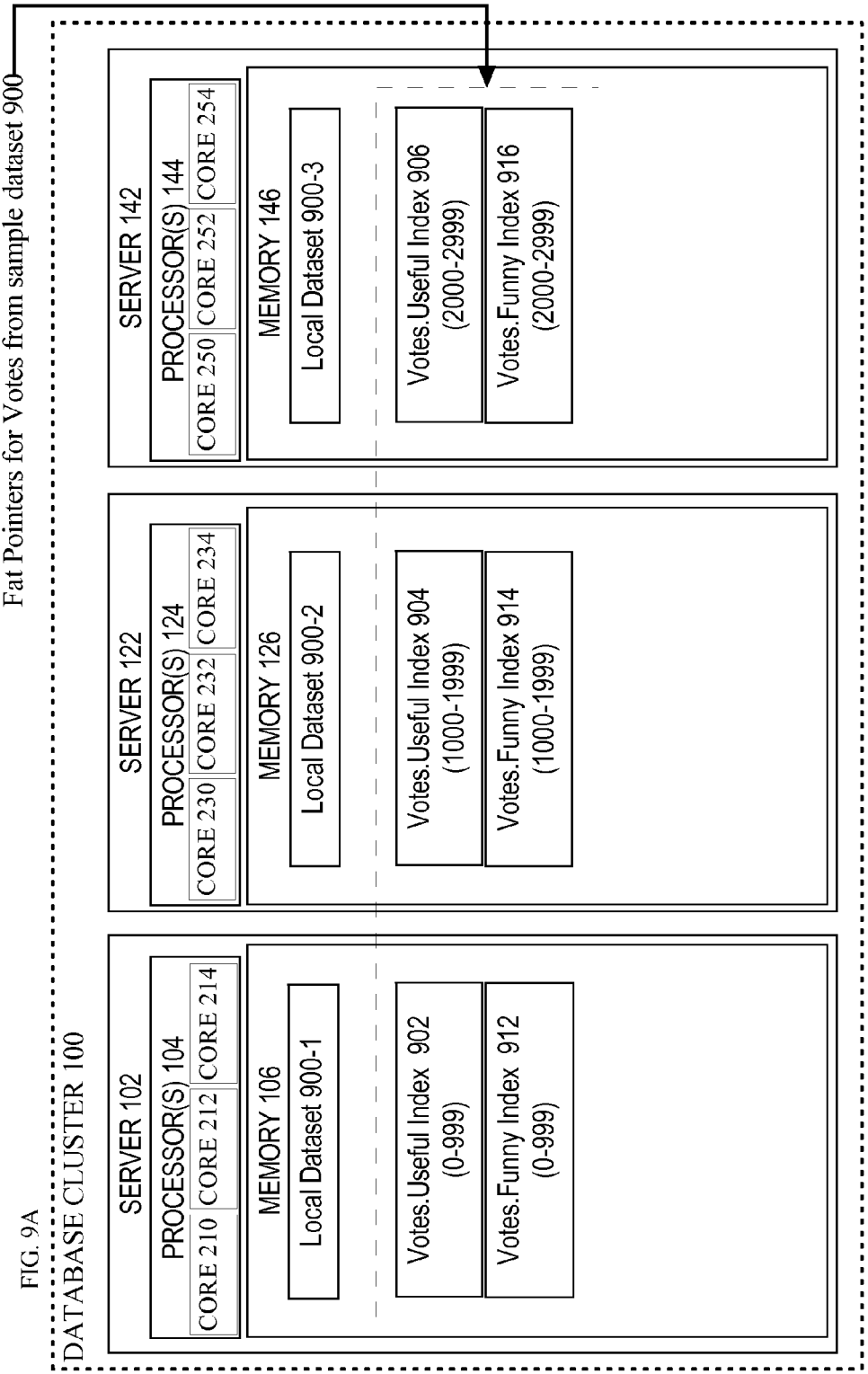
FIG. 9A is a block diagram illustrating a cluster with two distributed indexes hashed using the same range based DHT.

When creating additional distributed indexes, the same adjustable range based DHT may be used for distributing the new fat pointers. Because the keys are hashed in a similar manner, data items with the same key values are stored on the same server. FIG. 9A is a block diagram illustrating a cluster with two index structures hashed using the same range based DHT. The first distributed index has a unique key "VOTES.USEFUL" selected for indexing in a unique distributed index. An initial range based DHT is created for distributing the VOTES.USEFUL values from the sample set for the first data source.

the range of VOTES.USEFUL in server 102 is 0-999 for tree 902 the range of VOTES.USEFUL in server 122 is 1000-1999 for tree 904 the range of VOTES.USEFUL in server 102 is 2000-2999 for tree 906

The second sample dataset also has a unique key VOTES.FUNNY selected for indexing in a unique distributed index. The same range based DHT is used to distribute the fat pointers for the VOTES.FUNNY fat pointers.

the range of VOTES.FUNNY in server 102 is 0-999 for tree 912 the range of VOTES.FUNNY in server 122 is 1000-1999 for tree 914 the range of VOTES.FUNNY in server 102 is 2000-2999 for tree 916

Figure 9B:
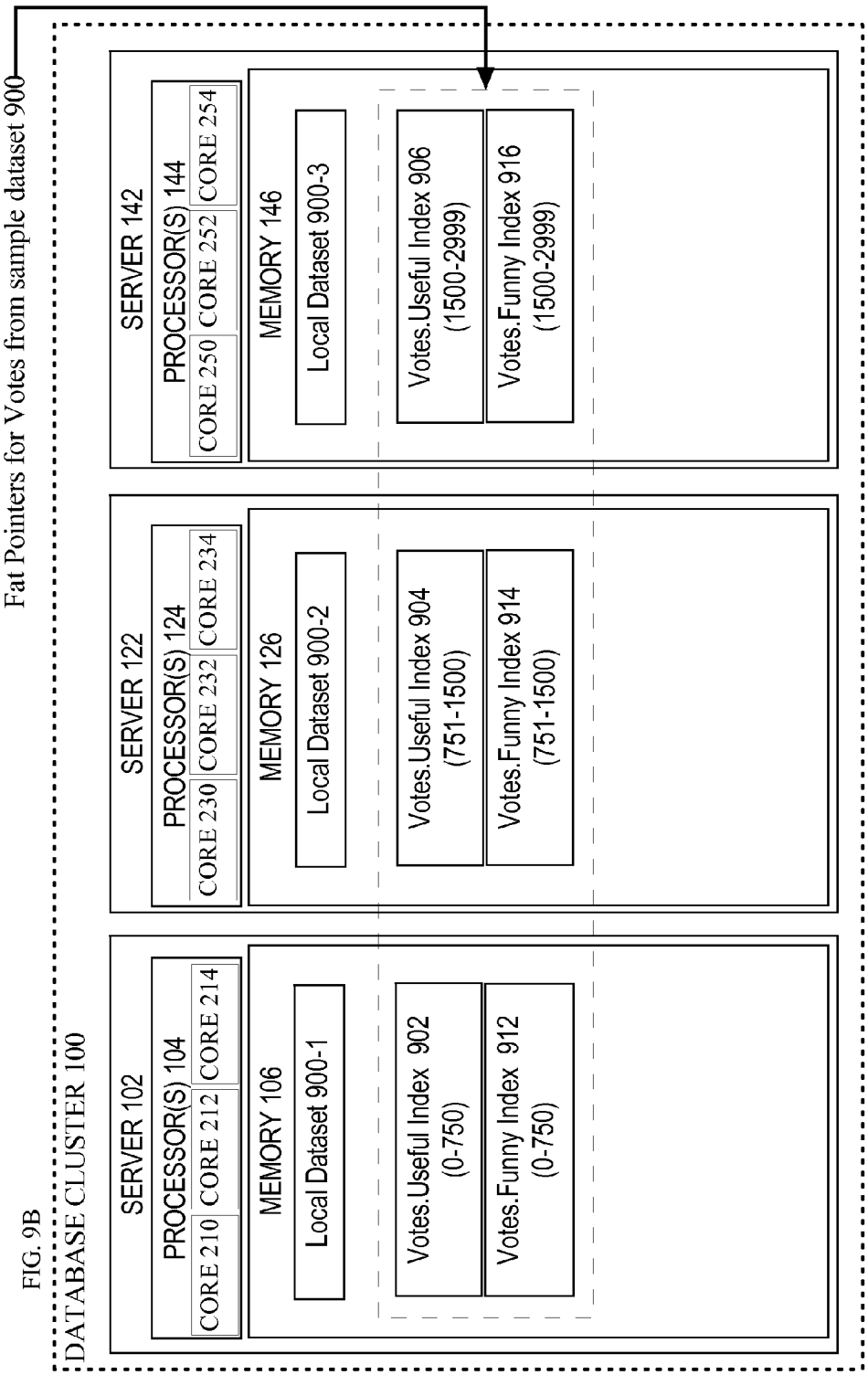
FIG. 9B is a block diagram illustrating a cluster with two distributed indexes rebalanced using the same range based DHT.

As a result, corresponding VOTES from the sample set from the first unique field and the second unique field are loaded into the same server. Even if the DHT is adjusted because a skewed distribution causes the number of fat pointers in a particular server to reach a threshold level, the corresponding VOTES fat pointers from both index structures are transferred among the servers together. FIG. 9B is a block diagram illustrating a cluster with two index structures rebalanced using the same range based DHT. The rebalancing results in different ranges assigned to each server.

the range of VOTES.USEFUL from tree 902 and VOTES.FUNNY from tree 912 in server 102 is 0-750 the range of VOTES.USEFUL from tree 904 and VOTES.FUNNY from tree 914 in server 122 is 751-1500 the range of VOTES.USEFUL from tree 906 and VOTES.FUNNY from tree 916 in server 142 is 1500-2999

Value Arrays as Entries in Globally Distributed Data Structures

An entry in a globally distributed data structure may include a value array rather than only one fat pointer or skinny pointer. A value array contains one or more fat pointers and/or immediate values that together form a record. For example, the output of a JOIN operation includes a result set organized in a globally distributed data structure where every entry has a two element value array. The first element in the value array is a fat pointer to a record from a first dataset, and the second element in the value array is a fat pointer to a record from a second dataset. The joined record is represented by the union of the records referred to by both fat pointers in the value array.

Value arrays may contain one or more immediate values as an element in the array. In some embodiments, immediate values are included when the cluster receives a command that indicates the user desires to augment a schema. For example, the cluster may receiving a command for creating a key VOTES.SUM from VOTES.FUNNY+VOTES.USEFUL. In this example, each value array may contain a fat pointer for VOTES.FUNNY in the first element, a fat pointer for VOTES.USEFUL in the second element, and an immediate value of the sum of the value from the fat pointer in VOTES.FUNNY and the value from the fat pointer in VOTES.USEFUL.

In some embodiments, a value array may be encoded to compact the size of one element based on a value or location from a fat pointer in another element. For example, when each value array entry is created based on a JOIN operation with the condition that two keys have the same value, the value may only be contained in one fat pointer, while the other fat pointer is truncated to only contain the location of the second record. Similarly, when each value array entry is created based on a database operation that augments the schema of a record using two or more keys from the same record, the location of the record may only be recorded in one fat pointer, while the other fat pointer(s) contain the additional value(s).

Creating a Dictionary of Fields During Load

During load, a server assigned to load a particular record also parses the distinct fields in each record that it loads. The distinct fields discovered in each record are loaded into a dictionary of unique field names. The field names are stored in a dictionary of fields as fat pointers in a radix tree data structure with the key being the unique name of the field and the value being the OID of the object that contains the key. The distinct names may be hierarchy specific (NAME≠FRIENDS.NAME); schema specific ({NAME, FRIENDS}≠{FRIENDS, NAME}); dataset specific (NAME from sample set X≠NAME from sample set Y); primitive type specific (NAME (int)≠NAME (string)); or unspecific.

FIG. 10A is an example of the format the two sample datasets 1010, 1020. These datasets may be granted an OID through the microkernel. Additionally, an index may be created and granted an OID through the microkernel. Thus, the OID location of a particular field may be an index or dataset.

Figure 10B:
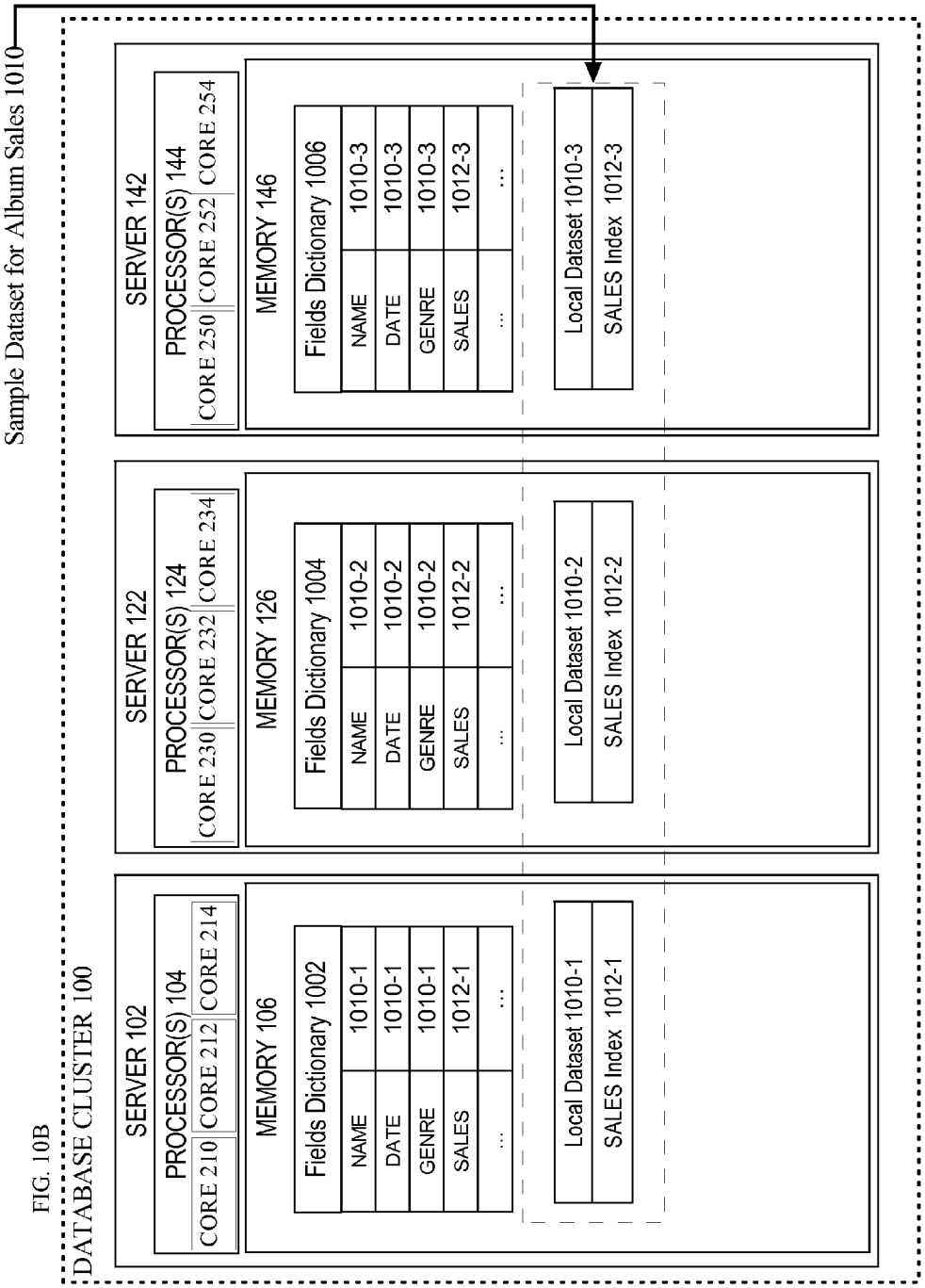
FIG. 10B is a block diagram illustrating a dictionary of unique fields as data is loaded from one dataset.

FIG. 10B is a block diagram illustrating an example dictionary of unique fields after the Album sample dataset 1010 is loaded. Fields are extracted from dataset 1010 and recorded in a field dictionaries 1002, 1004, 1006. An independent dictionary 1002, 1004, 1006 is located on each server 102, 122, 142 in the cluster 100, so the OID location refers to the local portion of the database object. Since each server only populates a local dictionary, fields from the same dataset are likely recorded in the dictionaries of multiple servers.

In FIG. 10B, only one key (SALES) has been selected by the user, so only one key has been published to an index (distributed across 1012-1, 1012-2, 1012-3) at this time. The rest of the key-value pairs are only accessible by searching the local datasets 1010-1, 1010-2, 1010-3.

Field dictionary 1002 records the Album fields including NAME, DATE, and GENRE, as located in local dataset 1010-1 and the field SALES as located in a local portion of distributed index 1012-1

Field dictionary 1004 records the Album fields NAME, DATE, and GENRE, as located in local dataset 1010-2 and the field SALES as located in a local portion of distributed index 1012-2

Field dictionary 1006 records the Album fields NAME, DATE, and GENRE, as located in local dataset 1010-3 and the field SALES as located in a local portion of distributed index 1012-3

Figure 10C:
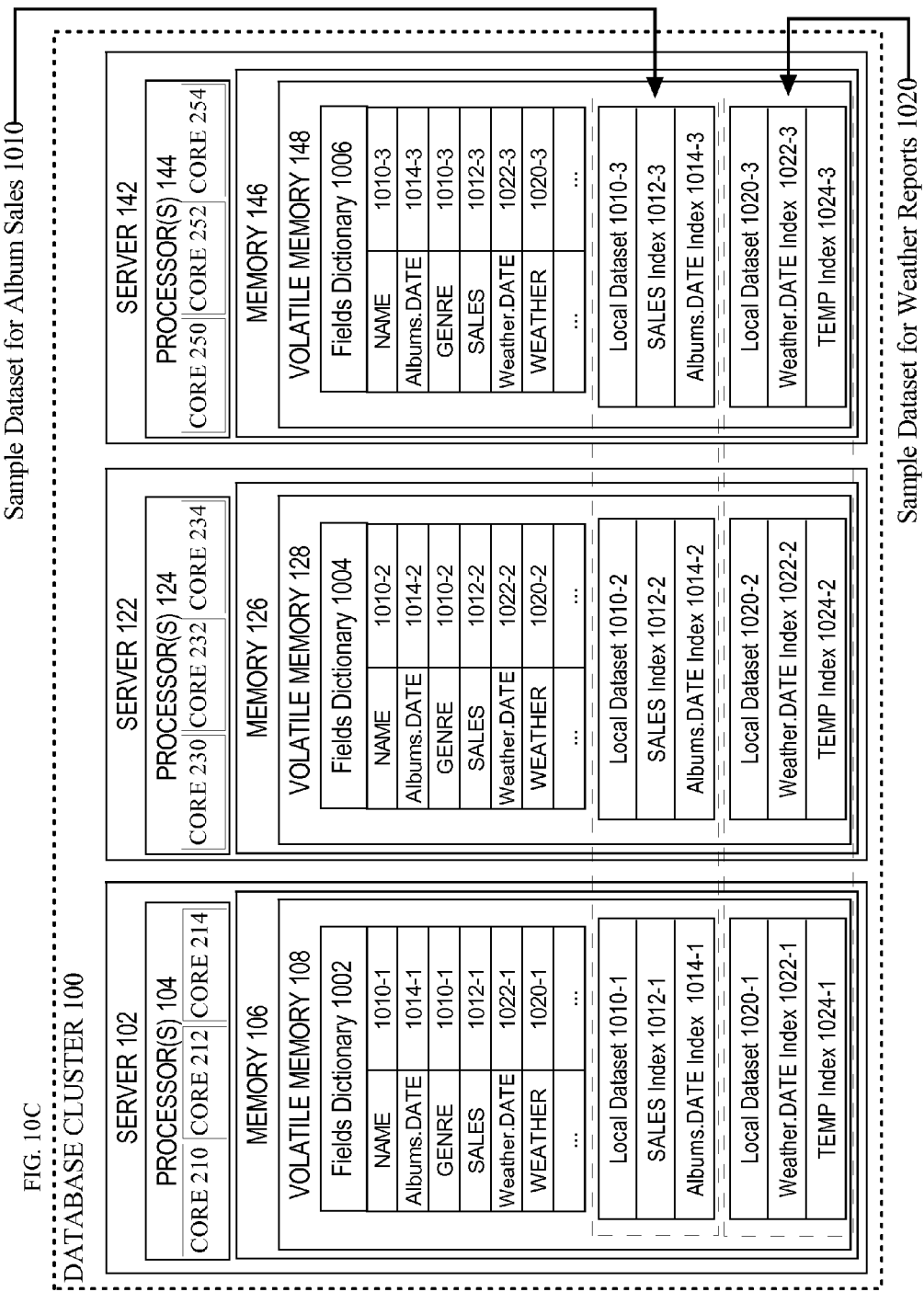
FIG. 10C is a block diagram illustrating a dictionary of fields as data is loaded from two sample datasets.

The dictionary of unique fields aggregates the fields of every sample dataset uploaded to the cluster. These sample datasets may be uploaded by different users or by the same user. FIG. 10C is a block diagram illustrating a dictionary of fields from two sample datasets. The first sample dataset 1010 is from the raw data source of album sales in FIG. 10A and is distributed into local datasets 1010-1, 1010-2, 1010-3. The second sample dataset 1020 is from a raw data source of weather reports from FIG. 10A and is distributed into local datasets 1020-1, 1020-2, 1020-3. SALES distributed index 1012-1, 1012-2, 1012-3 and DATE distributed index 1014-1, 1014-2, 1014-3 are created based off of the sample dataset 1010 of album sales. DATE distributed index 1022-1, 1022-2, 1022-3 and TEMP distributed index 1024-1, 1024-2, 1024-3 are created based on the weather sample dataset 1020.

Reduced Operation Database

The cluster 100 is configured to perform a reduced set of operations on the keys located in the dictionary of fields or on the results of a previous operation. The database operations are performed against data as stored in the local datasets or against data as stored in fat pointers. In a preferred embodiment, each server in the cluster is configured to receive one of four operations for performing on all of the data items corresponding to a particular field from a particular dataset. The four operations include FILTERS, AGGREGATES, SORTS and JOINS (FASJ).

Figure 12:
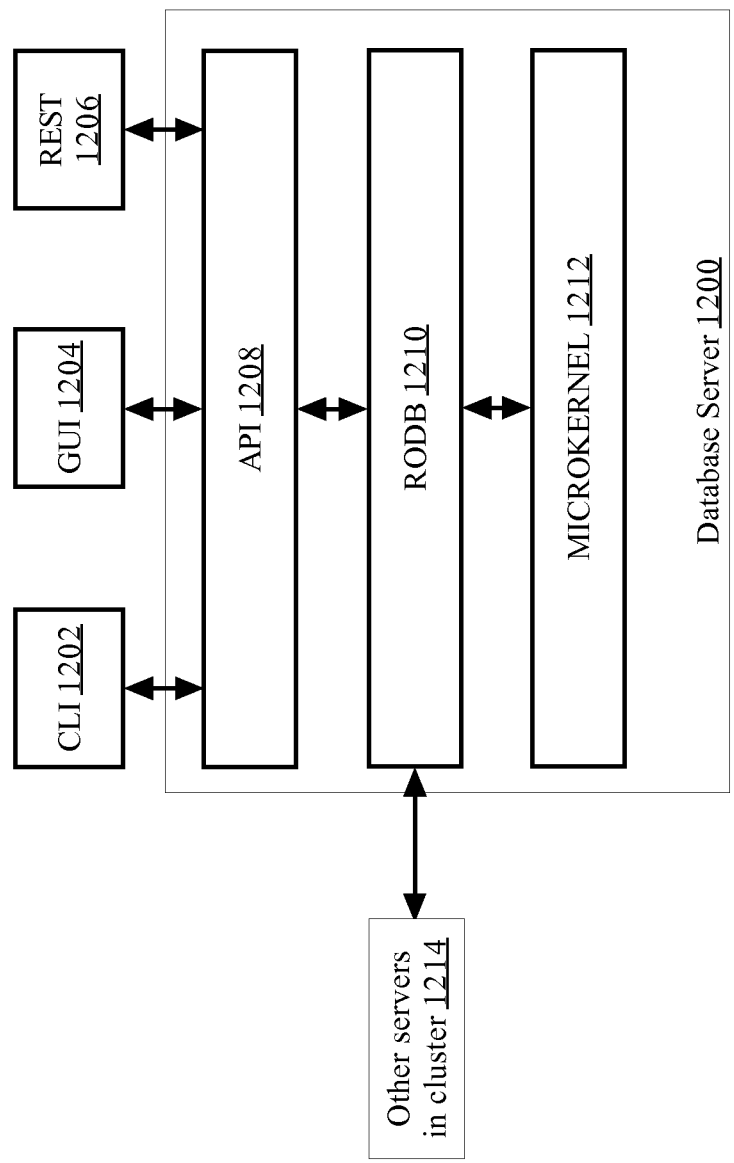
FIG. 12 is a block diagram illustrating system software in each database server.

FIG. 12 is a block diagram illustrating system software in each database server. In the embodiment illustrated in FIG. 12, a server 1200 (for example 102, 122, 142) receives input from a command line interface 1202, a graphic user interface 1204, or a REST endpoint 1206. The REST endpoint 1206 is preferably configured to receive and return JSON files, but the system may be configured to receive and return other file types such as CSV. One or more of these interfaces 1202, 1204, 1206 executes on a client computer, and the interface communicates with the database server 102 through an API 1208.

Application Programming Interface 1208 provides a set of routines, protocols, and tools for building software to employ the database cluster 100. The API 1208 provides commands for importing and exporting data, and for performing database operations such as filters, aggregates, sorts, and joins.

The reduced operation database engine 1210 divides work specified by input received into a combination of one or more basic database operations comprising: filters, aggregates, sorts, and joins. A separate execution plan is then created for each different operation. The work for each particular operation is distributed to other servers 1214 in the cluster 100 based on the execution plan. Each operation is performed atomically on data items parsed from one or more sample datasets. In some embodiments, hardware is configured in each server to optimize the execution of specific operations such as filters, sorts, aggregates, and joins.

Constant Response Times for Performing Database Operations

Records from semi-structured datasets have a variable record size. Because there is little control over record size, scanning large amounts of records for each database operation could cause a user to lose interest in exploring the schemas of a sample dataset. A database operation that takes more than thirty or so seconds is generally considered a long running operation. For example, the cluster may receiving a command for performing against the ALBUMS sample dataset to AGGREGATE by GENRE. The GENRE field has not been indexed, so the entire sample dataset 1010 is scanned.

However, the system has many reasons, described herein, to create globally distributed data structures before they are needed, so the database operations may be performed against fat pointers rather than the native format records. When each server performs work against a globally distributed data structure, only values corresponding to the appropriate key are scanned, so that records that do not contain values corresponding to a particular key are skipped entirely. This allows the cluster to perform work against arbitrary types of data in a constant amount of time despite the variable size of the records.

For example, in FIG. 10C a few keys (SALES, DATE) were selected by a user as relevant from sample dataset 1010. The keys were indexed accordingly, and distributed indexes were created.

Fat pointers for the SALES field are in distributed index 1012-1, 1012-2, 1012-3

Fat pointers for the Albums.DATE field are in distributed index 1014-1, 1014-2, 1014-3

The user also desired to see if there is a relationship between album sales and temperature on the date the album was released, so the user also selected a few keys (DATE, TEMP) as relevant from the sample of the weather reports dataset 1020.

Fat pointers for the Weather.DATE field are in distributed index 1022-1, 1022-2, 1022-3

Fat pointers for the TEMP field are in distributed index 1024-1, 1024-2, 1024-3

The user then performs a JOIN operation on the sample datasets 1010, 1020 based on the condition that the Albums.DATE key equals the Weather.DATE key. Rather than scanning all of the records in datasets 1010 and 1020, the Album.dates distributed index 1014-1, 1014-2, 1014-3 and Weather.dates index 1022-1, 1022-2, 1022-3 are evaluated based on the join predicate Albums.DATE=Weather.DATE.

Using Globally Distributed Data Structures for Result Sets

Each server in the cluster 100 performs their portion of work and creates one or more distributed result sets of fat pointers based on the operation received. The distributed result sets may be used in subsequently received database operations. A globally distributed data structure is created with a unique OID generated from microkernel 1212, so a distributed result set may be referenced in subsequent operations. Fat pointers in the distributed result set are determined based on the database operation received, and distributed in the same type of globally distributed data structure as described in FIGS. 3-5C.

Figure 11A:
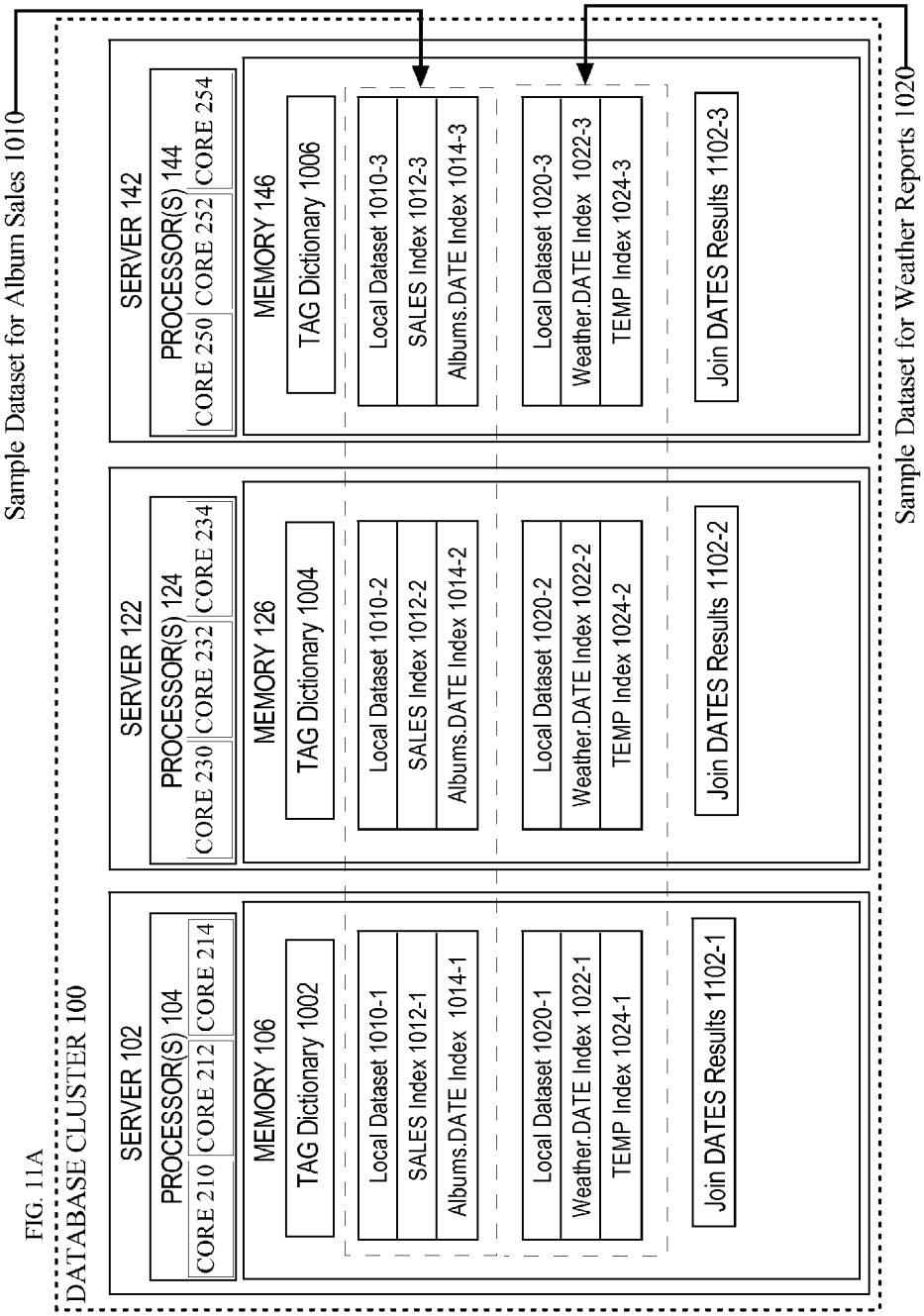
FIG. 11A is a block diagram illustrating a distributed result set after a JOIN operation.

FIG. 11A is a block diagram illustrating a distributed result set after a join operation. The resulting distributed result set 1102 of fat pointers is stored in a globally distributed data structure with a value array of fat pointers for each entry. The first element in the value array of fat pointers has an Albums.DATE result fat pointer, and the second element in the value array of fat pointers has the Weather.DATE result fat pointer. Each value array of fat pointers in distributed result set 1102 is distributed into local data structures 1102-1, 1102-2, and 1102-3 by hashing the value that was equal between the two keys using a global range based hash function to determine the appropriate server, and then hashing the value that was equal between to the two keys using a local range based hash function to determine which log to add the entry to.

Iterative Operations on Distributed Result Sets

The process may be repeated in an iterative process of (1) receiving an operation to be performed against data in a distributed result set and (2) creating a child distributed result set of fat pointers with the results from the parent distributed result set.

Figure 13A:
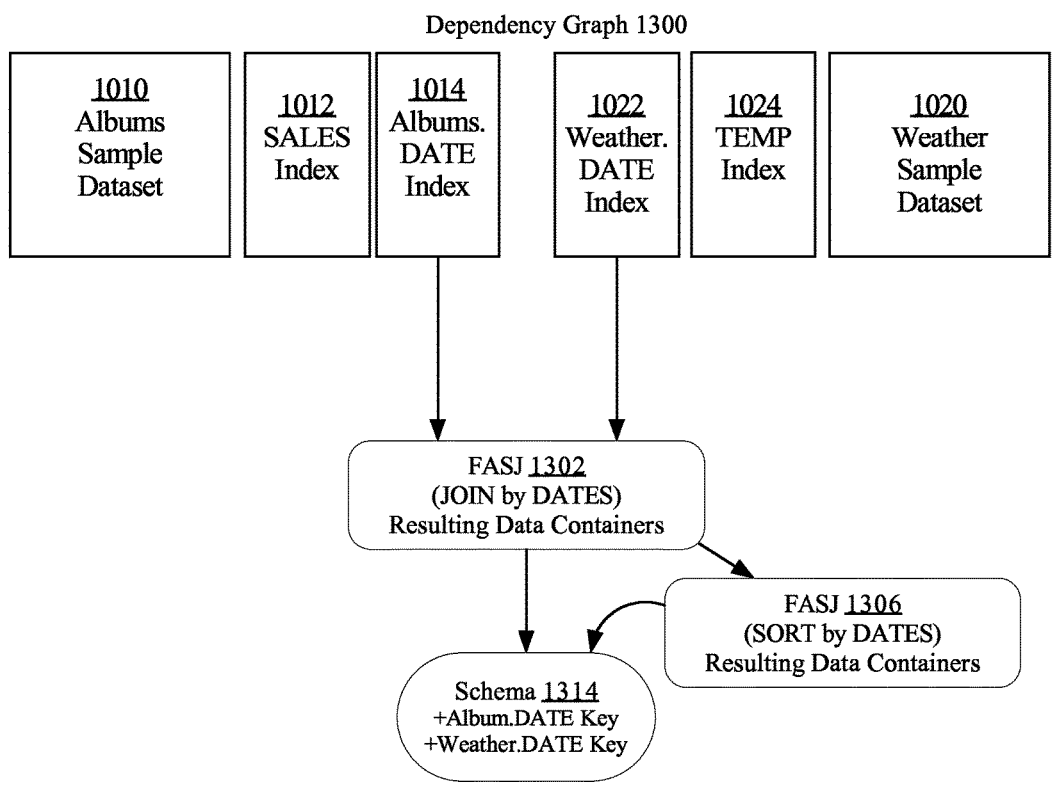
FIG. 13A is a dependency graph illustrating a client's interactive exploration of one or more datasets.

FIG. 13A is a dependency graph illustrating a client's interactive exploration of one or more datasets. The initial nodes 1010, 1012, 1014, 1022, 1024, and 1020 represent data containers created during load. At block 1302 the cluster 100 performed an FASJ operation (in this case a JOIN operation) as previously described. A server 102 in the cluster 100 then received a command from the user to perform a SORT operation. Using the distributed result set 1102 from the JOIN operation, the user performs a SORT operation on the joined DATES column of the JOIN operation to get sorted results at node 1306. The cluster may perform this SORT operation against the fat pointers from the distributed result set 1102-1, 1102-2, 1102-3.

After the operation is complete, a server in the cluster records the keys that were used in this chain of operations. For example, at block 1314, the keys for Album.DATE and Weather.DATE are recorded as useful.

Efficient Use of Distributed Structures

The system does not need to create a new distributed result set for all operations. In some situations, the system may be configured to take one or more previously created distributed result sets and manipulate the fat pointers in the distributed result set in response to a database operation. For example, a SORT operation does not require a new distributed result set. Instead, the system may take the distributed result set 1102 of the parent operation and sort the fat pointers contained in that globally distributed data structure. Thus, the system image depicted in FIG. 11A may accurately depict the resulting data containers both at node 1302 and at node 1306.

Using Globally Distributed Data Structures as Result Indexes

The fields originally selected by the user may be contained in records referenced by fat pointers in the distributed result set. For example, the JOIN by DATES result set 1102 may only contains values for DATES, but the records referenced by the fat pointers in the result set also contain fields for SALES and TEMPERATURE. An index may be created using the subset of records contained in the distributed result set. Because these distributed indexes are created based on records referred to in a distributed result set, they are referred to herein as result indexes.

Figure 11B:
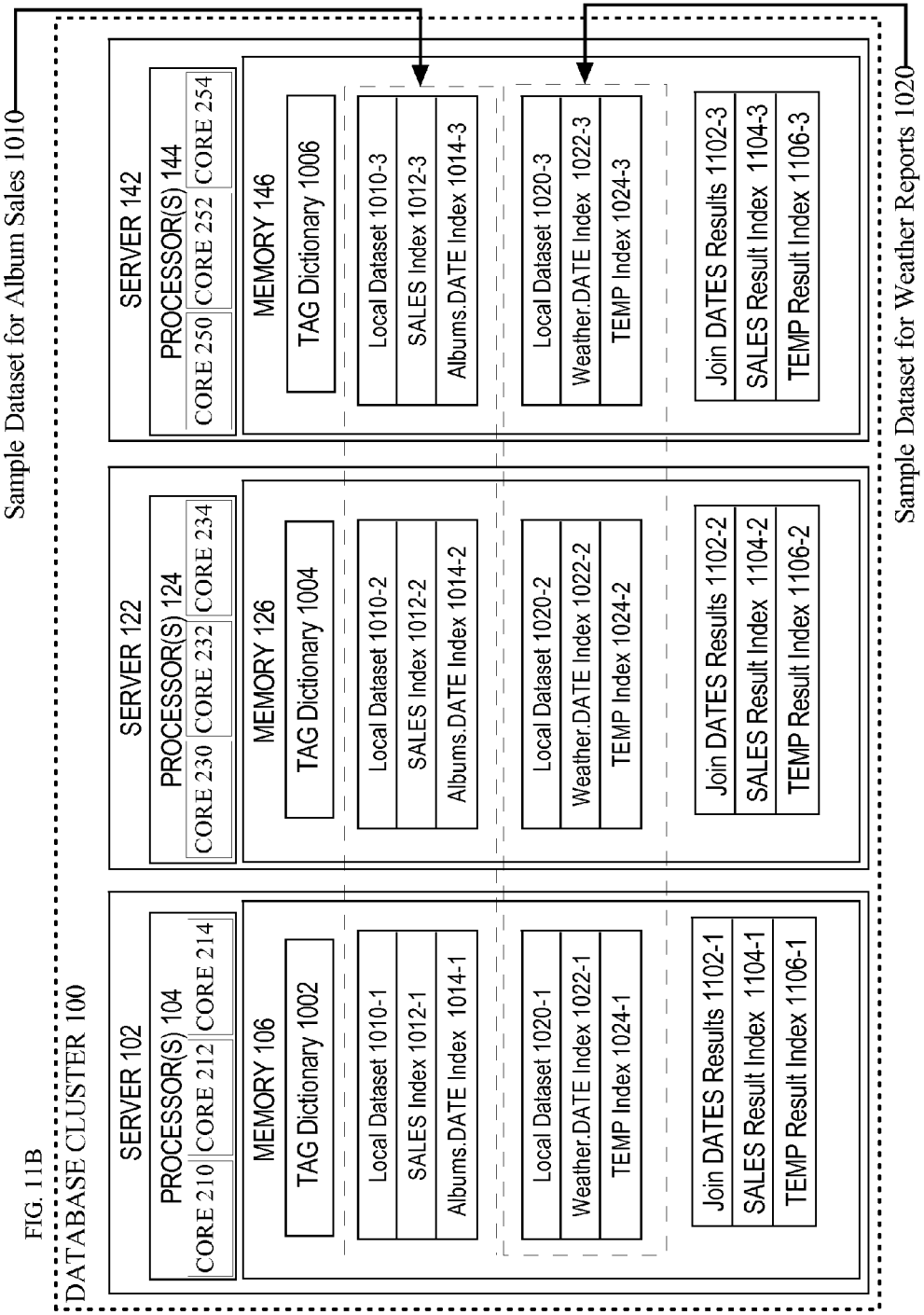
FIG. 11B is a block diagram illustrating distributed result indexes created based on the distributed result set.

FIG. 11B is a block diagram illustrating distributed result indexes created based on the distributed result set from the join operation with the condition of Albums.DATE=Weather.DATE.

- Sales results index 1104-1, 1104-2, 1104-3 contains an index of the records with a SALES field referenced by the fat pointers in the distributed result set 1102-1, 1102-2, 1102-3
- Temp results index 1106-1, 1106-2, 1106-3 contains an index of the records with a TEMP field referenced by the fat pointers in the distributed result set 1102-1, 1102-2, 1102-3

Result indexes may also be used in subsequent operations. For example, a user may wish to compare SALES to TEMPERATURE, so a server 102 in the cluster 100 receives a command to perform the database operation SORT by SALES for the results of the JOIN operation. The cluster performs the operation against fat pointers in the SALES result index 1104-1, 1104-2, 1104-3 rather than performing the operation against the SALES distributed index 1012-1, 1012-2, 1012-3 or the native format local datasets 1010, 1020.

Figure 13B:
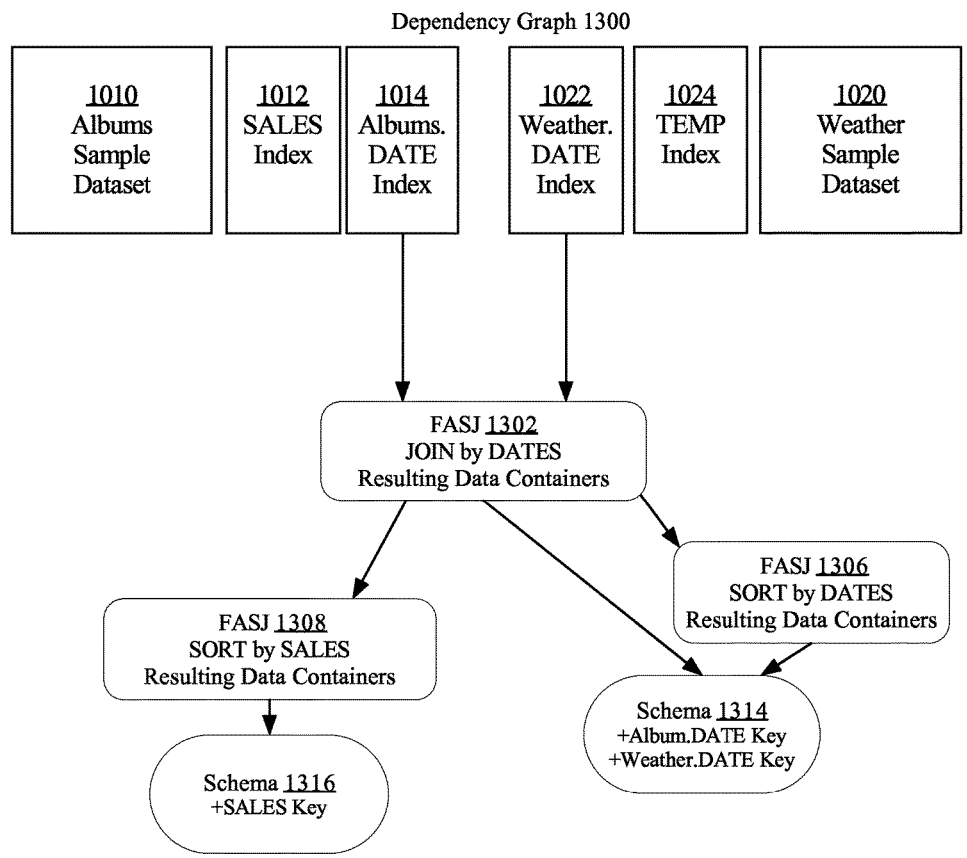
FIG. 13B is a dependency graph illustrating how results of a parent database operation may be used as input for a child database operation.

After performing the operation, a server in the cluster updates the dependency graph from FIG. 13A. FIG. 13B is a dependency graph illustrating a client's interactive exploration of one or more datasets after performing the SORT operation on the SALES distributed result index At node 1308, the SORT by SALES operation is recorded in the dependency graph. At node 1314, the keys for getting the results of the SORT by SALES operation are recorded as useful.

Removing Globally Distributed Data Structures from Memory

The memory available in a particular cluster is finite. Globally distributed data structures are serialized and persisted on disk as memory limits are approached. Slower performance disk storage 118, 138, 158 may be available within the servers 102, 122, 142 in the cluster 100 or in one or more storage devices or services outside the cluster 100.

Structures that are less frequently used are removed before structures that are more frequently used. These structures are said to contain "cold" data. Future subordinate indexes may not be created if a field is cold. The threshold rate of use required for a particular structure or field to be cold may be defined by policy.

Figure 11C:
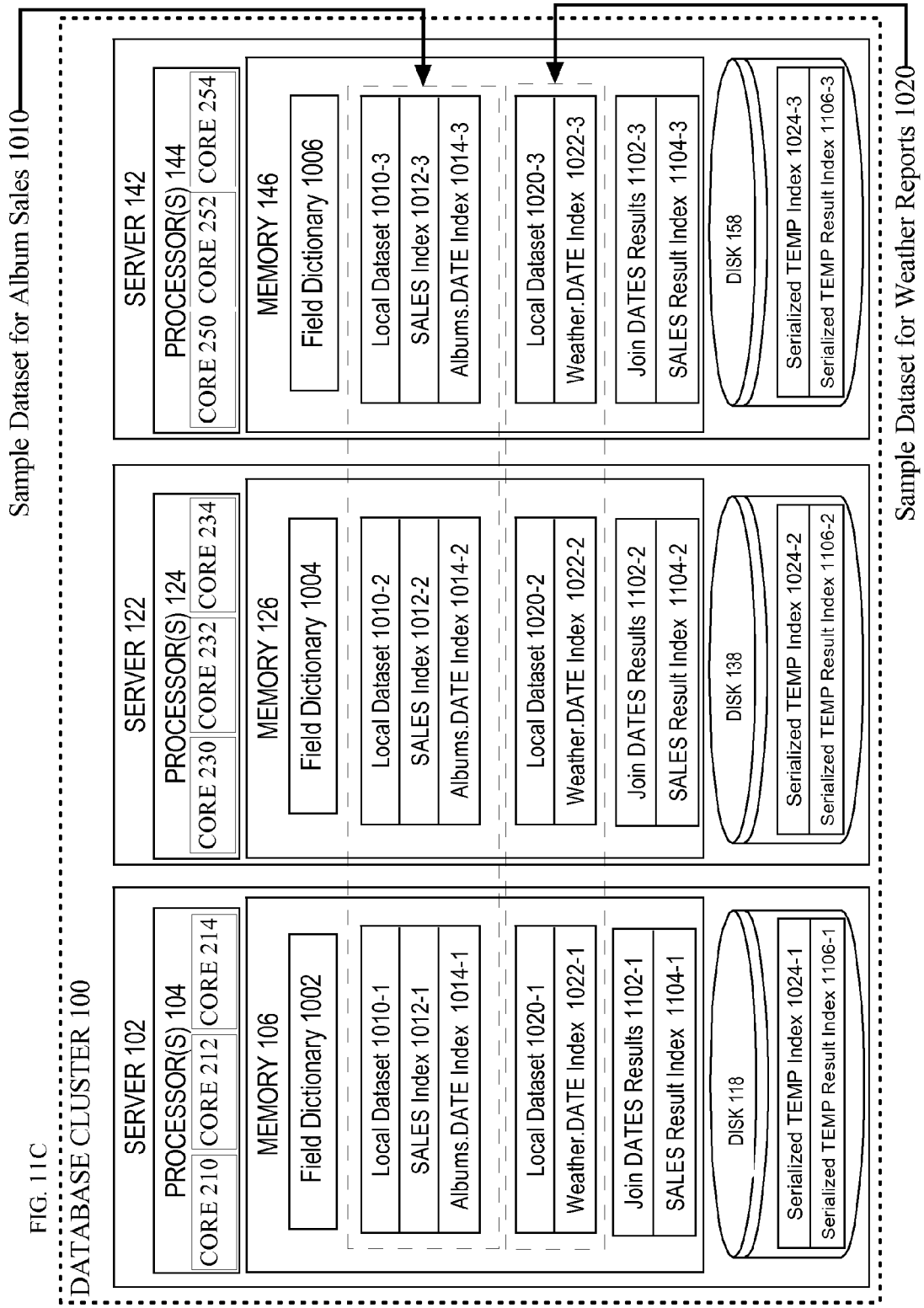
FIG. 11C is a block diagram illustrating transferring globally distributed data structures from memory to disk.

FIG. 11C is a block diagram illustrating transferring the TEMP field index structures from memory to disk. As previously described, disk based storage operates faster on serialized data. A globally distributed data structure may be serialized by scanning only nodes that contain fat pointers or skinny pointers. An example of this type of scan may be illustrated by flowing the flow of the linked lists in FIG. 5C. The serialized data is then transferred to disk. For example:

- Local indexes 1024-1, 1106-1 are serialized by server 102 and transferred to disk 118
- Local indexes 1024-2, 1106-2 are serialized by server 122 and transferred to disk 138
- Local indexes 1024-3, 1106-3 are serialized by server 142 and transferred to disk 158

If a serialized data structure is needed by a user, the serialized data structure is loaded in memory and re-hashed at the appropriate nodes. The range based hashing used to separate the linked lists may be stored in the head node of the serialized structure. Alternatively, the structure may be rehashed according to a configured hash function. If necessary, directory nodes may be recreated using a sorted serialized data structure as described in FIGS. 6A-6C.

In some embodiments, cold globally distributed data structures may simply be deleted from the cluster. If a structure becomes useful after being deleted, the structure may be remade from scratch using data contained in local datasets or a parent globally distributed data structure.

In some embodiments, the globally distributed data structures corresponding to a specific system state may be expressly removed by a user. A dependency graph 1300 in FIG. 13E has a control that enables a user to select a target node 1304 from the graph and cause the system state that corresponds to the target node from the graph to be discarded without causing any system states that correspond to any nodes that are connected to the target node to be discarded. For example, the resulting data container for the result set shown at node 1304 may be removed from the dependency graph without affecting the other nodes.

Refreshing the System State

In some embodiments, the user is given the option to remove all parent structures with respect to a distributed result set from the memories of a cluster. The system attempts to keep around 90% of the memory occupied by indexes and result sets. Removing all parent structures significantly reduces the amount of memory in use, so the system may create new globally distributed data structures from that point.

As described in the previous sections, parent structures may be manipulated to preserve memory or removed one-by-one by either persisting them or by deleting them from the system to make way for new memory structures. These systems provide valuable ways to preserve as much memory as possible without deleting the structures that make this system run extremely fast. However, at some point, the user may decide that the current result set provides all of the schema information that is needed. Thus, the superset of fat pointers preserved in all of those additional parent structures are no longer needed.

Figure 11D:
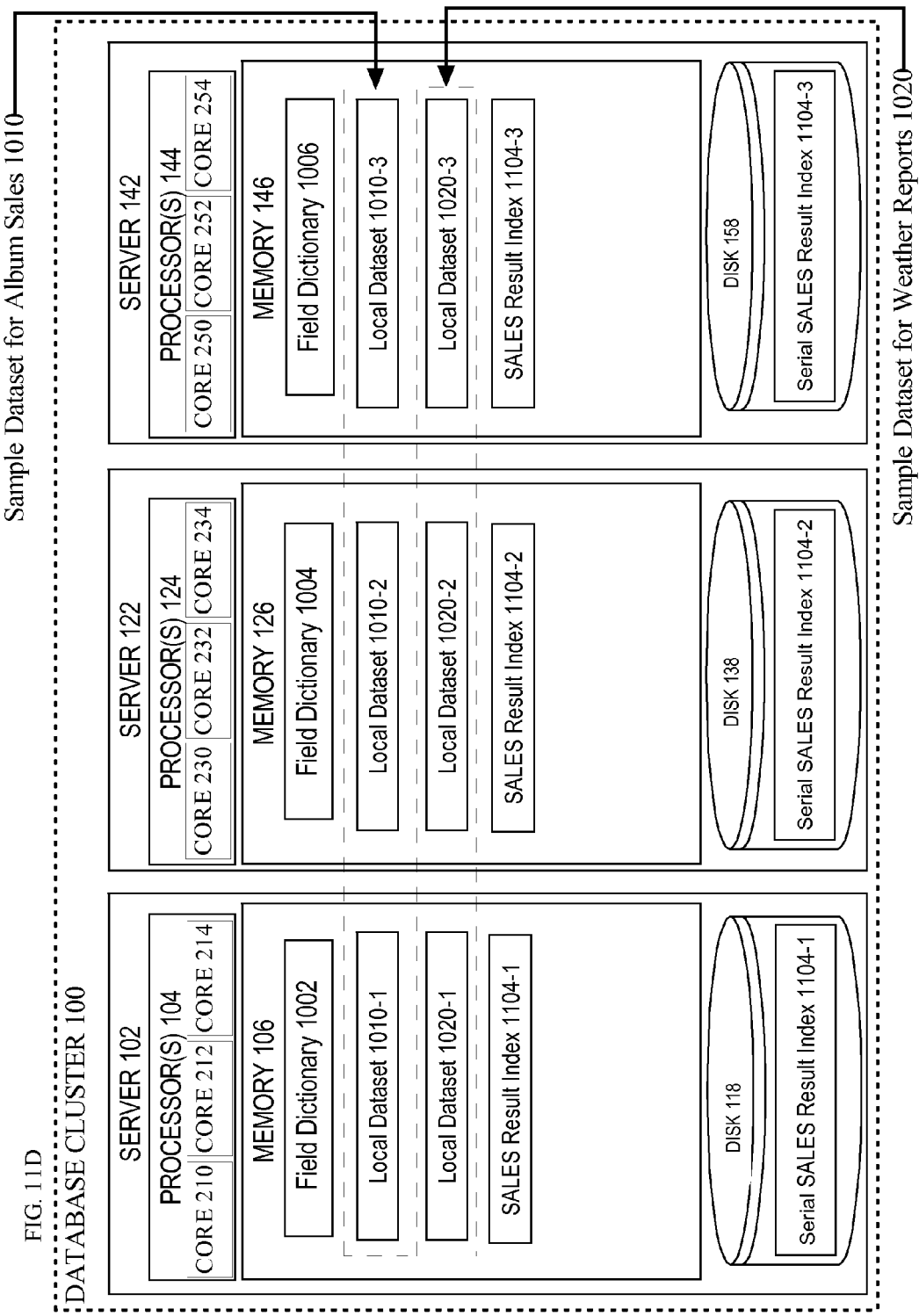
FIG. 11D is a block diagram illustrating refreshing a system state.

FIG. 11D is a block diagram illustrating refreshing the system state by removing parent structures. The system image maintains the local data structures for the SALES result index 1104-1, 1104-2, 1104-3, but the other distributed indexes, distributed result sets, and distributed result indexes have been removed. The system also maintains the information represented by the dependency graph in FIG. 13B. Thus, if any removed data structures need to be recreated, the system has the history of database operations required to recreate these globally distributed data structures.

In some embodiments, the user may be given the option to persist the current distributed result set by writing that distributed result set to disk in addition to refreshing the system state. This involves serializing the local structures 1104-1, 1104-2, 1104-3 and writing them to disk as depicted in FIG. 11D. Persisting the system state may also involve persisting (sending to disk) the chain of database operations used to arrive at that distributed result set (i.e. FIG. 11B).

If a user ends a session at this point, the local datasets may be recreated by using a pre-configured pseudorandom algorithm and seed for extracting datasets 1010, 1020 from the one or more source computing devices. Then the sorted distributed result set index 1104 may be recreated in memory using the persisted data. Alternatively, the user may choose to have any other version of the system state recreated by choosing a state from the dependency graph in FIG. 11B.

Creating Indexes Based on Use in Database Operations

A server in the cluster tracks which fields are continually used in database operations either at a threshold amount or at a threshold rate. A globally distributed data structure may be created to index a particular field that is continually used in received database operations.

For example, after performing the sort on SALES data, a user may not have discovered any useful correlation between TEMP and SALES. However, the user may look back to the raw format weather data to discover that a WEATHER field is also included in the weather sample set 1020. To test whether there is any correlation between the WEATHER field and the SALES field, the cluster may receive a command from the user to perform a FILTER operation for a particular value in the WEATHER field such as "rainy." After performing this operation, the user may desire to perform a similar FILTER operation on another particular value in the WEATHER field such as "sunny."

As the cluster performs these operations, a server in the cluster tracks that the WEATHER field has been used in multiple operations. As a background process, the cluster may create a distributed result index for the WEATHER key based off of the results of SORT by SALES operation. FIG. 11E is a block diagram illustrating a result index created based on database operations received from a user. The WEATHER distributed result index 1108-1, 1108-2, 1108-3 is created from distributed result set 1102. The second filter operation FILTER by WEATHER("sunny") may be performed by masking results from the WEATHER result index.

Figure 13C:
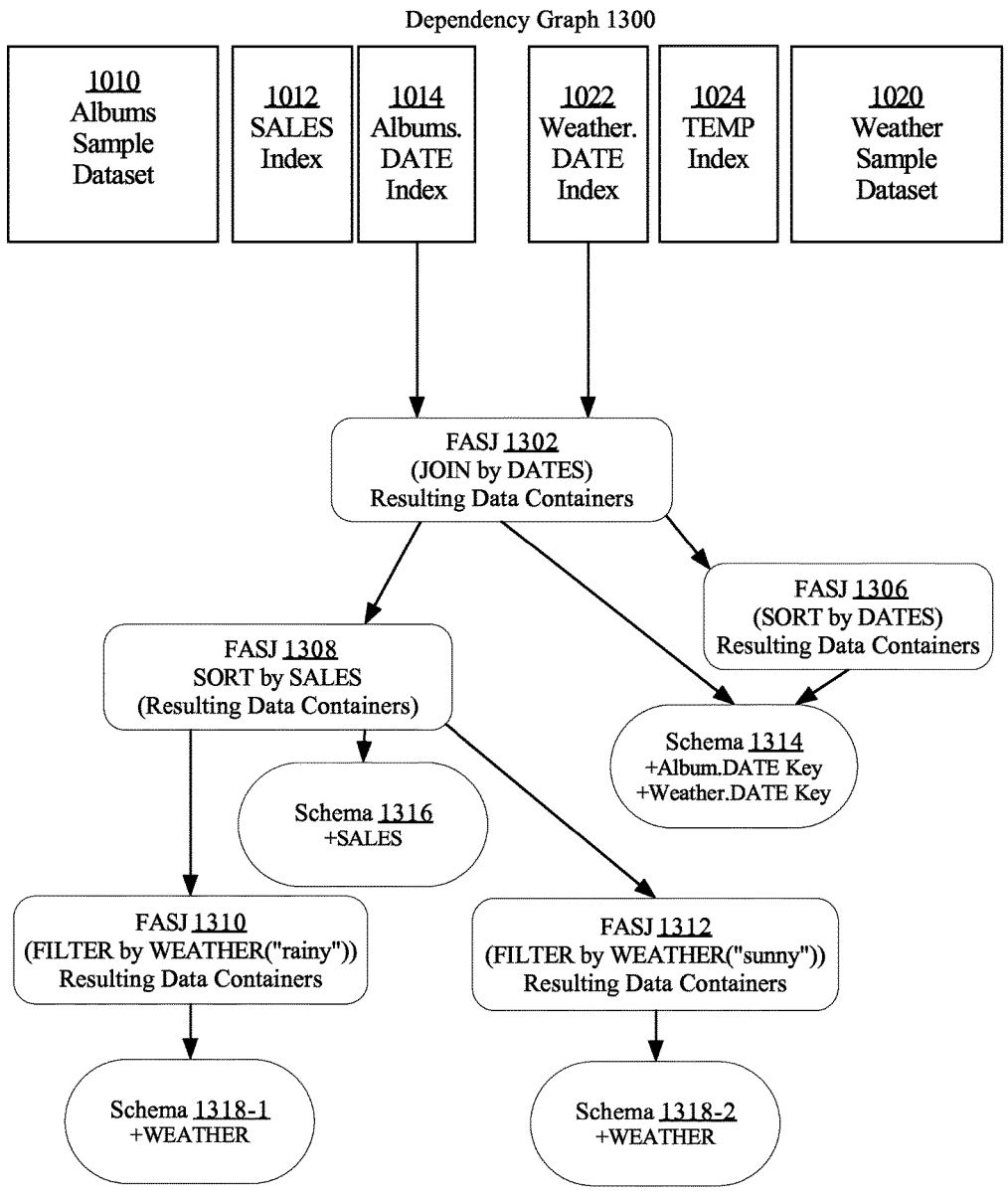
FIG. 13C is a dependency graph illustrating how a field used in multiple database operations may be used to generate a distributed result index.

These operations are also recorded in the dependency graph presented in FIG. 13C. At nodes 1310 and 1312, the FILTERS performed on the WEATHER field are recorded. The cyclic process indicates that multiple operations are performed even though only one result index needs to be created. The keys required for this chain of operations are recorded at nodes 1318-1 and 1318-2. The additional keys required for each operation include the WEATHER field referred to at nodes 1318-1, 1318-2.

Golden Schema

The fields selected by a particular client or added based on use in database operations received from a particular client may be stored in a data structure referred to as the golden schema. During load an initial golden schema is created from user selected keys. For example, the SALES key may be stored in the golden schema when creating the SALES index 1012 the Albums.DATE key may be stored in the golden schema when creating the Albums.DATE index the Weather.DATE key may be stored in the golden schema when creating the Weather.DATE index the TEMP key may be stored in the golden schema when creating the TEMP index As the cluster performs operations based off of commands received from the user, the keys required in these operations may be added to the golden schema. For example, the DATES fields at node 1314, the SALES field at node 1316, and the WEATHER field at node 1318 are of particular interest to the user in this example, so they are stored in a "golden schema."

The golden schema is not limited to a particular dataset. For example, the golden schema in the example from FIGS. 13A-13C includes fields from both the albums sample dataset 1010 and the weather sample dataset 1020.

Conceptually, the golden schema is an internal data structure that keeps track of keys useful to a particular client. Fields that are selected by a particular client as useful but never actually used in a database operation received from that client may be removed from that user's golden schema. For example, in the 13A-13C example, the TEMP index was never used, so the TEMP field may be automatically removed from the golden schema if it was previously added.

In some embodiments, a golden schema created for one client may be stored so other users may access that golden schema. The other users may use that original golden schema as a starting point for their particular problem, and create a new golden schema based on that original golden schema after interacting with the big data dataset and adding or removing fields from that golden schema.

Discovering Golden Schema by Drilling Down to Useful Records

Big data presents a unique problem for requesting data items from a dataset because the potentially useful keys and values are unknown to the user. The user is searching the dataset(s) for trends and phenomena that could be used in a report or model. The data has some structure, but the detailed structure of each record is unknown to the user at the time the user wishes to start requesting data. Columnarizing an entire dataset requires too much computational work and ends up giving the user information overload. All of the keys from a sample dataset are too numerous for a user to process and discern meaningful relationships between the keys. At the same time, pure columnarization causes the user to lose valuable information regarding how the information is organized within particular schemas (i.e. whether the data is nested).

To prevent this loss of information, results of a database operation may be displayed to the user with an accompanying indication of the schema corresponding to one or more result records. After displaying the schema, the cluster may receive further commands that indicate to the cluster how to homogenize one or more schema.

In some embodiments, the fields from each record are stored as related to a schema. Each field may have more than one schema associated with it in the dictionary of fields. As the cluster performs more and more chained database operations, there are less schemas associated with the useful keys in the golden schema. By drilling down to a subset of database records out of a plurality of database records, a primary user may also drill down to a manageable number of schema. After performing the database operations, a subset of records are displayed to the user. Displaying the results of these database operations allows a user to see patterns in the schemas that are in the result records. Patterns may include similar key names or whether the keys are nested.

In particular, performing Filters, Aggregates, and Sorts allows the cluster to extract records that have meaningful schema in the context of a user's problem. FIG. 17A is a block diagram illustrating patterns in schema discovered after performing a database operation on a network log dataset by. The database operation FILTER by FAILURE extracts records with a FAILURE key value. After performing the operation, the schemas with the key "registration_ID" are removed from the displayed results because the results do not contain any records that have that key. Additional schema information may be added to the dataset. At area 1706, the cluster receives a command indicating that the "Results.error" key should be added to the golden schema. Values relating to the "Results.error" key are parsed and a new distributed index is created using the values in "Results.error" to insert fat pointers in the globally distributed data structure. After extracting "Results.error," the results column may be removed from the dataset if it is no longer used in database operations.

Force Function Operations

In some embodiments, database operations may be performed to combine one or more schemas even though the schemas do not contain similar values. A big data dataset contains keys with values of different primitive types, but similar meanings. The values corresponding to a first particular key in a first particular schema may be correlated with the values of a second particular key in a second particular schema by performing a force function JOIN.

Figure 17B:
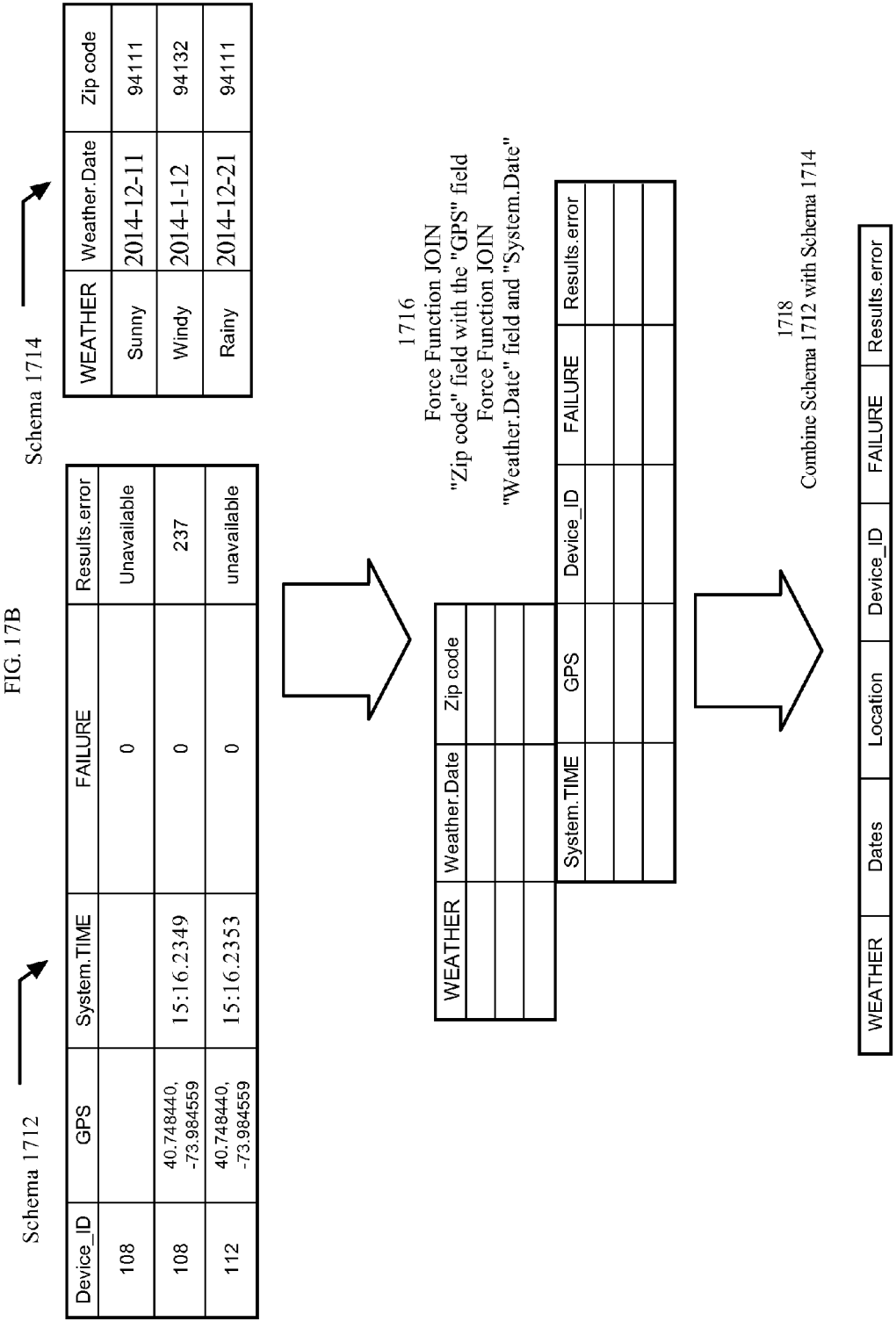
FIG. 17B is a block diagram illustrating a selected golden schema by combining a first schema with a second schema.

FIG. 17B is a block diagram illustrating how a force function join may be used to join a device log dataset with a weather dataset. The system provides for user defined functions and casting functions in conjunction with the JOIN database operation, so values organized by any key may combined. User defined functions and/or casting functions used in conjunction with a join operation are collectively referred to as force functions joins. Additional embodiments may include force functions for other operations. The system tracks use of force function operations performed on each schema, so the system can apply those force function operations during batch processing.

Schema 1712 has fields including device_ID, GPS, System.TIME, Failure, and Results.error. Schema 1714 has fields including WEATHER, weather.Date, and zip code. At area 1716, the cluster performs a a force function JOIN operation of the fields of "zip code" and "GPS" using a user defined function and a JOIN of the fields "Weather.Date" and "System.TIME" using another user defined function. At area 1718, the schemas are combined. The device logs schema 1712 is enriched by additional keys provided in the weather schema 1714. Keys that were previously not comparable such as "Results.error" and "WEATHER" are comparable.

For example, the WEATHER key may be sorted to determine particular weather patterns that cause specific device failures. Alternatively, specific weather types (rainy, windy) may be filtered, so further comparisons may be made with smaller datasets. This may result in further "drilling down" and/or additional JOIN operations. The results of a JOIN operation allow for further FILTER, AGGREGATE, and SORT database operations to perform the drilling down process iteratively. By performing additional joins, a user may even join data from a third schema with data from the first two schemas.

Inserting and Updating Records During Algorithm Formation

In some situations, a user may desire to generate a query based off of a schema, but a particular value within the schema does not exist in the sample population initially loaded into the cluster. For example, the values may occur so infrequently that the sample dataset fails to include a record that contains these values. Thus, in algorithm formation mode, users are given the tools to add values or records that act as a starting point for the parent database operations (i.e. a join). The later dependent database operations may take the user to a completely different set of records. However, for algorithm formation purposes, the records themselves are not important, only the chain of database operations are important. The chain of database operations allow the system to construct an algorithm by reverse engineering the database operations performed on the sample dataset(s).

For example, in a random sample of device logs, a user may attempt to cross reference server failures with data from a weather dataset. An algorithm that cross references the datasets should include a JOIN operation. However, the user needs a record containing a failure as a part of the algorithm. A JOIN operation followed by a condition requiring FAILURE=1, reveals that the sample population does not contain any failures. Failures occur so infrequently that increasing the sample size is not likely to help the user find a FAILURE=1 record. In this case, the user may add a record to the current sample population that includes a value representing the failure event (FAILURE=1).

Once a particular record with a defined schema is determined, a server in the cluster may receive a command to change the failure value of a single record to "1". Now, when the user sends the FILTER command with the condition of FAILURE=1, at least one record is joined. The user may use additional keys from one or more schemas that exist after the join to develop a more advanced algorithm based on the joined datasets.

Publishing Field Names to a Semantic Network

The superset of all field names stored in user specific golden schemas, may be published to a globally maintained a semantic network.

Weighted relationships are created among field names based on field relationships of:
  Coming from the same dataset, schema, or record
  Being part of a nested schema, and having a parent or child relationship
  Name collision
  User received join operations
  Coming from the same golden schema Suggesting Field Names to the Client Based on the Semantic Network The relationships stored in the semantic network may be used to suggest further field names that may be useful in a particular user's golden schema.

For example, assume a second user previously selected the GENRE field as interesting when exploring the structure of sample dataset 1000. Because this GENRE field comes from the same dataset 1000 as the SALES field and the DATE field that have already been determined as interesting to the primary user, a server in the cluster may suggest the GENRE field to the current user based on the weighted relationship of GENRE to other fields in the sample dataset for album sales.

FIG. 14 is an example semantic network for suggesting field names to a client. The user received join operation represents the strongest weighted relationship between node 1402 and node 1404. The relationship exists from a user received join operation and a name collision. The relationships including nodes 1402, 1406 and 1404, 1408 represent the weakest recognized relationships because the fields come from the same dataset, schema, or record. The nodes' 1406, 1410 relationship represents an intermediate strength relationship because the fields both come from the same dataset, schema, or record, and the relationship exists in another user's golden schema.

Based on the GENRE recommendation, the user may test whether there is any correlation between the WEATHER field and the GENRE field in terms of album SALES. A server in the cluster may receive an operation from the primary user to perform FILTERs for particular values in the WEATHER field such as "rainy" and "sunny" along with FILTERs for particular values in the GENRE field such as "rock" and "blues."

Figure 13D:
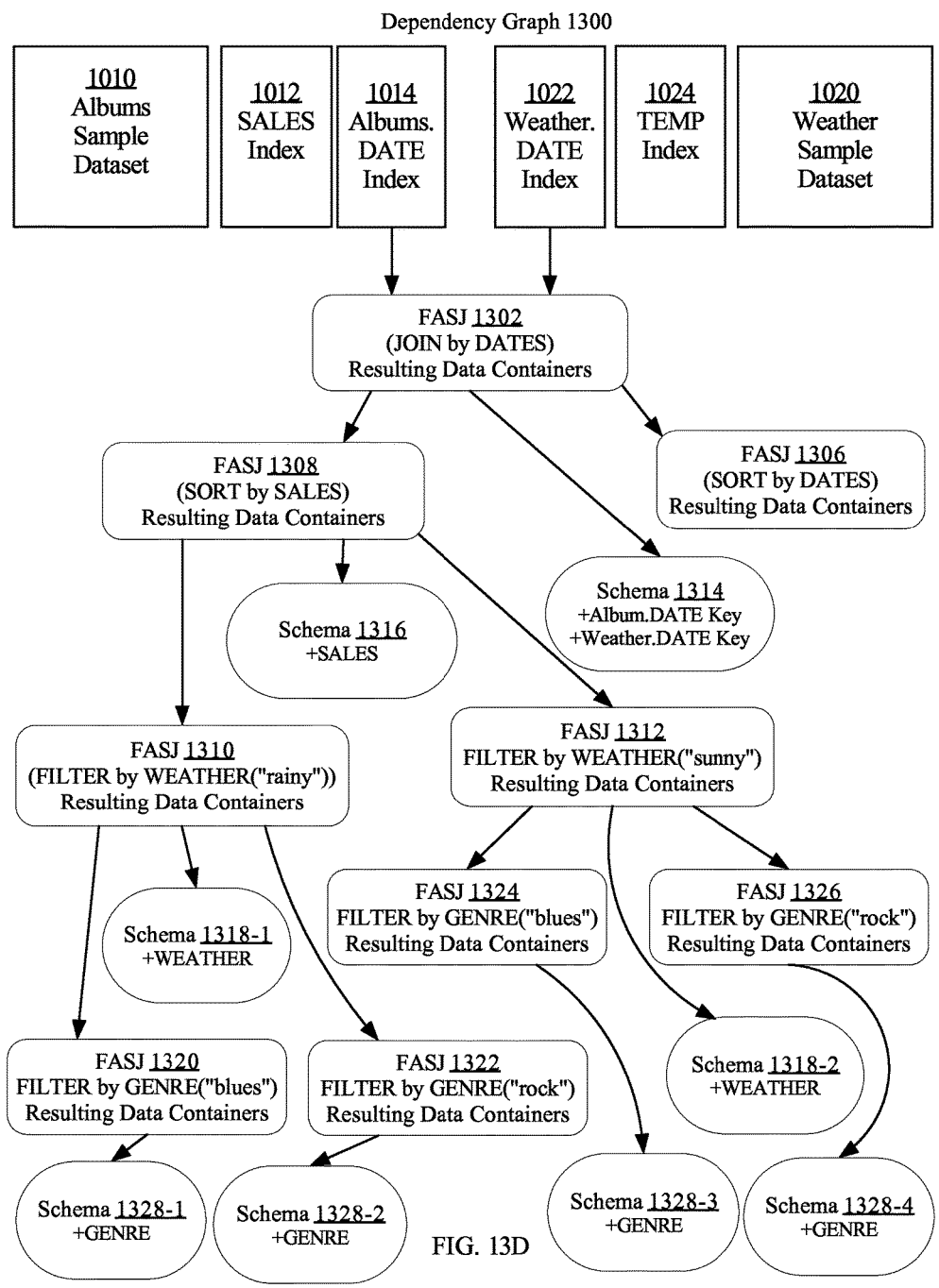
FIG. 13D is a dependency graph illustrating how a golden schema is tracked.

These operations are all published to the dependency graph presented in FIG. 13D. At nodes 1320, 1322, 1324, 1326, the FILTERS performed on the GENRE field are recorded. The keys required for this chain of operations are recorded at nodes 1328-1, 1328-2, 1328-3, 1328-4. In particular, the keys required additionally include the GENRE field. Each permutation of a combination of filters may be displayed to the user.

FILTER by GENRE("rock") and FILTER by WEATHER ("rainy") and SORTED by SALES
FILTER by GENRE("rock") and FILTER by WEATHER ("sunny") and SORTED by SALES
FILTER by GENRE("blues") and FILTER by WEATHER ("rainy") and SORTED by SALES
FILTER by GENRE("blues") and FILTER by WEATHER ("sunny") and SORTED by SALES Based on these operations, the user may notice a correlation in the data that can be further modeled in batch mode. For example, there may be a correlation between "blues" album sales and "rainy" weather. The user may also notice a correlation between "rock" album sales and "sunny" weather.

Dependency Graph Used for Batch Mode

For each key in the golden schema, there is an associated algorithm of database operations explaining how to get that key in batch mode. Multiple operation chains may be stored in a dependency graph. The interconnections or lack thereof found in a dependency graph may be used to optimize execution of the algorithms in batch mode. Batch mode is entered once a user or client indicates one or more operation chains should be run in batch.

Figure 13E:
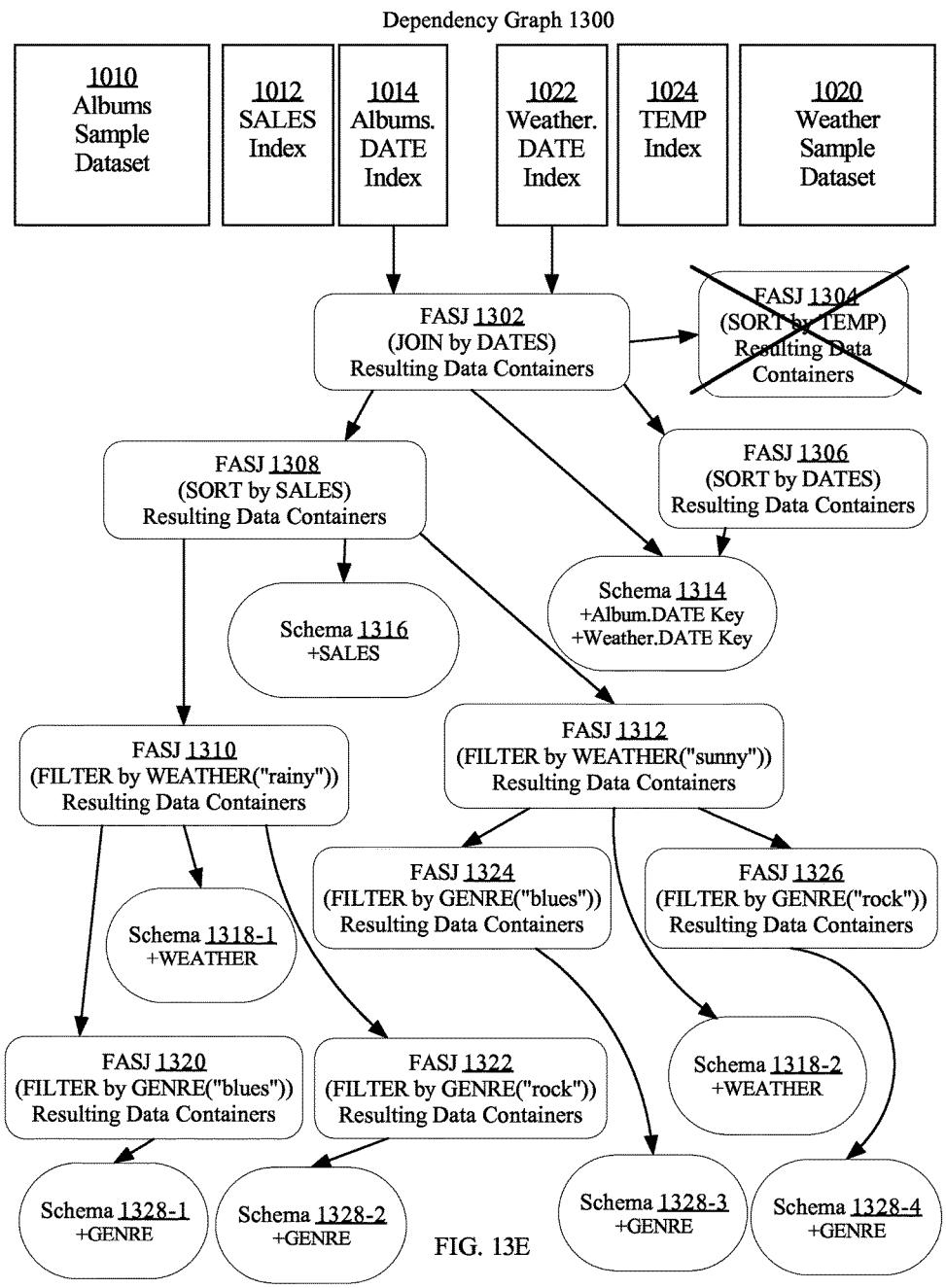
FIG. 13E is a dependency graph illustrating what operation chains are executed in batch mode.

For example, FIG. 13E illustrates how a particular user explored two datasets. The dependency graph 1300 in FIG. 13E may be displayed as a graphic user interface in some embodiments. A server in the cluster records many different operation chains in the dependency graph. The client may expressly select multiple operation chains as useful for running against a big data dataset in batch or the non-removed nodes (everything except 1304) in the dependency graph may be used for creating an algorithm to be performed against the big data dataset in batch.

The first operation chain includes FASJ combinations of nodes 1302 and 1306
The second operation chain includes FASJ combinations of nodes 1302, 1308, 1310, 1320
The third operation chain includes FASJ combinations of nodes 1302, 1308, 1310, 1322
The fourth operation chain includes FASJ combinations of nodes 1302, 1308, 1312, 1324
The fifth operation chain includes FASJ combinations of nodes 1302, 1308, 1312, 1326

The four keys added to the schema at nodes 1314, 1316, 1318, and 1328 collectively make the golden schema that needs to be parsed from the big data dataset. The keys in the golden schema and the algorithm developed using these operation chains can be used to model correlations in the data.

In batch mode, the cluster 100 may use the dependency graph to perform an optimized algorithm. In a typical shot in the dark approach, a first algorithm would be written to parse values related to the key at node 1314; a second algorithm would be written to parse the key at node 1316; a third algorithm would be written to parse the key at node 1318; and a fourth algorithm would be written to parse the key for node 1328. However, here a single algorithm is written to parse keys at nodes 1314, 1316, 1318, and 1328 and many of the steps of the algorithm may be performed in parallel.

For example, in the algorithm FASJ operation at node 1302 may be performed by each server in the cluster in a distributed manner. FASJ combination at node 1306 and 1308 may be performed in parallel by separate servers or groups of servers. The threads executing FASJ combination at node 1308 are then further split to perform FASJ operations at node 1310 with node 1312, and nodes 1320-1326 in parallel. The five discrete FASJ combinations were recorded during the interactive exploration process, so no additional programming is required by the user.

Query Parsing, Plan Optimization, Scheduling and Execution

Once the algorithm is generated, the servers act as a read only database with source computing devices storing the data and server computing devices performing the filter, aggregate, sort, and join operations against that data. All or portions of the big data datasets are loaded into local datasets sequentially, so the data can be processed incrementally. The local datasets in this portion of the process hold significantly more records than the local datasets in the query formation phase. Because the system has "the golden schema", key values pairs are only parsed from records that belong to schemas that make up the golden schema. Consequently, the local datasets are only loaded based on the golden schema set of parsed keys. Essentially, the system filters out fields that are unused when creating the local datasets at the time data is read from one or more source computing devices.

The query is executed against data in an ad-hoc manner based on the query execution plan. The "ad hoc" manner refers to how distributed indexes, distributed result sets, and distributed result indexes can be created and deleted according to a plan derived from the algorithm formation stage. Specifically, globally distributed data structures are only created or available in memory when they are needed.

The algorithm plan may also be used to determine the points at which distributed indexes, distributed result sets, and distributed result indexes may be deleted. These structures are typically deleted immediately after every database operation that uses the data in these structures is complete.

The algorithm plan may also be used to determine the points at which each dataset may be deleted. At some point the local datasets are no longer necessary because all input values are located in a globally distributed data structure. Additionally, if all of the necessary input values are located in a globally distributed data structure, the output in any future distributed result sets may not require a location value in the fat pointers. The value arrays for a distributed result set would only include immediate values.

Figure 18:
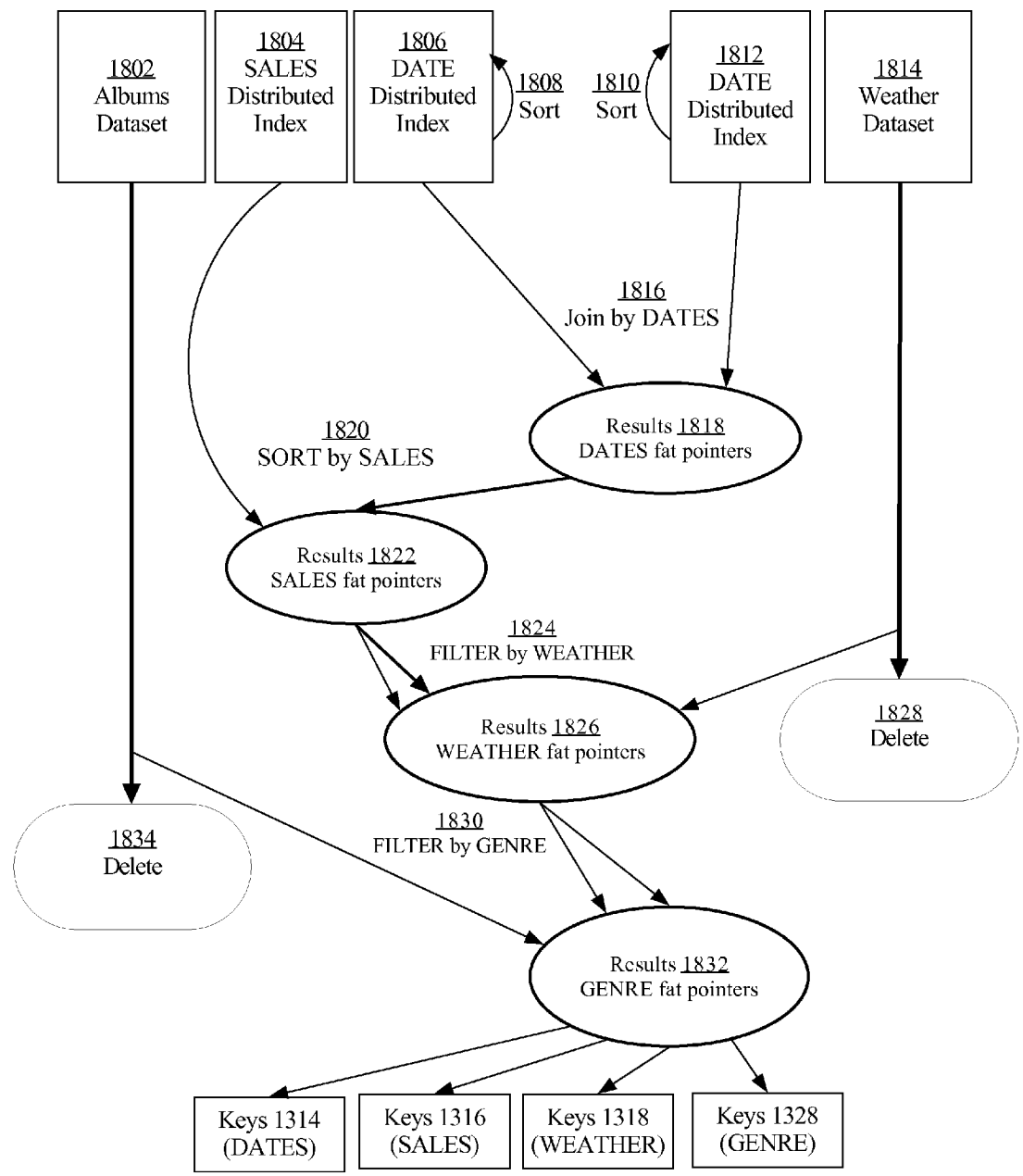
FIG. 18 is a block diagram illustrating how data structures may be added and deleted in an ad hoc manner during batch processing.

FIG. 18 is a block diagram illustrating how data structures may be added and deleted in an ad hoc manner. The Album dataset 1802 or a portion thereof is loaded into the cluster and the Weather dataset is loaded into the cluster. As data is being pulled into the system, a SALES index 1804 and a DATE index 1806 are being created for the Records dataset, and a DATE index is created for the Weather dataset.

The first operation to be performed is sort operations 1808, 1810 on the DATE distributed index 1806, 1812 respectively. This operation may be performed as the data is being loaded. In some embodiments, the sort operation is performed after load. After the loading operation is complete, the join operation 1816 is performed between the two DATE distributed indexes 1806, 1812. After fully performing the join operation, the DATE distributed indexes 1806, 1812 are deleted from the volatile memories of the cluster.

The resulting DATES fat pointers 1818 of the JOIN operation and the SALES distributed index 1804 are used as inputs in the SORT by SALES database operation. The operation may be performed by cross-referencing the record locations in the fat pointers of the SALES index with the record locations in the fat pointers of the DATES index, and removing any SALES fat pointers that do not correspond to result fat pointers 1818. The SALES distributed index may be sorted during load or immediately after load, so only the cross-referencing needs to occur, or alternatively, the sorting operation may be performed against the resulting data. Thus, the SALES distributed index 1804 becomes the resulting SALES fat pointers 1822 by removing records that were removed by the JOIN operation 1816.

The results 1822 of the SORT by SALES operation 1820 are used in conjunction with the Weather local datasets 1814 as input in the FILTER by WEATHER operations 1824. The two arrows represent that two filter operations may be performed in parallel: (1) FILTER by WEATHER("rainy") and (2) FILTER by WEATHER("sunny"). Once the filter operations are complete, the results 1822 of the SORT by SALES operation 1820 may be deleted. Additionally, no other calls are made to the WEATHER local datasets 1814, so the WEATHER local datasets 1814 may be deleted 1828.

The results 1826 of the FILTER by WEATHER operations 1824 are used in conjunction with the Albums local datasets 1802 as input in the FILTER by GENRE operations 1830. The two arrows represent that two filter operations may be performed in parallel: (1) FILTER by GENRE ("rock") and (2) FILTER by GENRE("blues"). Once the filter operations are complete, the results 1832 of the FILTER by WEATHER operations 1824 may be deleted. Additionally, no other calls are made to the Album local datasets 1802, so the Album local datasets 1802 may be deleted 1834.

All of these operations together provide data from the keys at nodes 1314, 1316, 1318, 1328 that were determined in the query formation stage. The distinct result sets may be used to create separate four separate graphs, models, reports, or even tables for visualization purposes. The distinct result sets include:

WEATHER("sunny") && GENRE("blues")
WEATHER("sunny") && GENRE("rock")
WEATHER("rainy") && GENRE("blues")
WEATHER("rainy") && GENRE("rock")

In addition the data could all simply be normalized and exported in a single format such as traditional table format for exporting to another program. Other programs include machine learning programs, traditional database programs that allow for more traditional query based languages, or third party analysis software.

Reduced Operation Database GUI

The reduced operation database graphic user interface comprises multiple pages for selecting datasets and interactively exploring the structure of the datasets according to the workflow previously described. Some useful features of these pages are described herein in further detail.

Figure 15A:
FIG. 15A is a block diagram illustrating a user interface for selecting useful keys in a JSON object during load.

FIG. 15A is a block diagram illustrating a user interface for selecting useful keys in a JSON object during load. Each field has a clickable box next to the field name. Fields may be clicked or selected to indicate that these fields should be displayed in column format. This window may be updated several times during load as new field names are discovered. The selections input by the user may also be used as an indicator to create distributed indexes as previously described.

Figure 15B:
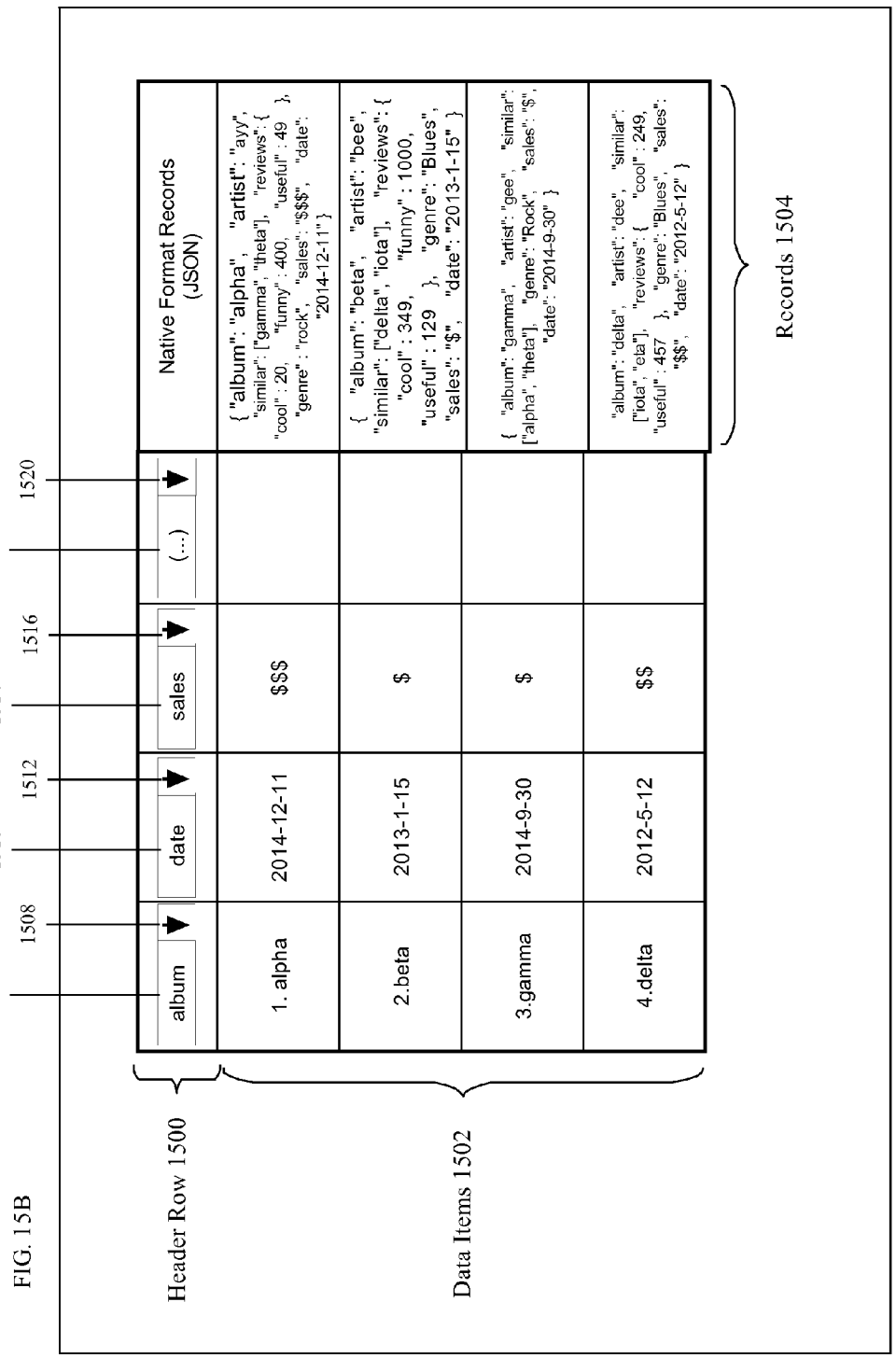
FIG. 15B is a block diagram illustrating a user interface for exploring schema of big data.

FIG. 15B is a block diagram illustrating a user interface for exploring schema of semi-structured data. The user interface comprises a spreadsheet with native format records in the right most column 1504. Any field from a native format record may be added to the spread sheet as a column. A header row 1500 shows the field names selected by the user, and the data items with those field names are displayed in the rows below 1502.

Only a finite number of rows may be displayed to the user at any given time. Thus, the native records only need to be parsed as the user scrolls or clicks the next page of rows. The process of displaying a data item as a user moves to a page that requires the data item may be referred to herein as "demystification."

In some embodiments, the native format records may be hidden from the user. A user may click on a particular row or record in the native format column to display a particular native format record. This process may also be referred to as a form of demystification. The demystification process is a result of the underlying fat pointer system. The order of rows displayed on a particular page is often the result of the fat pointers from a single distributed index or distributed result set. A server in the cluster does follow the fat pointer to the referenced record until necessary.

The particular field names 1506, 1510, 1514 may be selected during load or pulled from the native format records by drag and drop, clicking, or some other interactive means. In some embodiments these field names may also be typed as in a natural language search bar. Beside every field name 1506, 1510, 1514, is a menu button 1508, 1512, 1516. The menu button provides tools for operating on the field. In addition to filters, aggregates, sorts, and joins the menu button may also provide functions that may be executed through a combination of one or more of these operations. Some built-in functions include, but are not limited to:

Mathematical Functions:
  ABS( ), MOD( ), POWER( ), ROUND( ), TRUNC( ), SIN( ), COS( ), TAN( ), ASIN( ), ACOS( ), ATAN( ), SINH( ), COSH( ), TANH( ), SQRT( ), EXP( ), LN( ), LOG( ), CEIL( ), FLOOR( ), SIGN( ), NANVL( )—implemented using libm as appropriate;

String and RegEx Functions:
  INITCAP( ), LOWER( ), UPPER( ), CONCAT( ), LPAD( ), RPAD( ), LTRIM( ), RTRIM( ), REPLACE( ), SUBSTR( ), LENGTH( ), INSTR( ), REGEX( ), TO_CHAR( ), TO_NUMBER( )—string functions implemented using libc (string.h) as appropriate, and regular expression functions implemented using libc (regex.h) as appropriate;

Group Functions:
  AVG( ), COUNT( ), MAX( ), MIN( ), SUM( ), CORR( ), MEDIAN( ), STDDEV( ), VARIANCE( ), Data and Time Functions:
  ADD_MONTHS( ), LAST_DAY( ), MONTHS_BETWEEN( ), NEW_TIME( ), NEXT_DAY( ), SYSDATE( ), GREATEST( ), LEAST( ), TO_CHAR( ), TO_DATE( ), ROUND( ), TRUNC( )—implemented using librt (time.h), as appropriate.

The graphic user interface also provides an area 1518, 1520 for adding more field names and performing operations and functions using these field names. Database operations may be input using a natural language engine in the header row; terms and connectors; keyboard, mouse, and touch screen combinations; buttons and menus, or any combination thereof.

Figure 15C:
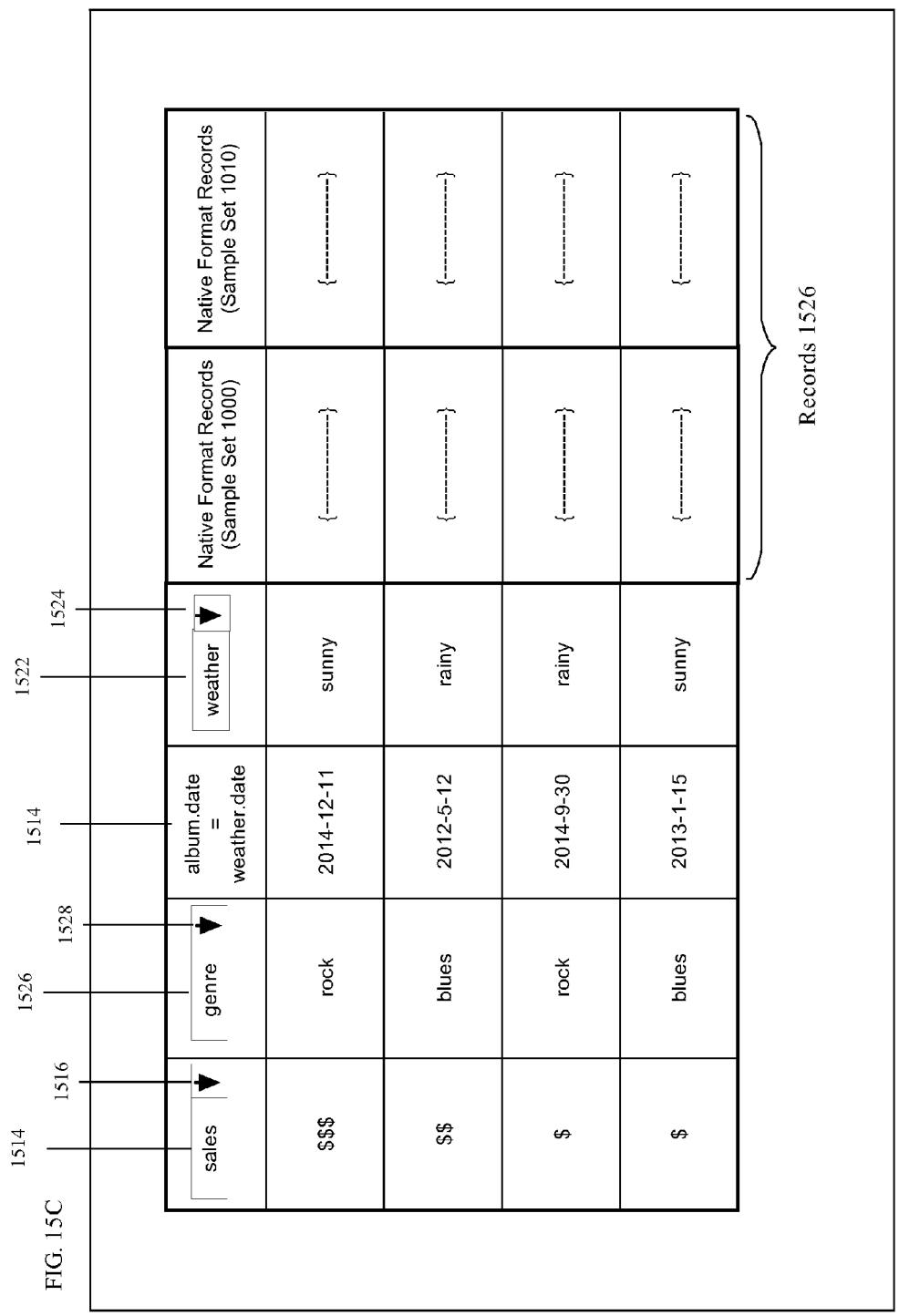
FIG. 15C is a block diagram illustrating a user interface for exploring schema of big data after a few operations have been performed.

FIG. 15C is a block diagram illustrating a user interface for exploring schema of semi-structured data after a few operations have been performed. The user dragged and dropped the DATE key from the weather sample dataset 1020 onto the DATE key for the album sample dataset 1010 to create the joined field name 1514. Input was received through the graphic user interface menu button 1516 to SORT by the SALES data items. The user also added fields for WEATHER and GENRE to the spreadsheet. Using the text bar area 1526 and the menu button 1528, the user may input a FILTER operation for GENRE data items by "rock" or "blues". Using the text bar area 1522 and the menu button area 1524 the user may input a FILTER operation for WEATHER data items by "sunny" or "rainy." After reviewing these correlations the user may save each set of displayed results to run in batch.

In some embodiments, a user sends a command to the cluster to perform a first database operation. The first database operation is performed against a dataset to create a first distributed result set of fat pointers. The first result set is displayed to a user, but the user may send a command to perform a second database operation against data other than the first result set. This data may include data from the dataset or data from a different data set. The second database operation is performed to create a second set of fat pointers. The first result set is displayed along with the second result set. The user may then review the schemas contained in each result set, and perform further operations that may combine the result sets through an inner or outer JOIN, perform further operations on a single result set, or jump back to a previous operation based on information obtained from the schemas.

In some embodiments, tables and graphic user interfaces depicting tables are displayed in a web browser. A larger portion of the table is rendered than what is displayed. When a user scrolls, the table smoothly scrolls pixel by pixel rather than cell by cell. Additional portions of the table are rendered as the user scrolls farther through the table, so the user may continue smoothly scrolling.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
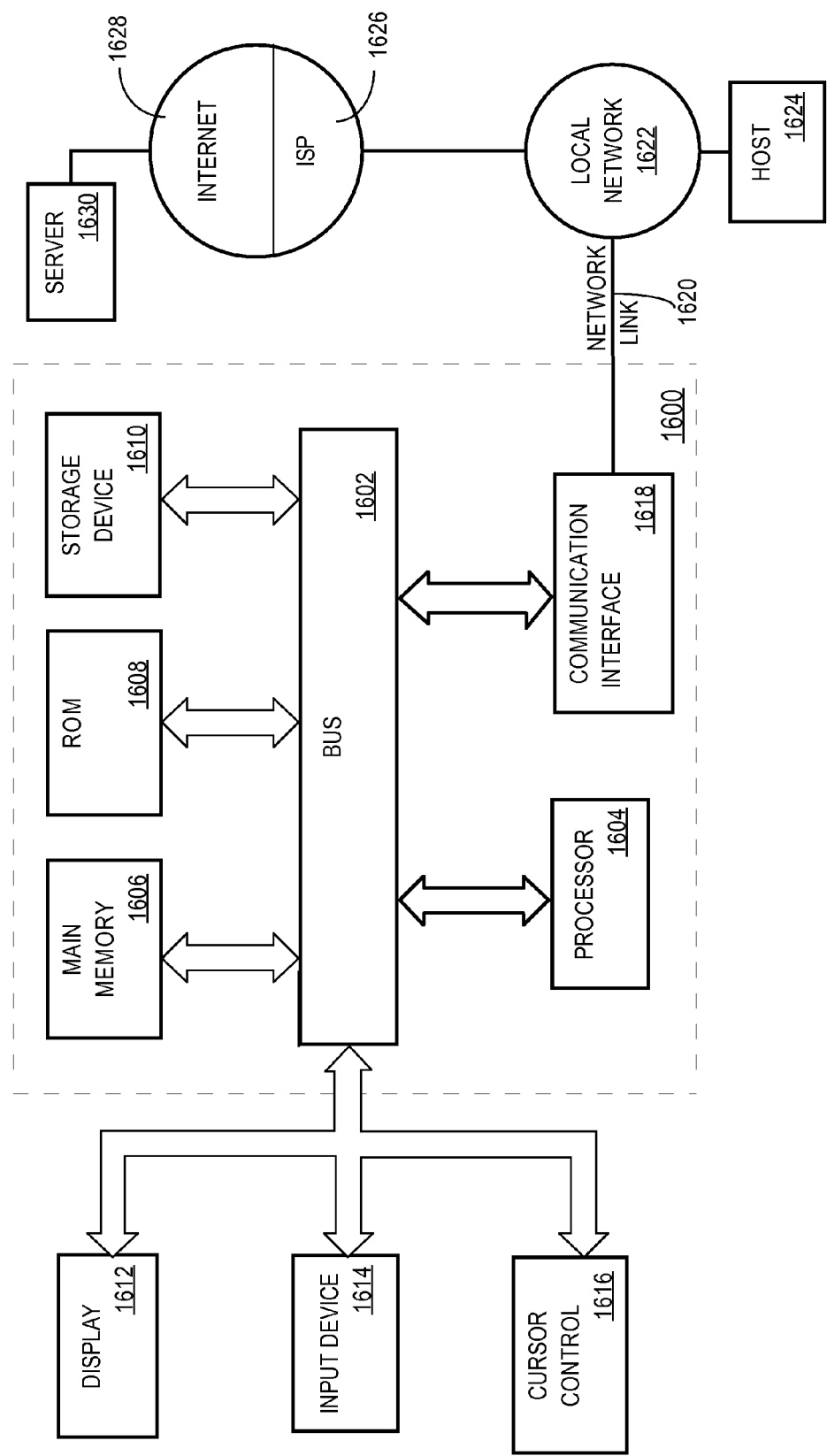
FIG. 16 is a block diagram illustrating a computer system that may be used to implement the techniques described herein.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk, optical disk, or solid-state drive is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid-state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    assigning each record of a plurality of records to a corresponding segment of a plurality of segments;
    based on a pseudorandom algorithm, selecting a subset of the plurality of segments as a sample population;
    distributing the sample population across one or more target computing devices of a plurality of computing devices;
    prior to receiving a request to perform a particular database operation, creating a globally distributed data structure as an index for a particular key;
    wherein the globally distributed data structure comprises a plurality of locally distributed data structures for the particular key;
    wherein creating the globally distributed data structure includes:
        identifying a set of records, each of which has at least one value that corresponds to the particular key;
        for each record of the set of records, performing the steps of:
            creating a fat pointer to the record based, at least in part, on:
                a given value in the record that corresponds to the particular key; and
                a location of the record on a target computing device of the plurality of computing devices;
            based on the given value, sending the fat pointer to a host computing device in the plurality of computing devices;
            in response to receiving the fat pointer at the host computing device, performing the steps of:
                identifying a locally distributed data structure for the particular key;
                storing the fat pointer, within the locally distributed data structure, based on the given value;
    in response to receiving the request to perform the particular database operation, determining that the request makes reference to the particular key; and
    generating a response to the request based, at least in part, on information obtained from the globally distributed data structure for the particular key.

2. The method of claim 1, wherein the sending the fat pointer to the host computing device in the plurality of computing devices includes:
    aggregating the fat pointer with a set of one or more fat pointers that are assigned to the host computing device; and
    sending the set of one or more fat pointers in a single message to the host computing device.

3. The method of claim 2, wherein the target computing device sends the set of one or more fat pointers to the host computing device in response to the target computing device determining that set of one or more fat pointers meets a threshold data size.

4. The method of claim 1, wherein the storing the fat pointer, within the locally distributed data structure, based on the given value includes:
    assigning the fat pointer to a linked list of a plurality of linked lists;
    wherein each linked list in the plurality of linked lists contains one or more pages of fat pointers;
    wherein each page of the one or more pages contains fat pointer data corresponding to the particular key.

5. The method of claim 4, wherein the method further comprises:
    after generating the response to the request, receiving a plurality of requests to perform a plurality of database operations; and
    in response to determining that the plurality of requests fail to make reference to the particular key, transferring the locally distributed data structure from memory to disk by reading each linked list of the plurality of linked lists serially onto disk.

6. The method of claim 4, wherein the method further comprises:
determining work required by the request may be performed against a set of particular values corresponding to the particular key;
in response to determining work required by the request may be performed against the set of particular values,
sorting a particular linked list containing fat pointers within a range of values that include the set of particular values;
constructing a first portion of a b+tree from the fat pointer data in the particular linked list;
constructing, in parallel with the constructing of the first portion of the b+tree, a second portion of the b+tree from the fat pointer data in the particular linked list; and
combining the first portion and the second portion into a combined b+tree.

7. The method of claim 1, wherein the storing the fat pointer, within the locally distributed data structure, based on the given value includes:
determining a particular page in the locally distributed data structure for the given value based on the given value falling within a range of values;
determining a shortened word length required to encode the range of values for the particular page; and
based on the determining, encoding the given value of the fat pointer in the word length.

8. The method of claim 1, wherein the generating the response includes:
using a first host computing device, identifying a particular fat pointer that meets a condition in the request;
based on a particular location of a particular record contained in the particular fat pointer, sending a message, from the host computing device to a particular target computing device, for a particular key value from the particular record;
using the particular target computing device, creating an output fat pointer based on the particular key value from the particular record and the particular location of the particular record; and
based on the particular key value, sending the output fat pointer to a second host computing device in the plurality of computing devices.

9. The method of claim 1,
wherein sending the fat pointer to the host computing device in the plurality of computing devices includes:
determining the host computing device based on a range based distributed hash table;
in response to a particular host computing device storing a threshold data size of fat pointers, adjusting a particular range corresponding to the particular host computing device to include less fat pointers;
wherein the adjusting causes a set of fat pointers to correspond a different host computing device than the host computing device;
creating a lock on the fat pointers contained in the globally distributed data structure to prevent other requests from accessing data through the globally distributed data structure;
based on the adjusting, sending the set from the particular host computing device to the different host computing device; and
releasing the lock on the fat pointers in the globally distributed data structure.

10. The method of claim 1,
wherein the sending the fat pointer to the host computing device in the plurality of computing devices includes:
identifying an existing globally distributed data structure based on a second key;
determining a range based distributed hash table used for the existing globally distributed data structure; and
sending the fat pointer to the host computing device using the ranged based distributed hash table;
wherein the particular database operation joins values from the particular key with values from the second key; and
wherein generating the response includes:
using the host computing device, locally performing the particular database operation against locally distributed data structures for the second key and the particular key.

11. The method of claim 1, wherein the particular database operation is selected from a group consisting of a filter, an aggregate, a sort, and a join.

12. The method of claim 1, wherein the method further comprises:
selecting the particular key, from among a plurality of keys, as the key for which to build the globally distributed data structure based, at least in part, on receiving the particular key in a selection from a user.

13. The method of claim 1, wherein the method further comprises:
selecting the particular key, from among a plurality of keys, as the key for which to build the globally distributed data structure based, at least in part, on the particular key being part of another request received from a user to perform one or more database operations.

14. The method of claim 1, wherein the method further comprises:
selecting the particular key, from among a plurality of keys, as the key for which to build the globally distributed data structure based, at least in part, on the particular key being in a result set of another database operation.

15. A method comprising:
receiving a request to perform a database operation;
performing the database operation to produce a first result set corresponding to a particular key;
distributing the first result set in a globally distributed data structure;
wherein the globally distributed data structure comprises a plurality of locally distributed data structures for the particular key;
wherein distributing includes, for each record in the first result set, performing the steps of:
creating a fat pointer to the record based, at least in part, on:
a given value in the record that corresponds to the particular key; and
a location of the record on a target computing device of a plurality of computing devices;
based on the given value, sending the fat pointer to a host computing device in the plurality of computing devices;
in response to receiving the fat pointer at the host computing device, performing the steps of:

identifying a locally distributed data structure for the particular key; and storing the fat pointer, within the locally distributed data structure, based on the given value.

16. The method of claim 15, wherein the method further comprises:

determining work required by a second database operation may be performed against the particular key; and each given computing device in the plurality of computing devices performing work against values in the fat pointers of a respective locally maintained locally distributed data structure of the plurality of locally distributed data structures for the particular key.

17. One or more non-transitory storage media storing instructions which, when executed by one or more computing devices, cause performance of a method comprising the steps of:

assigning each record of a plurality of records to a corresponding segment of a plurality of segments;

based on a pseudorandom algorithm, selecting a subset of the plurality of segments as a sample population;

distributing the sample population across one or more target computing devices of a plurality of computing devices;

prior to receiving a request to perform a particular database operation, creating a globally distributed data structure as an index for a particular key;

wherein the globally distributed data structure comprises a plurality of locally distributed data structures for the particular key;

wherein creating the globally distributed data structure includes:

identifying a set of records, each of which has at least one value that corresponds to the particular key;

for each record of the set of records, performing the steps of:

creating a fat pointer to the record based, at least in part, on:

a given value in the record that corresponds to the particular key; and a location of the record on a target computing device of the plurality of computing devices;

based on the given value, sending the fat pointer to a host computing device in the plurality of computing devices;

in response to receiving the fat pointer at the host computing device, performing the steps of:

identifying a locally distributed data structure for the particular key;

storing the fat pointer, within the locally distributed data structure, based on the given value;

in response to receiving the request to perform the particular database operation, determining that the request makes reference to the particular key; and generating a response to the request based, at least in part, on information obtained from the globally distributed data structure for the particular key.

18. The one or more non-transitory storage media of claim 17, wherein the sending the fat pointer to the host computing device in the plurality of computing devices includes:

aggregating the fat pointer with a set of one or more fat pointers that are assigned to the host computing device; and sending the set of one or more fat pointers in a single message to the host computing device.

19. The one or more non-transitory storage media of claim 18, wherein the target computing device sends the set of one or more fat pointers to the host computing device in response to the target computing device determining that set of one or more fat pointers meets a threshold data size.

20. The one or more non-transitory storage media of claim 17, wherein the storing the fat pointer, within the locally distributed data structure, based on the given value includes:

assigning the fat pointer to a linked list of a plurality of linked lists;

wherein each linked list in the plurality of linked lists contains one or more pages of fat pointers;

wherein each page of the one or more pages contains fat pointer data corresponding to the particular key.

21. The one or more non-transitory storage media of claim 20, further causing performance of the steps of:

after generating the response to the request, receiving a plurality of requests to perform a plurality of database operations; and in response to determining that the plurality of requests fail to make reference to the particular key, transferring the locally distributed data structure from memory to disk by reading each linked list of the plurality of linked lists serially onto disk.

22. The one or more non-transitory storage media of claim 20, further causing performance of the steps of:

determining work required by the request may be performed against a set of particular values corresponding to the particular key;

in response to determining work required by the request may be performed against the set of particular values, sorting a particular linked list containing fat pointers within a range of values that include the set of particular values;

constructing a first portion of a b+tree from the fat pointer data in the particular linked list;

constructing, in parallel with the constructing of the first portion of the b+tree, a second portion of the b+tree from the fat pointer data in the particular linked list; and combining the first portion and the second portion into a combined b+tree.

23. The one or more non-transitory storage media of claim 17, wherein the storing the fat pointer, within the locally distributed data structure, based on the given value includes:

determining a particular page in the locally distributed data structure for the given value based on the given value falling within a range of values;

determining a shortened word length required to encode the range of values for the particular page; and based on the determining, encoding the given value of the fat pointer in the word length.

24. The one or more non-transitory storage media of claim 17, wherein the generating the response includes:

using a first host computing device, identifying a particular fat pointer that meets a condition in the request;

based on a particular location of a particular record contained in the particular fat pointer, sending a message, from the host computing device to a particular target computing device, for a particular key value from the particular record;

using the particular target computing device, creating an output fat pointer based on the particular key value from the particular record and the particular location of the particular record; and based on the particular key value, sending the output fat pointer to a second host computing device in the plurality of computing devices.

25. The one or more non-transitory storage media of claim 17,
wherein sending the fat pointer to the host computing device in the plurality of computing devices includes:
determining the host computing device based on a range based distributed hash table;
in response to a particular host computing device storing a threshold data size of fat pointers, adjusting a particular range corresponding to the particular host computing device to include less fat pointers;
wherein the adjusting causes a set of fat pointers to correspond a different host computing device than the host computing device;
creating a lock on the fat pointers contained in the globally distributed data structure to prevent other requests from accessing data through the globally distributed data structure;
based on the adjusting, sending the set from the particular host computing device to the different host computing device; and
releasing the lock on the fat pointers in the globally distributed data structure.

26. The one or more non-transitory storage media of claim 17,
wherein the sending the fat pointer to the host computing device in the plurality of computing devices includes:
identifying an existing globally distributed data structure based on a second key;
determining a range based distributed hash table used for the existing globally distributed data structure; and
sending the fat pointer to the host computing device using the ranged based distributed hash table;
wherein the particular database operation joins values from the particular key with values from the second key; and
wherein generating the response includes:
using the host computing device, locally performing the particular database operation against locally distributed data structures for the second key and the particular key.

27. The one or more non-transitory storage media of claim 17, wherein the particular database operation is selected from a group consisting of a filter, an aggregate, a sort, and a join.

28. The one or more non-transitory storage media of claim 17, further causing performance of the steps of:
selecting the particular key, from among a plurality of keys, as the key for which to build the globally distributed data structure based, at least in part, on receiving the particular key in a selection from a user.

29. The one or more non-transitory storage media of claim 17, further causing performance of the steps of:
selecting the particular key, from among a plurality of keys, as the key for which to build the globally distributed data structure based, at least in part, on the particular key being part of another request received from a user to perform one or more database operations.

30. The one or more non-transitory storage media of claim 17, further causing performance of the steps of:
selecting the particular key, from among a plurality of keys, as the key for which to build the globally distributed data structure based, at least in part, on the particular key being in a result set of another database operation.

31. One or more non-transitory storage media storing instructions which, when executed by one or more computing devices, cause performance of a method comprising the steps of:
receiving a request to perform a database operation;
performing the database operation to produce a first result set corresponding to a particular key;
distributing the first result set in a globally distributed data structure;
wherein the globally distributed data structure comprises a plurality of locally distributed data structures for the particular key;
wherein distributing includes, for each record in the result set, performing the steps of:
creating a fat pointer to the record based, at least in part, on:
a given value in the record that corresponds to the particular key; and
a location of the record on a target computing device of a plurality of computing devices;
based on the given value, sending the fat pointer to a host computing device in the plurality of computing devices;
in response to receiving the fat pointer at the host computing device, performing the steps of:
identifying a locally distributed data structure for the particular key; and
storing the fat pointer, within the locally distributed data structure, based on the given value.

32. The one or more non-transitory storage media of claim 31, further causing performance of the steps of:
determining work required by a second database operation may be performed against the particular key; and
each given computing device in the plurality of computing devices performing work against values in the fat pointers of a respective locally maintained locally distributed data structure of the plurality of locally distributed data structures for the particular key.

* * * * *